United States Patent
Chandler, Jr.

(10) Patent No.: US 8,535,539 B2
(45) Date of Patent: Sep. 17, 2013

(54) WATER SOFTENER SYSTEM AND METHOD

(75) Inventor: William D. Chandler, Jr., Ashland, OH (US)

(73) Assignee: Chandler Systems, Inc., Ashland, OH (US)

( * ) Notice: Subject to any disclaimer, the term of this patent is extended or adjusted under 35 U.S.C. 154(b) by 0 days.

(21) Appl. No.: 13/492,381

(22) Filed: Jun. 8, 2012

(65) Prior Publication Data

US 2012/0312748 A1 Dec. 13, 2012

Related U.S. Application Data

(60) Provisional application No. 61/494,449, filed on Jun. 8, 2011, provisional application No. 61/513,450, filed on Jul. 29, 2011, provisional application No. 61/607,343, filed on Mar. 6, 2012.

(51) Int. Cl.
*B01J 49/00* (2006.01)
*C02F 1/42* (2006.01)
*B01D 24/46* (2006.01)

(52) U.S. Cl.
USPC .......................... 210/672; 210/191; 210/687

(58) Field of Classification Search
USPC ............ 210/662, 86, 89, 134, 140, 191, 754, 210/198.1, 143, 758, 672, 687
See application file for complete search history.

(56) References Cited

U.S. PATENT DOCUMENTS

| | | | |
|---|---|---|---|
| 4,290,451 A | | 9/1981 | Fleckenstein et al. |
| 5,108,616 A | * | 4/1992 | Kunz ............................ 210/678 |
| 5,628,899 A | * | 5/1997 | Vaughan ....................... 210/142 |
| 6,402,944 B1 | | 6/2002 | Vaughan |
| 6,444,127 B1 | | 9/2002 | Vaughan et al. |
| 7,156,995 B2 | | 1/2007 | Maas et al. |
| 7,300,569 B2 | | 11/2007 | Petty |
| 7,491,321 B1 | | 2/2009 | Maas et al. |
| 7,638,083 B2 | | 12/2009 | Obara et al. |
| 2012/0312749 A1 | * | 12/2012 | Chandler, Jr. ................. 210/687 |

OTHER PUBLICATIONS

CSI, CSI Water Treatment Product Catalog, 2005, pp. 1-180.
CSI, Signature Series Service Manual, dated prior to Jun. 8, 2011, pp. 1-27.
CSI, Water Conditioner Flow Diagrams, dated prior to Jun. 8, 2011, pp. 34-37.

* cited by examiner

*Primary Examiner* — Nam Nguyen
*Assistant Examiner* — Claire Norris
(74) *Attorney, Agent, or Firm* — Brett A. Schenck; Walker & Jocke

(57) ABSTRACT

A method for regenerating the ion exchange resin bed of a resin tank for a water treatment system is provided. This method includes supplying a first pulse of regenerate solution into the resin tank to charge a first section of the ion exchange resin bed, and supplying a second pulse of regenerate solution to charge a second section of the ion exchange resin bed.

16 Claims, 36 Drawing Sheets

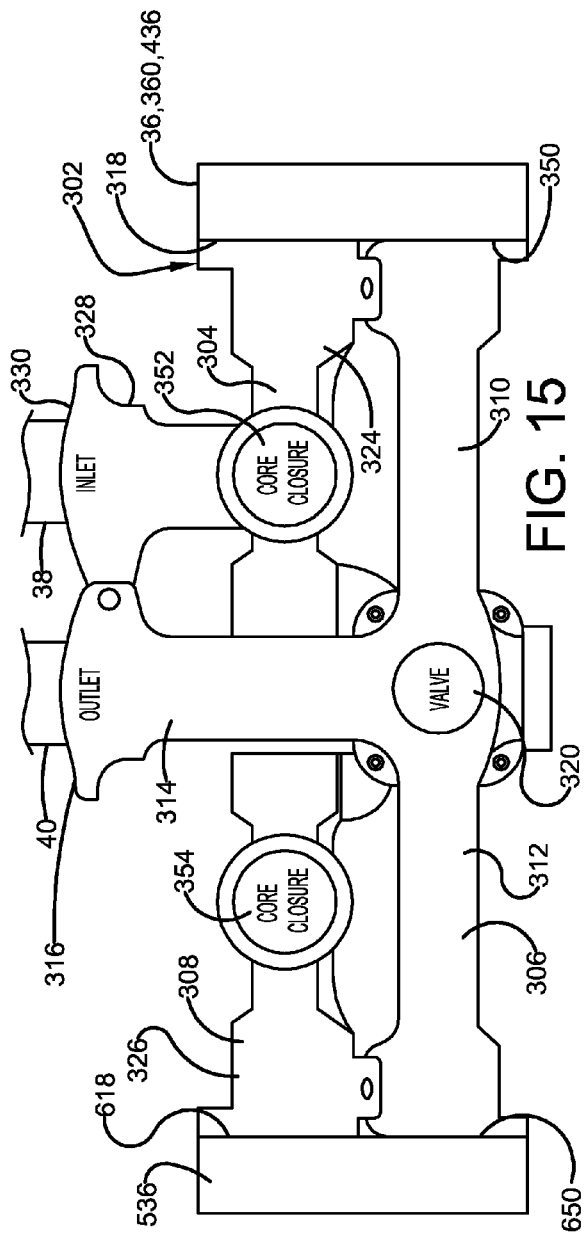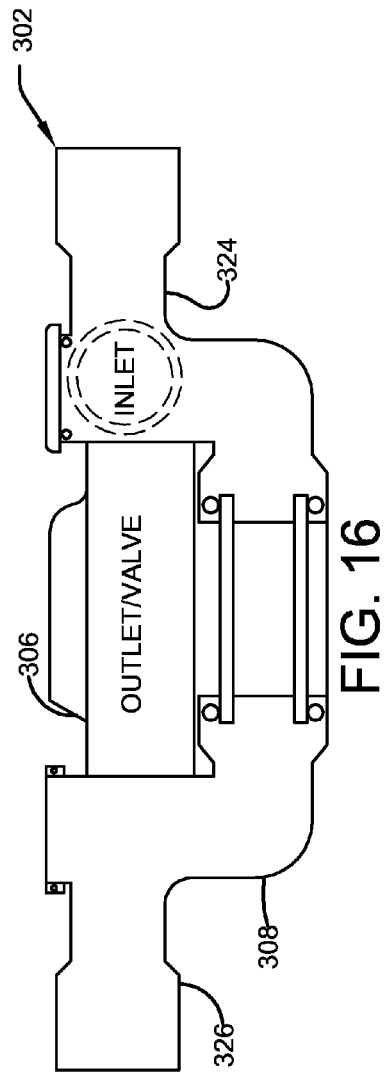

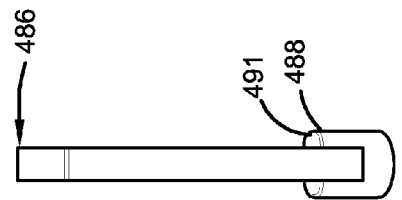
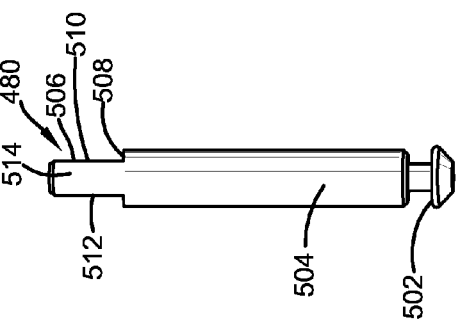
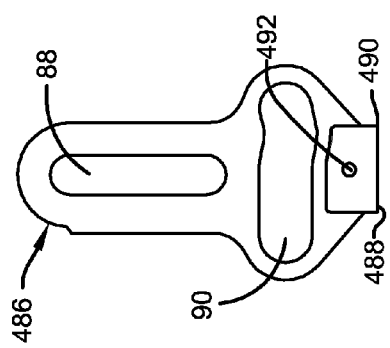
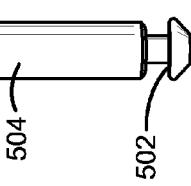

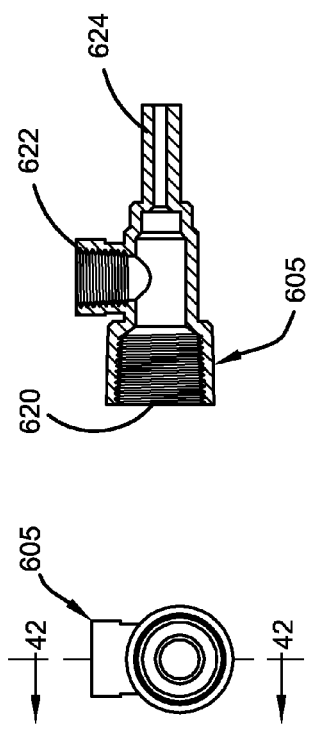
FIG. 42
FIG. 41
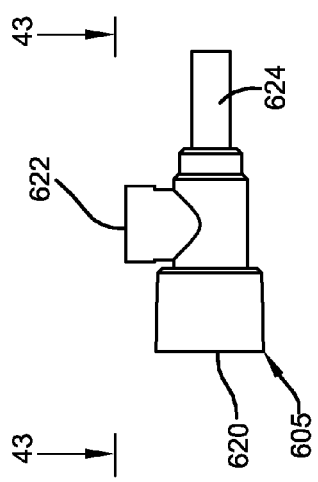
FIG. 40
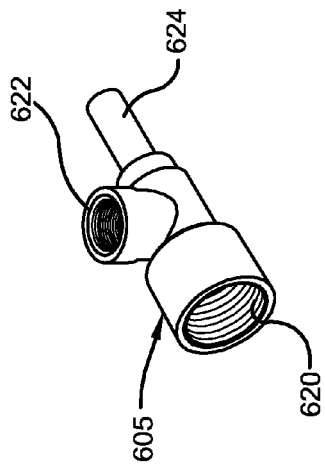
FIG. 44
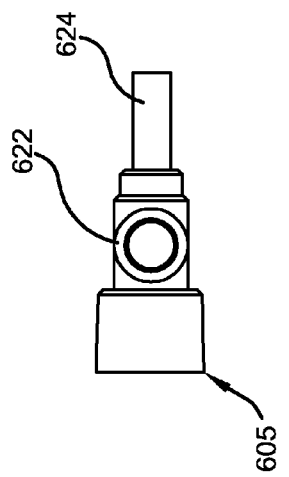
FIG. 43

WATER SOFTENER SYSTEM AND METHOD

CROSS-REFERENCE TO RELATED APPLICATIONS

This application claims benefit under 35 U.S.C. §119(e) of Provisional Application No. 61/494,449 filed Jun. 8, 2011, Provisional Application No. 61/513,450 filed Jul. 29, 2011, and Provisional Application No. 61/607,343 filed Mar. 6, 2012, the disclosures of each of which are incorporated herein by reference in its entirety.

BACKGROUND

Water softeners are used to remove calcium and other deposit causing materials from the untreated or "hard water." The water softener has an ion exchange process taking place in an ion-exchange resin bed stored in a resin tank of the water softener. As the water that is to be processed passes through the resin-filled tank, ions of calcium and other minerals in the water are exchanged with ions found in the resin, e.g., sodium, thereby removing objectionable ions from the water and exchanging them with less objectionable ions from the resin.

The capacity of the resin to exchange ions is finite and is reduced during the ion exchange process. Water softeners are generally operative to periodically regenerate the ion exchange resin stored in the resin tank. Regeneration generally involves chemically replacing the objectionable ions such as calcium ions from the resin with less objectionable ions such as sodium ions. This replacement is typically performed by introducing a regenerant solution of sodium chloride or potassium chloride into the resin bed from a brine tank and thereafter flushing the regenerant solution from the bed. Regeneration of a water softener resin bed may be performed in a direction that is the same as the flow of water to be treated. This is generally known as "downflow regeneration". Regeneration of a water softener resin may be performed in a direction that is opposite to the flow of water being treated. This is generally known as "upflow regeneration". The resin bed is backwashed in order to remove trapped particulate matter, and the resin tank can be rinsed to remove objectionable soluble materials. In order to prevent interruption of service, most water softeners are configured to allow a bypass flow of untreated water directly to the service lines during backwash, rinse, and regeneration.

Water softeners may benefit from improvements.

SUMMARY

The following is a brief summary of subject matter that is described in greater detail herein. This summary is not intended to be limiting as to the scope of the claims. A water treatment system is provided that includes a brine tank and a resin tank and a control valve in operative connection with the tanks. The control valve includes a piston that is operated by a first motor to move between different positions to change the flow of water through orifices in the control valve, and a brine valve that is operated by a second motor to open and close the passage between the brine tank and resin tank. The second motor operates the brine valve independently of the operation of the piston by the first motor.

In another aspect of an exemplary embodiment, a method is provided that includes moving a piston with a first motor to change the flow of water through a plurality of orifices in a control valve of a water softening system comprising a brine tank and a resin tank. The control valve includes a brine valve in fluid communication with at least one of the orifices and the brine valve is operative to open and close at least one passage between the control valve and the brine tank. The control valve includes a brine valve cam. In a first position, the brine valve cam is operative to cause the brine valve to open the at least one passage, and in a second position the brine valve cam is operative to cause the brine valve to close the at least one passage. The method further includes moving the brine cam with a second motor between the first and second positions to cause the brine valve to open and close the passage independently of the operation of the first motor.

In another aspect of the exemplary embodiment, a water treatment system is provided that includes a control valve. The control valve includes a plurality of orifices and a piston. Movement of the piston is operative to change the flow of water through the orifices. A brine tank is in operative connection with the control valve. The brine tank includes a pump. A resin tank is in operative connection with the control valve and includes an ion exchange resin bed. At least one controller is operatively configured to cause the pump to operate to push brine from the brine tank through the control valve and into the resin tank.

In another aspect of the exemplary embodiment, a method is provided that includes moving a first piston with a first motor to change the flow of water through a plurality of orifices in a control valve of a water softening system. The system comprises a brine tank and a resin tank in operative connection with the control valve. The brine tank includes a pump therein, and the resin tank includes an ion exchange resin bed. The method further includes through operation of at least one controller, causing the pump to operate to push brine from the brine tank through the control valve and into the resin tank.

In another aspect of the exemplary embodiment, a water treatment system is provided that includes first and second water treatment control valves. Each control valve includes a plurality of orifices and a piston. Movement of the piston is operative to change the flow of water through the orifices of the respective control valve. Each control valve includes an inlet port and an outlet port. The inlet and outlet ports of the second control valve extend from the second control valve in locations on the second control valve that are reversed relative to locations on the first control valve from which the inlet and outlet ports of the first control valve extend from first control valve. Each control valve is in operative connection with a respective brine tank and a resin tank. A manifold is in operative connection with the inlet and outlet ports of the first and second control valves. The manifold includes an inlet and an outlet port and a three way valve. At least one controller is operatively configured to selectively operate the three way valve to direct water from the inlet port of the manifold to at least one of the input ports of the first and second control valves.

In another aspect of the exemplary embodiment, a method is provided that includes moving a first piston with a first motor to change the flow of water through a plurality of orifices in a first control valve of a first water treatment system. The system comprises a first brine tank and a first resin tank in operative connection with the first control valve. The first resin tank includes a first ion exchange resin bed. The first control valve includes a first inlet port and a first outlet port. The first inlet and outlet ports are in operative connection with a manifold that includes an inlet and an outlet. The manifold is in operative connection with a second inlet port and a second outlet port of a second control valve of a second water treatment system that comprises a second brine tank and a second ion tank. The second inlet and second outlet ports extend from the second control valve in locations on the second control valve that are reversed relative locations on the first control valve from which the first inlet and first outlet ports extend from first control valve. The method further includes through operation of at least one controller operating a three way valve in the manifold to direct water from the inlet port of the manifold away from the first input port of the first control valve of the first water softening system and towards the second input port of the second control valve of the second water softening system.

In another aspect of the exemplary embodiment, a method for regenerating the ion exchange resin bed of a resin tank for a water treatment system is provided. This method includes supplying a first pulse of regenerate solution into the resin tank to charge a first section of the ion exchange resin bed, and supplying a second pulse of regenerate solution to charge a second section of the ion exchange resin bed.

In another aspect of the exemplary embodiment, a water treatment system is provided that includes a brine tank and a resin tank, wherein the resin tank includes an ion exchange resin bed. A control valve is in operative connection with the brine tank and resin tank. The control valve includes a fluid valve that is operative to open and close at least one passage in fluid communication between the control valve and the brine tank. At least one controller is operatively connected to the fluid valve and operative to selectively cause the fluid valve to open and close the at least one passage such that regenerate solution from the brine tank flows into the resin tank in pulses. Each pulse of regenerate solution is at a value that fully charges a respective section of the ion exchange resin bed.

In another aspect of the exemplary embodiment, an apparatus is provided that includes a cover piece that is configured to be mounted to a control valve body of a water treatment system. The water treatment system includes a brine tank and a resin tank. The control valve is in operative connection with the brine tank and resin tank. The control valve includes a fluid valve in fluid communication with at least one of the orifices. The fluid valve is operative to open and close a first passage in fluid communication between the control valve and the brine tank. The control valve includes a control valve body. At least one controller is operatively connected to the fluid valve and operative to selectively cause the fluid valve to open and close the first passage such that regenerate solution from the brine tank flows into the resin tank. The cover piece includes at least one tubular projection that defines a port configured for allowing a first fluid to flow therethrough. The at least one tubular projection includes a section. When the cover piece is mounted to the control valve body, the section and control valve body are positioned with respect to each other such that an outer surface of the section and the control valve body define a second passage in fluid communication with the first passage. The second passage is configured to allow a second fluid to flow therethrough.

In another aspect of the exemplary embodiment, a water treatment system is provided including a tank having a top, a control valve, and an air inlet. The control valve is positioned on the top of the tank and in fluid communication with the tank. The control valve includes a plurality of orifices in fluid communication with a source of untreated water, a treated water outlet, a drain, and a source of sterilizing fluid. The air inlet is in fluid communication with the tank and with a first venturi. The control valve is operative to control the flow of untreated water through the first venturi to draw air through the air inlet and into the tank. The control valve includes a sterilizer valve that is operative to open and close at least one passage in fluid communication between the control valve and the source of sterilizing fluid.

In another aspect of the exemplary embodiment, a method for performing water treatment cycles for a water softener system that uses oxidation and filtration to treat the water is provided. This method includes providing sterilizing fluid into the tank to sterilize elements in the tank, performing a backwash cycle in the tank to flow water into the tank to remove particulate matter from a filter in the tank, and performing an air induction cycle to replace the water in the tank with air.

Other aspects will be appreciated upon reading and understanding the attached figures and description.

BRIEF DESCRIPTION OF THE DRAWINGS

FIG. 15 is a top view of a bypass valve assembly operatively mounted to a first control valve of the water softener system of FIGS. 1-5 and a second control valve of the water softener system of FIGS. 1-5.

FIG. 16 is a side view of the bypass valve assembly operatively mounted to two control valves of FIG. 15.

FIG. 30 is a rear perspective view of the retaining plate of an alternative arrangement of the retaining plate and the piston rod of the water softener system.

FIG. 31 is a right side perspective view of the retaining plate of FIG. 30.

FIG. 32 is a rear perspective view of the piston rod of the alternative arrangement of the retaining plate and the piston rod of the water softener system.

FIG. 33 is a left side perspective view of the piston rod of FIG. 32.

FIG. 40 is a side view of the nozzle body of the injector assembly for the water softener system of the exemplary embodiment of FIG. 37.

FIG. 41 is an end view of the nozzle body of FIG. 40.

FIG. 42 is sectional view of the nozzle body taken along line 41-41 of FIG. 41.

FIG. 43 is a view of the nozzle body taken along line 43-43 of FIG. 40.

FIG. 44 is a side perspective view of the nozzle body of FIG. 40.

DETAILED DESCRIPTION

Figure 1:
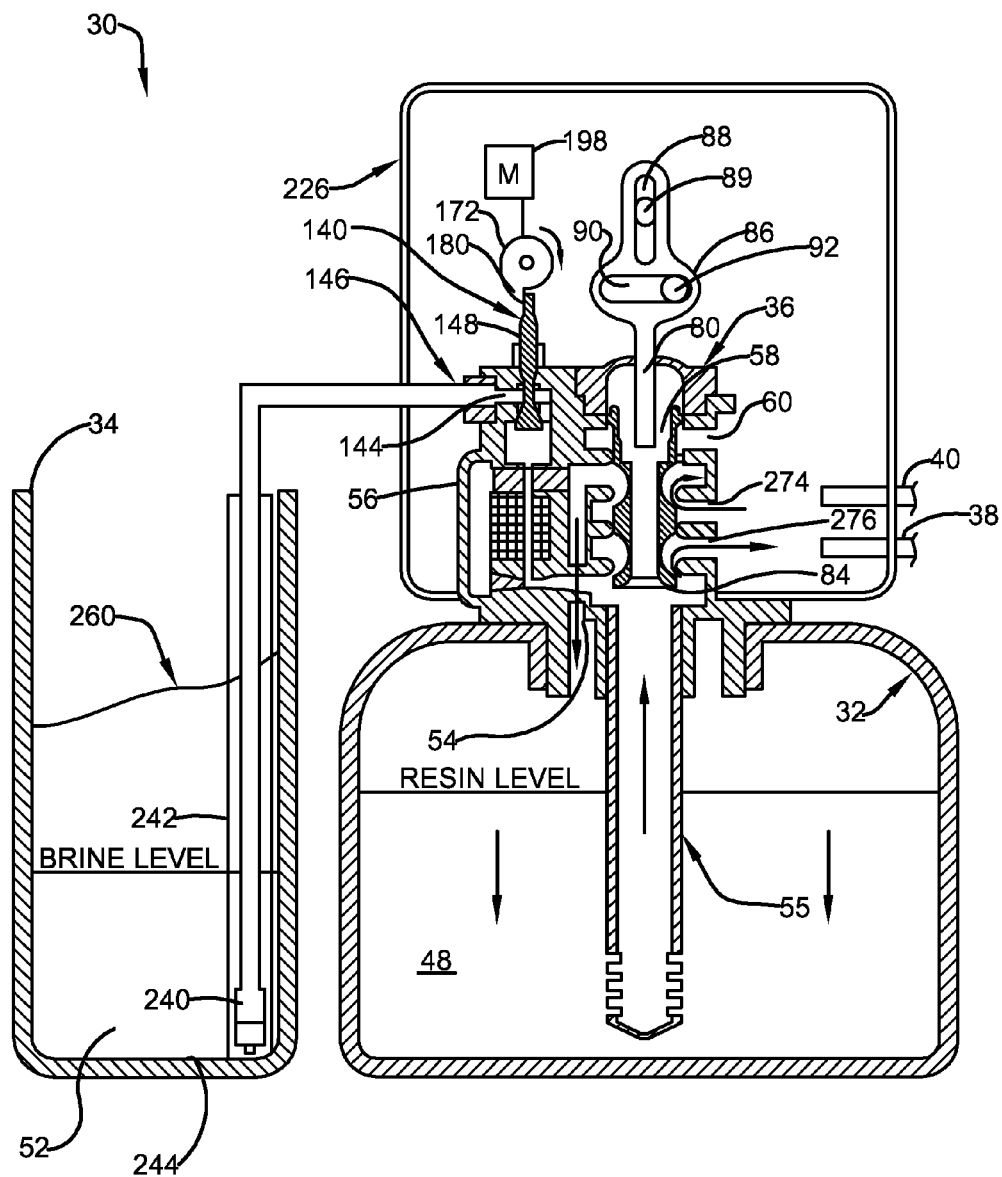
FIGS. 1-5 show cross sectional views of an exemplary embodiment of a water softener system at various phases of the operation.
Figure 2:
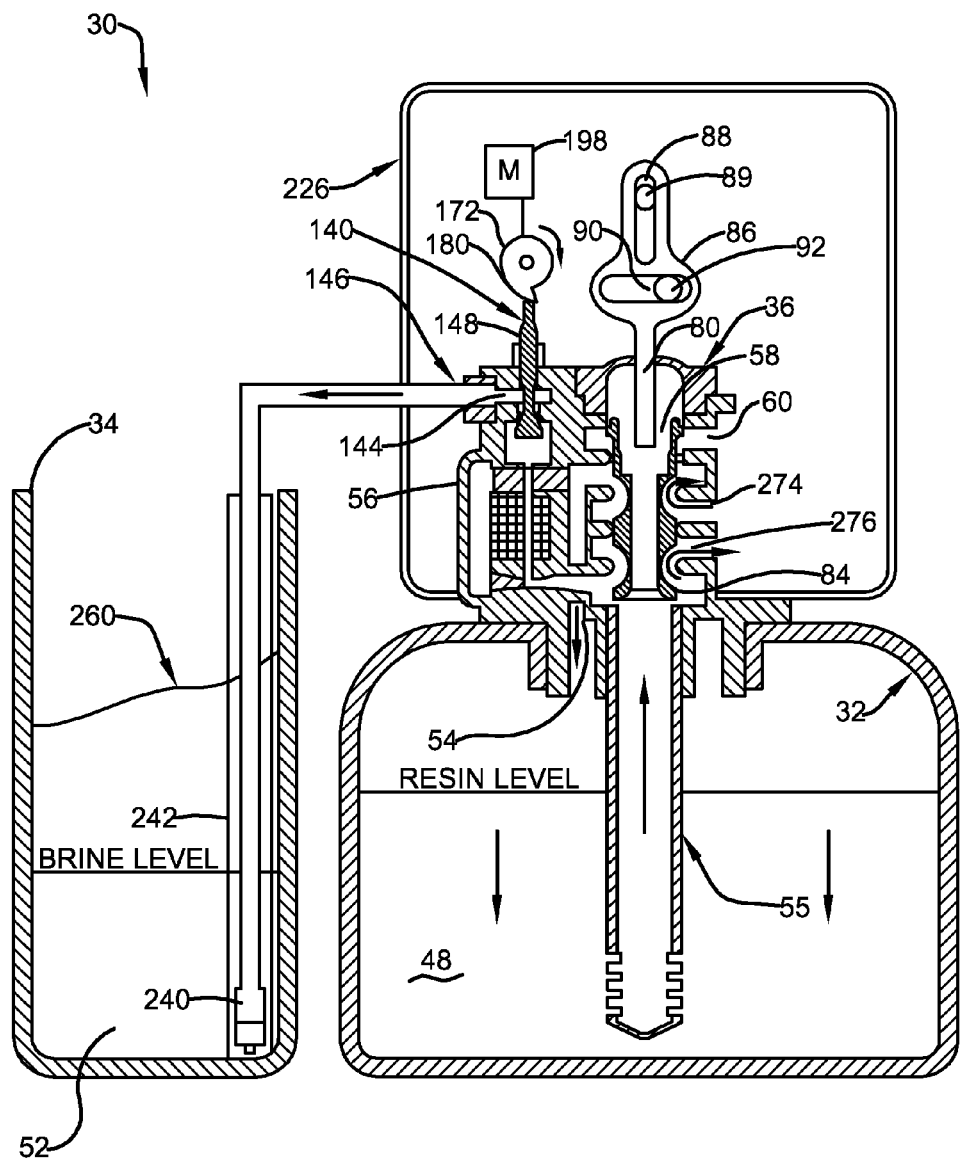

Various technologies pertaining to water softener systems will now be described with reference to the drawings, where like reference numerals represent like elements throughout. In addition, several functional block diagrams of example systems are illustrated and described herein for purposes of explanation; however, it is to be understood that functionality that is described as being carried out by certain system components and devices may be performed by multiple components and devices. Similarly, for instance, a component/device may be configured to perform functionality that is described as being carried out by multiple components/devices.

Referring to the drawings and initially to FIGS. 1-5, a water softener 30 is shown that includes a resin tank 32, a brine tank 34, and a control valve 36 threaded onto the top of the resin tank 32. When placed in service, the control valve 36 is fluidly coupled to the resin tank 32, the brine tank 34, a line 38 leading to a source of untreated water, a treated water line 40, and a drain line 46. The resin tank 32 is filled with a treatment medium such as an ion exchange resin bed 48, and the brine tank 34 contains particles 260 of sodium chloride, potassium permanganate, or another suitable regeneration medium which can be dissolved by water to form a brine or regenerant solution 52. In operation, as incoming hard water enters the resin tank 32 through an opening 54 in the top of the resin tank 32, the water in the resin tank is forced through the resin bed 48 and out a distribution tube 55 extending through the center of the resin bed 48. The capacity of the resin bed 48 to exchange ions with the minerals and impurities in the incoming hard water is finite, and depends on the treatment capacity of the resin bed 48 as typically measured in kilograms of hardness or grams of $CaCO_3$ and the hardness of the incoming water as typically measured in grains per gallon. To regenerate the resin bed 48 once its treating capacity has been depleted, the resin bed 48 is flushed with the regenerant solution 52 from the brine tank 34 so that the minerals and other impurities can be released from the resin bed 48 and carried out of the resin tank 32. All of these operations, as well as optional attendant backwash and rinse operations, are controlled by the water softener control valve 36.

Figure 6:
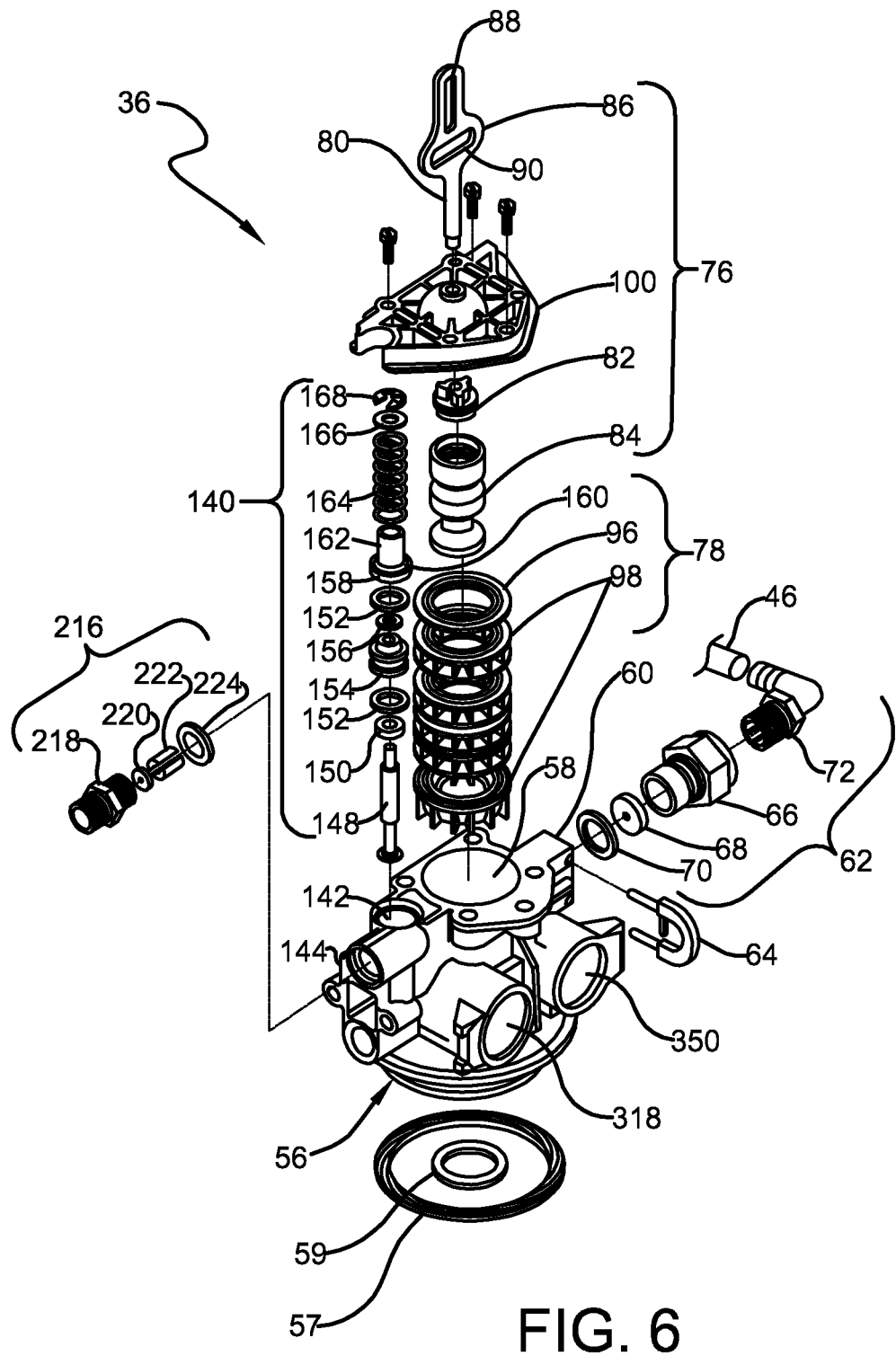
FIG. 6 is an exploded view of a control valve assembly according to the exemplary embodiment of FIGS. 1-5 as viewed from the back of the system.

With reference to FIG. 6, the control valve 36 includes a valve body 56. The valve body 56 includes external ports in open communication with the exterior of the valve body. The valve body 56 includes internal orifices that open into a central bore 58 of the valve body 56. The external ports are fluidly connected to the untreated water line, treated water outlet line, drain, brine tank, top opening of the resin tank, and distribution tube of the resin tank, respectively. Seals 57, 59 may be provided to seal the valve body 56 to the tank opening 54 and distribution tube 55 (shown in FIG. 1). A drain port 60 provided at the valve body is in fluid communication with the central bore 58 and drain 46. A flow control assembly 62 is mounted to the drain port 60 and is retained therein by a retainer 64. The flow control assembly 62 includes a plastic flow control valve 66. A flow control device 68 is provided in the control valve 66 and is sealed by an O-ring 70. A drain fitting 72 such as a ninety degree elbow threads into the flow control valve 66.

Figure 7:
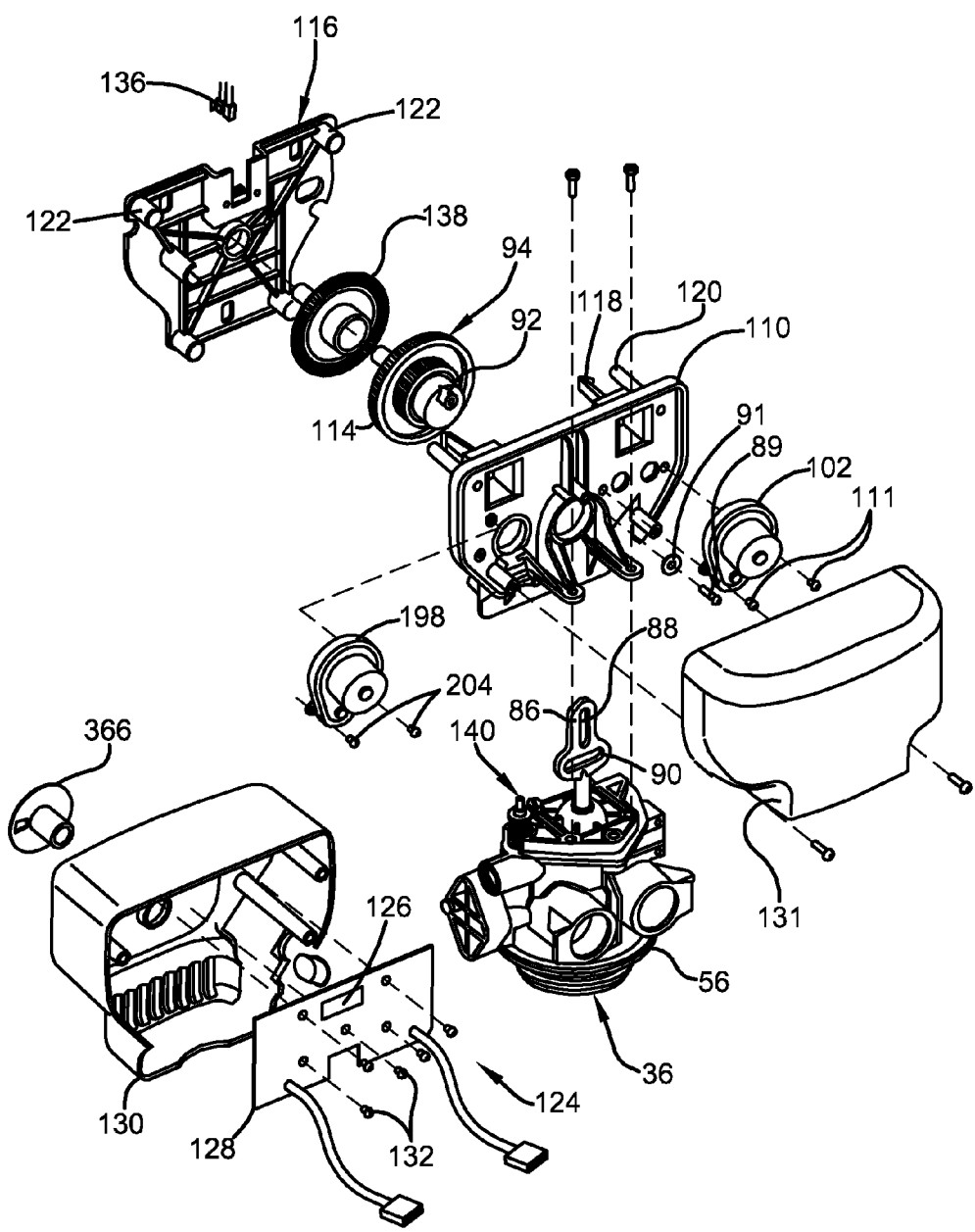
FIG. 7 is an exploded view of elements of the water softener system of FIGS. 1-5 as viewed from the back of the system.

The central bore 58 is configured to slidingly receive a piston assembly 76 and a seal assembly 78. The piston assembly 76 includes a piston rod 80, rod retainer 82 and piston 84. A retaining plate 86 is integrally formed in one piece with the piston rod 80. The retaining plate 86 has a longitudinally extending upper slot 88 and a lower slot 90 that extends transverse to the upper slot 88. As shown in FIG. 7, a fastening device such as a screw 89 and washer 91 extends into the upper slot 88 and operatively mounts the retaining plate 86 to rear side 108 of a back plate 110. The lower slot 90 receives a projection 92 of a main gear 94.

Figure 35:
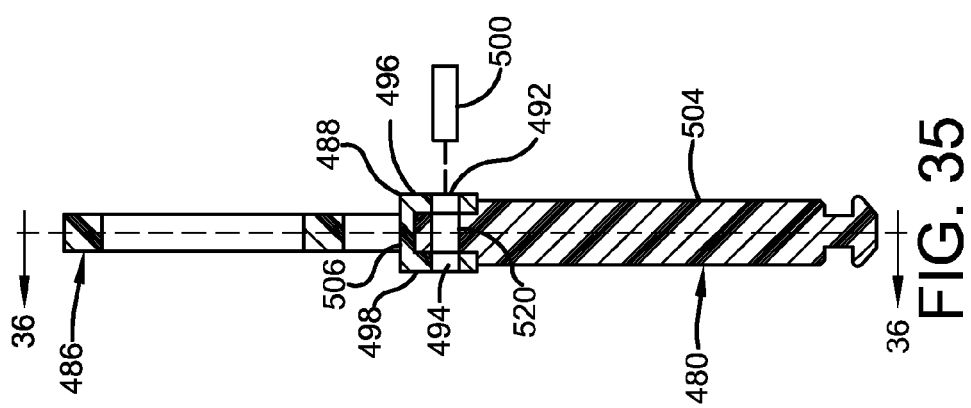
FIG. 35 is a sectional view taken along line 35-35 of FIG. 34.

FIGS. 30-36 show an alternative arrangement of a piston rod 480 and retaining plate 486. In this arrangement the piston rod 480 and retaining plate 486 are made of plastic but are separate pieces secured together. As seen in FIGS. 30, 31 and 35, the retaining plate 486 includes a pocket portion 488 integrally molded on the bottom end of the retaining plate by any suitable process such as injection molding. The pocket portion 488 includes a generally cylindrical side wall 490 (FIG. 30), a top portion 491 (FIG. 31), and an open bottom end. As best seen in FIG. 35, lateral holes 492, 494 are formed in respective rear and front sides 496, 498 of the wall for receiving a fastener 500 such as a pin.

Figure 36:
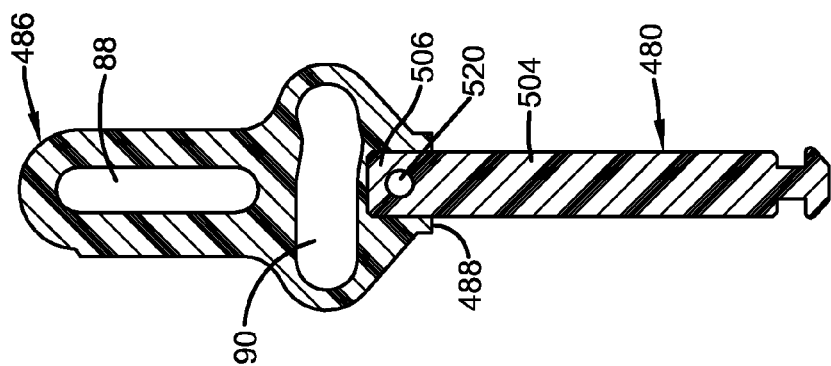
FIG. 36 is a sectional view taken along line 36-36 of FIG. 35.

As seen in FIGS. 32 and 33, the piston rod 480 includes a lower end portion 502, a middle portion 504, and an upper end portion 506 formed in one piece. The middle portion 504 is cylindrical in shape. The upper end portion defines a generally rectangular tongue 506 that extends upwardly from the center of the upper axial end 508 (FIG. 33) of the middle portion 504. In particular, the tongue 506 has a rectangular flat front face 510 (FIG. 33), a rectangular flat rear face 512, left and right curved sides 514, 516 (as viewed from the FIG. 32), and a tapered upper end 518. The left and right sides 514, 516 have the same curvature as the middle portion 504 of the piston rod 480. The width of the tongue 506 or the distance between the left and right sides 514, 516 is the same as the diameter of the middle portion 504 as seen in FIGS. 32 and 36.

Figure 34:
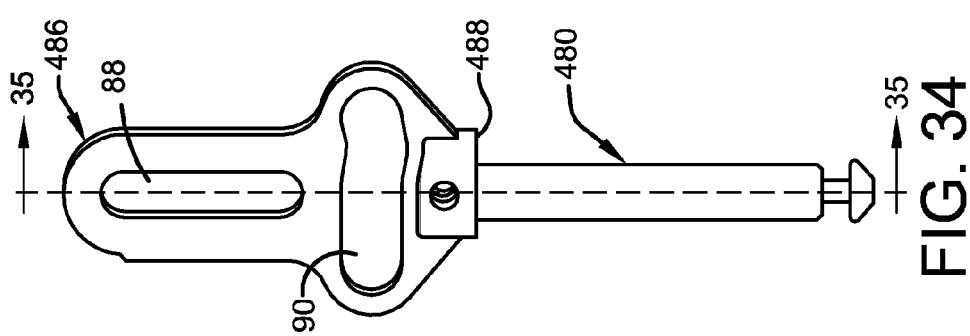
FIG. 34 is a rear perspective view of the retaining plate and piston rod arrangement of FIGS. 30-33.

As best seen in FIGS. 33 and 35, the thickness of the tongue 506 or the distance between the front and rear faces 510, 512 is smaller than the diameter of the middle portion 504. The tongue 506 includes an aperture 520 that extends between the front and rear faces 510, 512 for receiving the pin 500. Referring to FIGS. 34 and 35, when the piston rod 480 and the retaining plate 486 are secured together, the tongue 506 slidably extends into the interior space of the pocket portion 488. The upper axial end 508 of the middle portion abuts the bottom end of the pocket portion 488 for additional support. The pocket portion 488 snugly receives the tongue 506 such that the holes 492, 494 of the pocket portion 488 are aligned with the aperture 520 of the tongue. The pin 500 extends into the holes 492, 494 and aperture 520 and is held in place by compression from the tongue 506 and pocket portion 488. Alternatively, the fastening arrangement may comprise a threaded bolt with a nut turned on the front end of the bolt to secure the tongue 506 to the pocket portion 488. The piston rod 480 and retaining plate 486 are similar in all other aspects to the piston rod 80 and retaining plate 86 and thus will not be discussed further in the interest of brevity. The piston rod 480 and retaining plate are also operative associated with the same elements as that for the piston rod 80 and retaining plate 86. This arrangement of a piston rod 480 and retaining plate 486 provides a relatively considerable amount of surface area of the pocket portion 488 contacting or engaging the tongue 506 and thus significantly minimizes the wear between the piston rod 480 and retaining plate 486 after several water softening cycles.

Referring back to FIG. 6, the piston rod 80 or 480 is inserted into the piston rod retainer 82. The piston 84 is hollow in construction and axially receives the piston rod retainer 82. The seal assembly 78 includes seals 96 that are axially spaced by spacers 98. The piston 84 extends through the seal assembly 78 and engages the seals 96. The piston rod 80 or 480 also extends through a plug or cap 100 that is mounted to valve body 56 and covers the central bore 58 in the valve body 56. The piston assembly 76 and seal assembly 78 are configured depending on the location of the piston 84 within the seal assembly 78 to connect one or more internal orifices of the valve body 56 to one or more other internal orifices and thus creating different flow paths between the external ports of the valve body 56.

Figure 8:
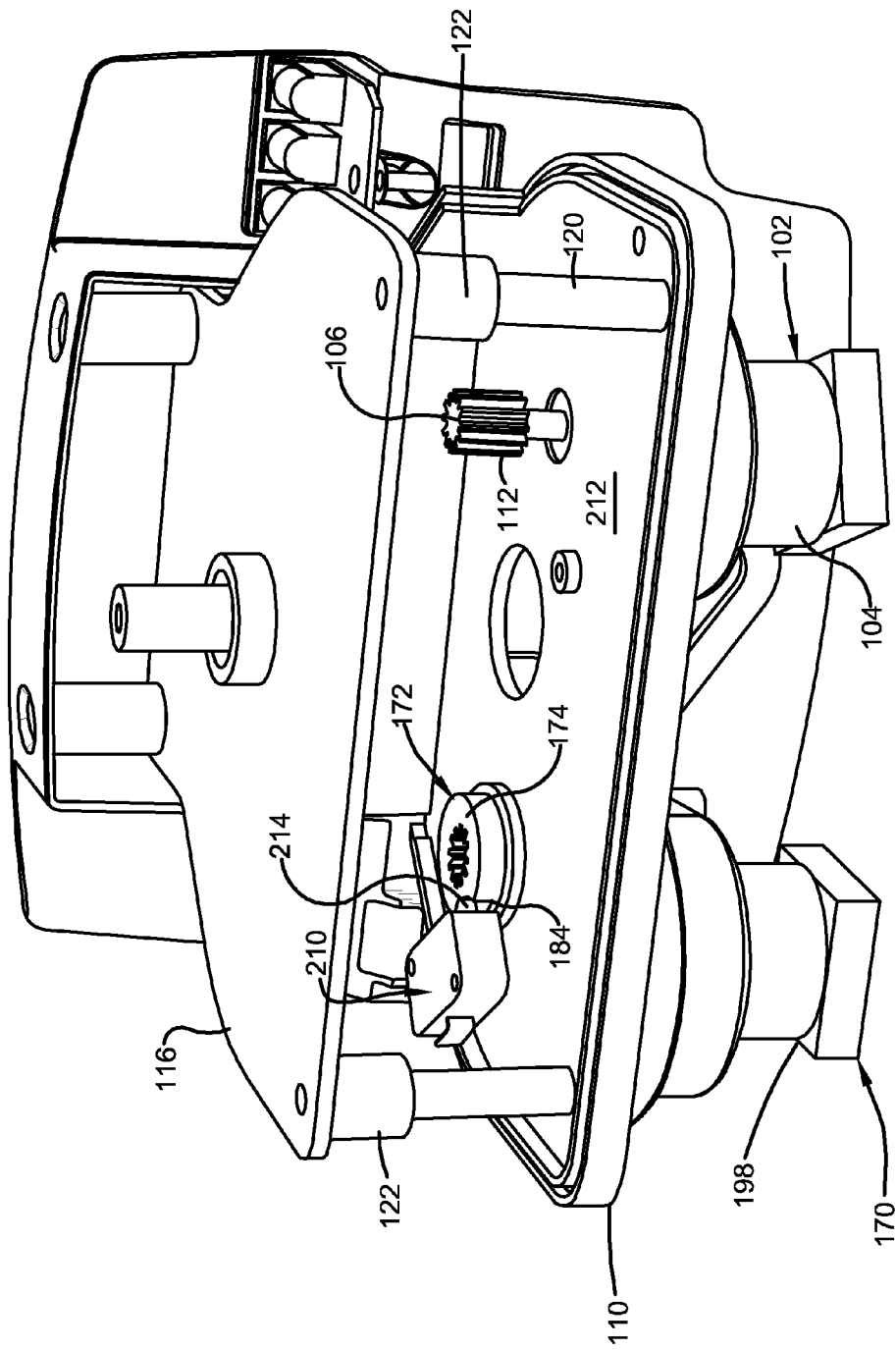
FIG. 8 is a top and rear perspective view of a portion of the water system of FIGS. 1-5 illustrating the drive arrangements for the brine valve and piston valve.

The piston 84 or 484 is controlled by an electric motor 102 (shown in FIG. 7) or other suitable drive that reciprocates or moves the piston 84 up and down through the bore 58 of the valve body 56. The motor 102 may be a reversible DC motor or any type that has variable torque. Alternatively, the motor 102 may be an asynchronous AC motor or a stepper motor. As seen in FIGS. 7 and 8, the motor 102 includes a casing 104 and a rotary output member such as a pinion 106. The motor casing 104 is mounted to the rear side 108 of the back plate 110 by screws 111 such that the pinion 106 extends forwardly through the back plate 110. The pinion 106 includes teeth 112 (FIG. 8) that meshingly engage teeth 114 (FIG. 7) of the main gear 94. The main gear 94 is rotatably mounted to the back plate 110 and a front plate 116. The back plate 110 may include forwardly extending hooks 118 that engage the front side of front plate 116 in a bayonet type connection to mount the front plate 116 to the back plate 110. The back plate 110 further includes forwardly extending bosses 120 that are inserted into recesses of rearwardly extending cylindrical projections 122 when the front and back plates 116, 110 are mounted to each other to provide lateral support. The motor 102 is controlled by a control module 124 that monitors the motion of the piston 84 and controls the operation of the motor 102 based at least partially on the current position of the piston 84. Energization of the motor 102 rotates the pinion 106, which in turn rotates the main gear 94 to move the projection 92 up and down and along the lower slot 90. This action moves the retaining plate 86 or 486 and hence, piston rod 80 or 480 up and down through the bore at selected positions.

The control module 124 includes a processor or controller 126 that is mounted on a printed circuit board 128. The printed circuit board is operatively mounted to a front cover 130 by screws 132. In addition, the control module 124 may include a motor driver that in turn may include an internal current limiter for controlling the available drive current for the motor 102 and for permitting the controller 126 to determine whether the motor driver is limiting the drive current for the motor. The control module 124 is operatively connected to a position monitor 134 (schematically indicated in FIG. 19) that monitors the motion of the piston 84. The position monitor 134 comprises an encoder 136 (FIG. 7) such as a magnetic or optical encoder that monitors the rotation of the main gear 94 via an encoder wheel 138 (FIG. 7) fixedly engaged to the main gear 94. The encoder 136 senses or monitors rotation of the main gear 94 and outputs a predetermined number of pulses to the controller 126 for each revolution of the gear to the controller 126. The controller 126 receives the signals from the encoder 136 and other sensors and transmits control signals to the motor 102. For instance, because it is known that a given number of detected pulses translates into a given stroke of the piston 84, the motor 102 can be controlled to drive the piston 84 to a desired position within the bore 58 simply by counting the number of pulses from start. The position monitor 134 need not be limited to an encoder and may comprise any device for precisely and directly or indirectly monitoring movement of the piston 84 so as to permit the controller 126 to determine the piston's position within the bore 58. For example, if the motor 102 is a stepper motor, the position monitor 134 could be formed from part of the motor's internal control circuitry or could take the form of a limit switch or other mechanical position switch.

A brine valve 140 is provided in a bore 142 (FIG. 6) of the valve body 56 that fluidly communicates with the external port 144 connected to the line 146 for the brine valve 140. The brine valve 140 controls the flow of the brine from the brine tank 34. Referring to FIG. 6, the brine valve 140 includes a brine valve stem 148 that axially receives a valve seat 150. Elastomeric O-ring seals 152 are positioned upon the valve seat 150. The O-ring seals 152 are spaced from each other by a spacer 154 and a quad ring 156 positioned upon the spacer 154. A valve cap 158 is positioned upon a seal 142 and caps the seals 152, spacer 154, and quad ring 156 upon the valve seat 150. The valve cap 158 includes a head 160 and a shaft 162. A coiled valve spring 164 axially receives the shaft 162 and is seated upon the head 160. The valve stem 148 axially extends through the O-ring seals 152, spacer 154, quad ring 156, cap 158 and spring 164. The valve stem 148 is retained to the upper end of the spring 164 by a washer 166 and retaining ring 168. The spring 164 biases the valve stem 148 upwardly. In operation, the valve stem 148 axially moves within the bore 58 to open and close the brine port 144 in fluid communication with the line 146 to the brine tank 34 as illustrated in FIGS. 1-5 and 20-29. The brine valve 140 is controlled by a drive assembly 170 (FIG. 8) that reciprocates or moves the valve stem 148 up and down through the bore 58 of the valve body 56.

Figure 9:
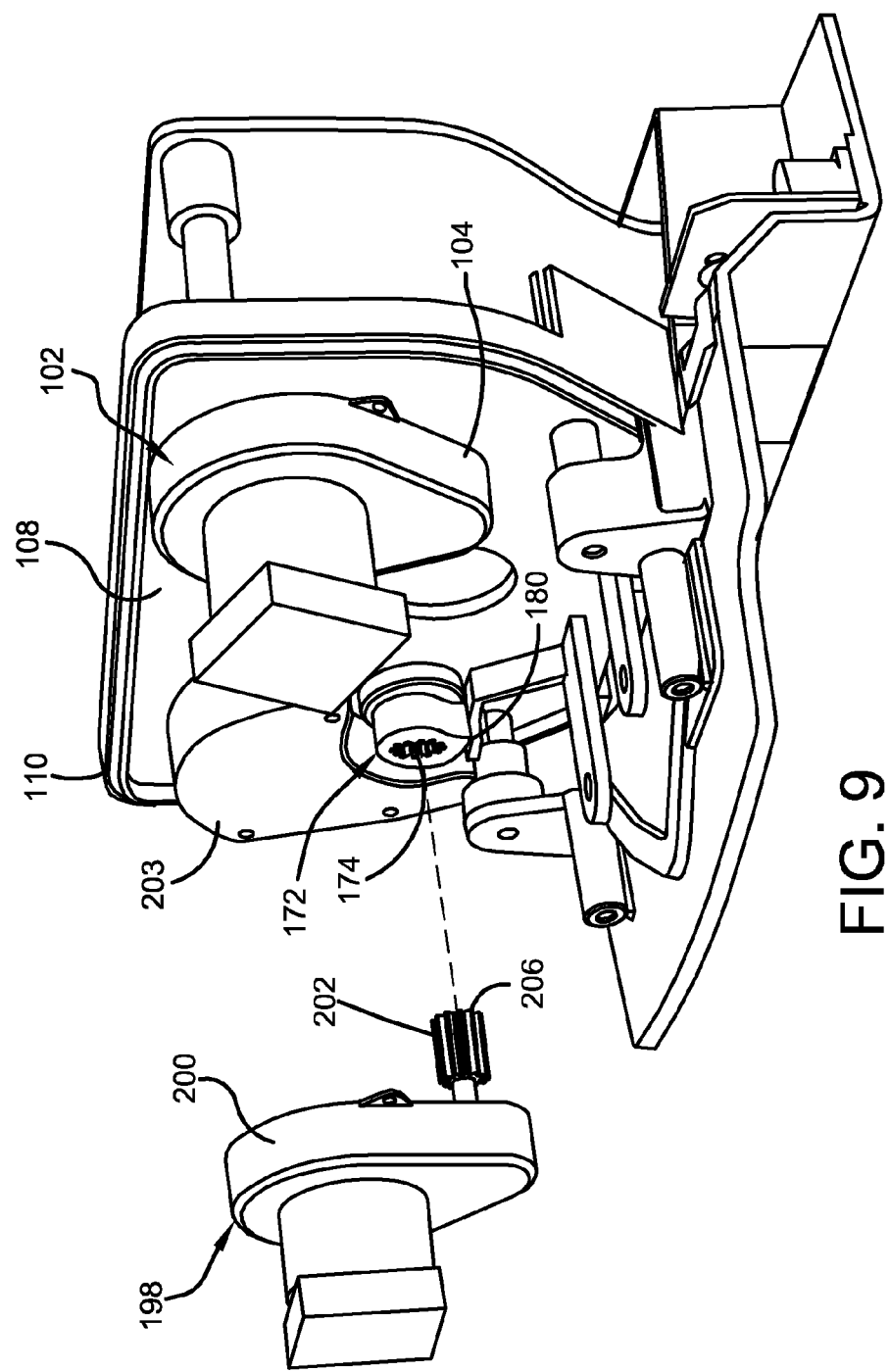
FIG. 9 is a rear and left perspective view of the portion of the water system of FIG. 8.
Figure 10:
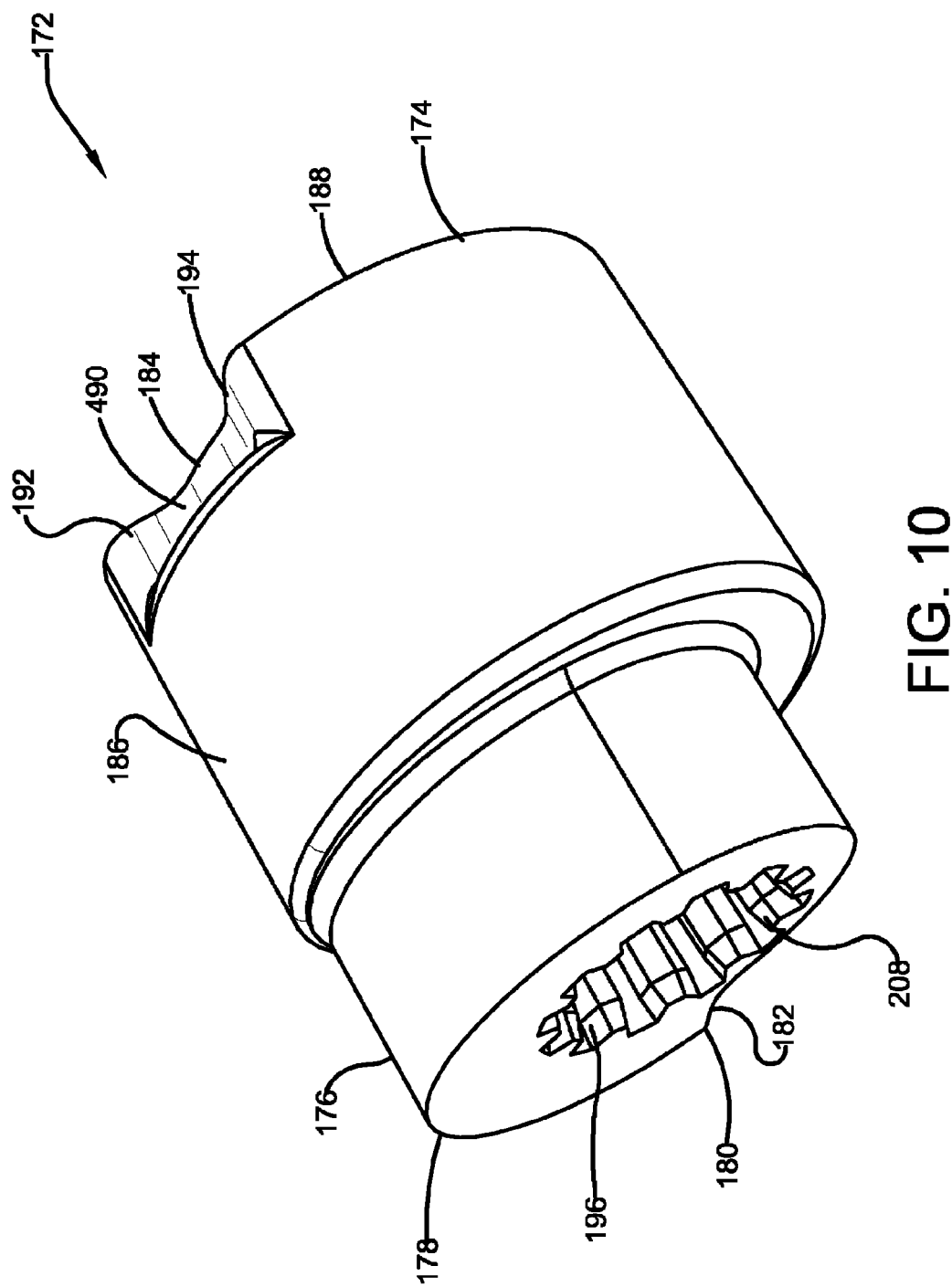
FIG. 10 is a rear perspective view of a cam of the water softener system of FIGS. 1-5.

As seen in FIGS. 8-10, the drive assembly 170 includes a cam 172 that includes a cylindrical base 174 and a generally cylindrical head 176. The head 176 is coaxial with the base 174 and is of smaller size than the base 174. The head 176 includes a peripheral end 178 that gradually extends radially outwardly in the circumferential direction to define a radially extending cam projection 180. The cam projection 180 includes a concavely curved trailing end 182 (as viewed in the clockwise direction of FIG. 8) such that the cam projection 180 is hook shaped. As best seen in FIG. 10, the base 174 includes a recess 184 formed in a body 186 of the base 174 adjacent a forward axial end 188. The recess 184 is defined by a bottom face 190 (as viewed in FIG. 10) and opposite side faces 192, 194 that angle outwardly and upwardly with respect to the bottom face 190. The cam 172 includes a toothed axial bore 196 extending through the center of the cam 172. The drive assembly 170 further includes an electric motor 198 as depicted in FIGS. 7-9. The motor 198 may be a reversible DC motor or any type that has variable torque. Alternatively, the motor 198 may be an asynchronous AC motor or a stepper motor. As shown in FIG. 9, the motor 198 includes a casing 200 and a rotary output member such as a pinion 202. The motor casing 200 is mounted to a drive mount 203 via screws 204 (FIG. 7) that is in turn mounted the rear side 108 of the back plate 110 such that the pinion 202 extends into the bore 196 of the cam 172. The pinion 202 includes teeth 206 that meshingly engage the teeth 208 (FIG. 10) of the bore 196 of the cam 172.

Figure 19:
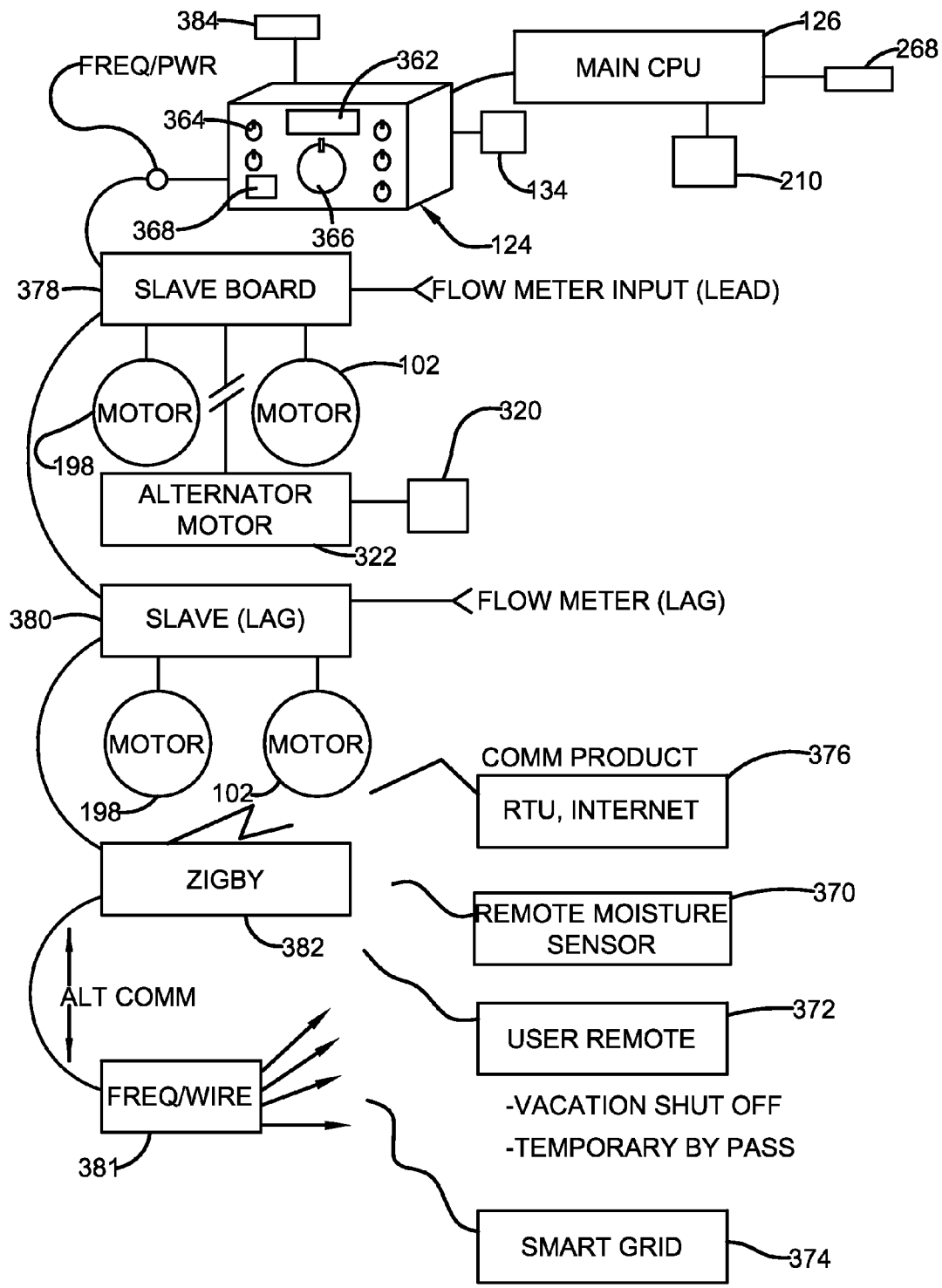
FIG. 19 is a schematic block diagram illustrating an electronic platform of a water softener system.

Energization of the motor 198 causes the pinion 202 to rotate, which in turn rotates the cam 172 in the clockwise direction (as viewed in FIGS. 1-5 and 20-29) such that the cam projection 180 can engage or cam against the upper end of the valve stem 148 and moves the valve stem 148 down in the open position of the brine valve 140. Continued rotation of the cam 172 in the clockwise direction will disengage the cam projection 180 from the upper end of the valve stem 148 to allow the spring 164 to urge the valve stem 148 upwardly back into the closed position of the brine valve 140. The motor 198 may include control circuitry that controls the rotational speed and other aspects of the motor. The motor 198 could also reverse the rotation of the pinion and cause rotation of the cam 172 in the counterclockwise direction. As seen in FIG. 8, a microswitch 210 is mounted to front side 212 of the back plate 110 adjacent the base 174 of the cam 172. The microswitch 210 includes a push button 214 that is extended into the recess 184 when the cam projection 180 engages the valve stem 148 to move the brine valve 140 downward in the open position. The push button 214 is depressed by the cam 172 when the push button 214 is located out of the recess 184 and the cam projection 180 is disengaged from the brine valve 140 such that the brine valve 140 is urged upward by the spring 164 to the closed position. The microswitch 210 is electrically connected to the controller 126 as seen in FIG. 19. When the push button 214 is extended (FIG. 8), the microswitch 210 causes a signal to be sent to the controller 126 indicating that the brine valve 140 is in the closed position. When the push button 214 is depressed, the microswitch 210 causes a signal to be sent to the controller 126 indicating that the brine valve 140 is in the open position. The microswitch 210 may be normally open or normally closed depending on the printed circuit board design requirements. The side faces 192, 194 angle outwardly and upwardly with respect to the bottom face 190 to allow passage of a pushbutton out of the recess 184

Figure 11:
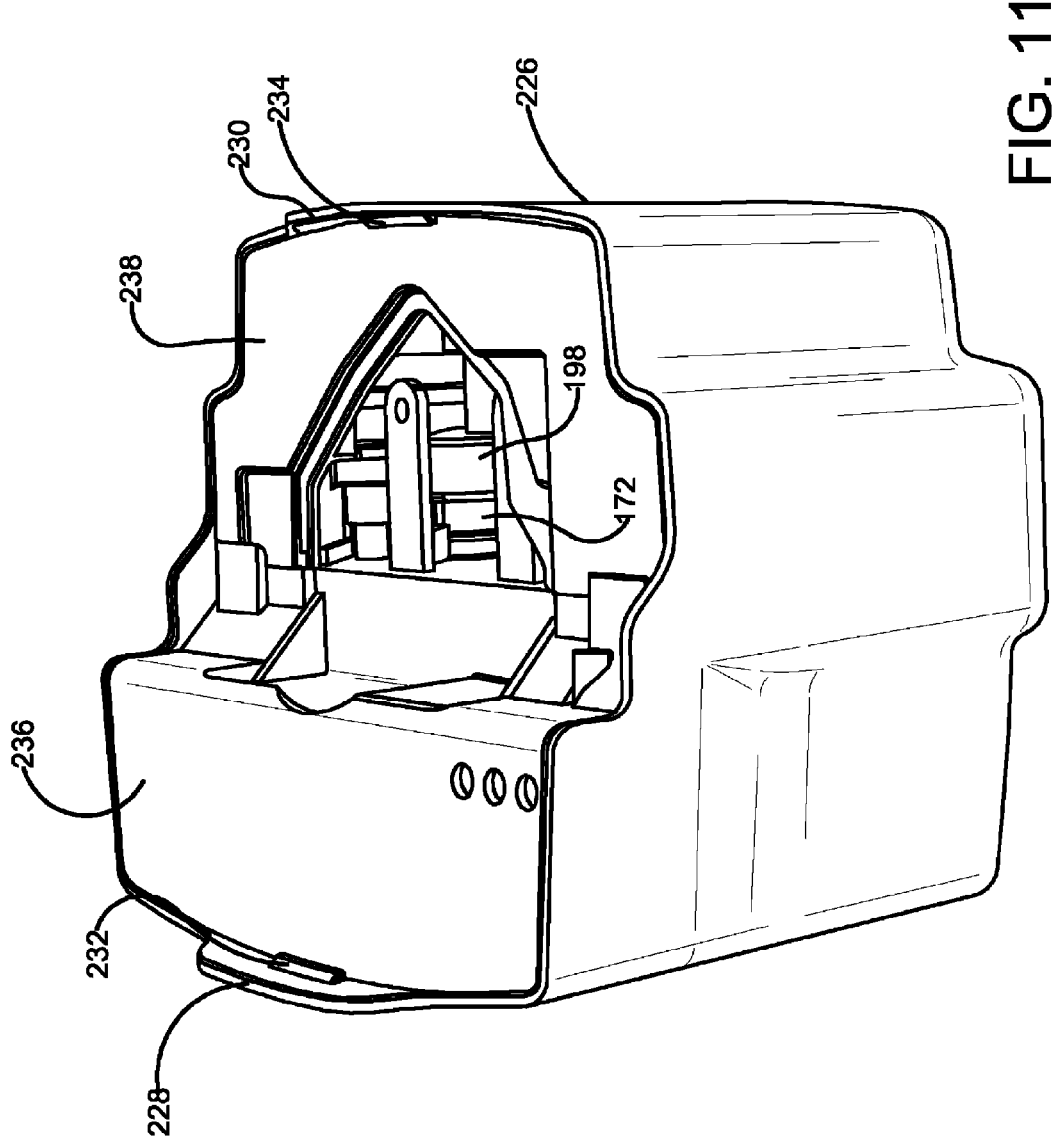
FIG. 11 is a bottom perspective view of a portion of the water softener system of FIGS. 1-5 illustrating a removable cover.

A brine line flow control assembly 216 is provided within brine port 144, which is located between the brine valve 140 and brine line 146. The brine line flow control assembly 216 includes an adapter 218 that is threaded into the brine port 144. The assembly 216 further includes a flow control button 220 that is retained by a retainer 222 and sealed by an O-ring seal 224. Front and rear covers 130, 131 cover the control valve 36, control module 124, and the components that control the control valve 36. Optionally, as seen in FIG. 11, a one piece plastic removable cover 226 may cover the components on the back and front plates 110, 116 (shown in FIG. 8) to protect them from the environment. In particular, the cover 226 may include front and rear plastic tabs 228, 230 formed at its bottom end with inwardly extending projections 232,234. When the cover 226 covers the components, the projections 232, 234 engage the bottom sides of respective horizontal front and back support plates 236, 238, which are provided to support the components. The cover 226 is removed by grasping the tabs 228, 230 and moving them outwardly to disengage the projections 232, 234 from the support plates 236, 238.

Figure 12:
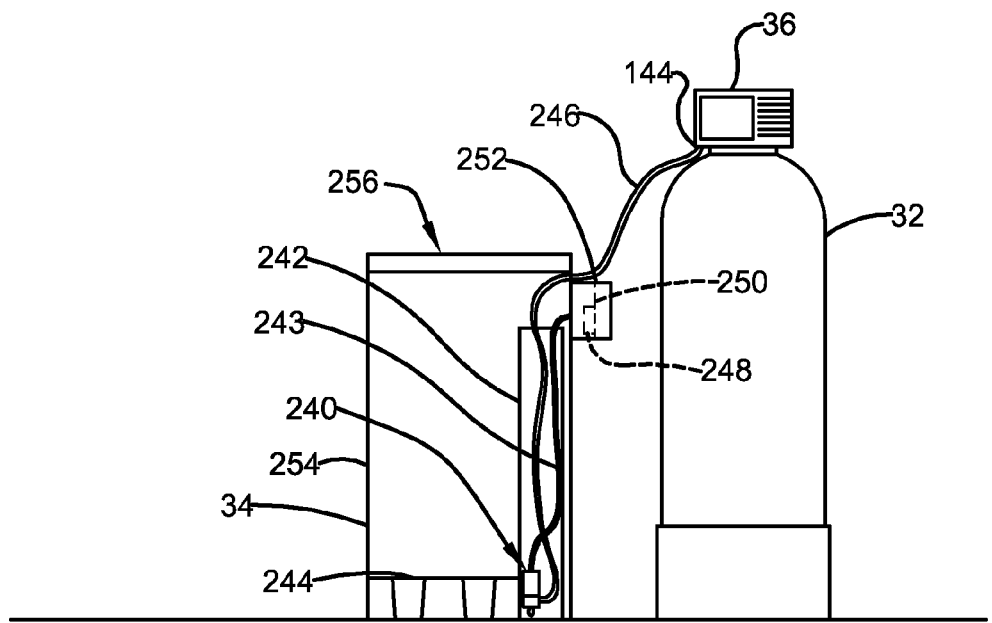
FIG. 12 is a partially cut away schematic side view of the water softener system of FIGS. 1-5.

As seen in FIG. 12, the brine tank 34 may include a pump 240 to pump out the brine or regenerate solution 52 (FIGS. 1-5 and 20-29) from the brine tank 34 to the resin tank 32. Specifically, the pump 240 is inserted into a riser tube 242 that extends upwardly from the bottom 244 of the brine tank 34. The pump 240 is located near the bottom 244 of the brine tank 34 and may be submersed into the brine solution 52. The pump 240 may be of any suitable type such as a gear pump or centrifugal pump. The line 146 (shown in FIG. 1) may comprise a flexible tube 246 that extends from the outlet of the pump 240 through the riser tube 242 and to the brine port 144 of the control valve 36 to transport the brine from the brine tank 34 to the resin tank 32 and also transports treated water from the resin tank 32 to the brine tank 34. A lid 256 covers the top of the brine tank 34. The pump 240 is electrically coupled via a power cord 243 to a controller 248 mounted on a printed circuit board 250 for controlling the output of the pump 240. The controller 248 and circuit board 250 may be provided in a control valve 252 that is mounted to the sidewall 254 of the brine tank. The controller 248 may also monitor the pump current to control when the water is at the air level. This controller 248 may be operatively connected to the control module 124 (shown in FIG. 7). Alternatively, the controller 126 of the control module 124 may be used instead of the controller 248 to control and monitor the pump 240. Alternatively, a pressure switch may be provided to indicate the water level based on the detected pressure. For example, when the pressure switch detects no pressure, there is no water in the tank.

Figure 14:
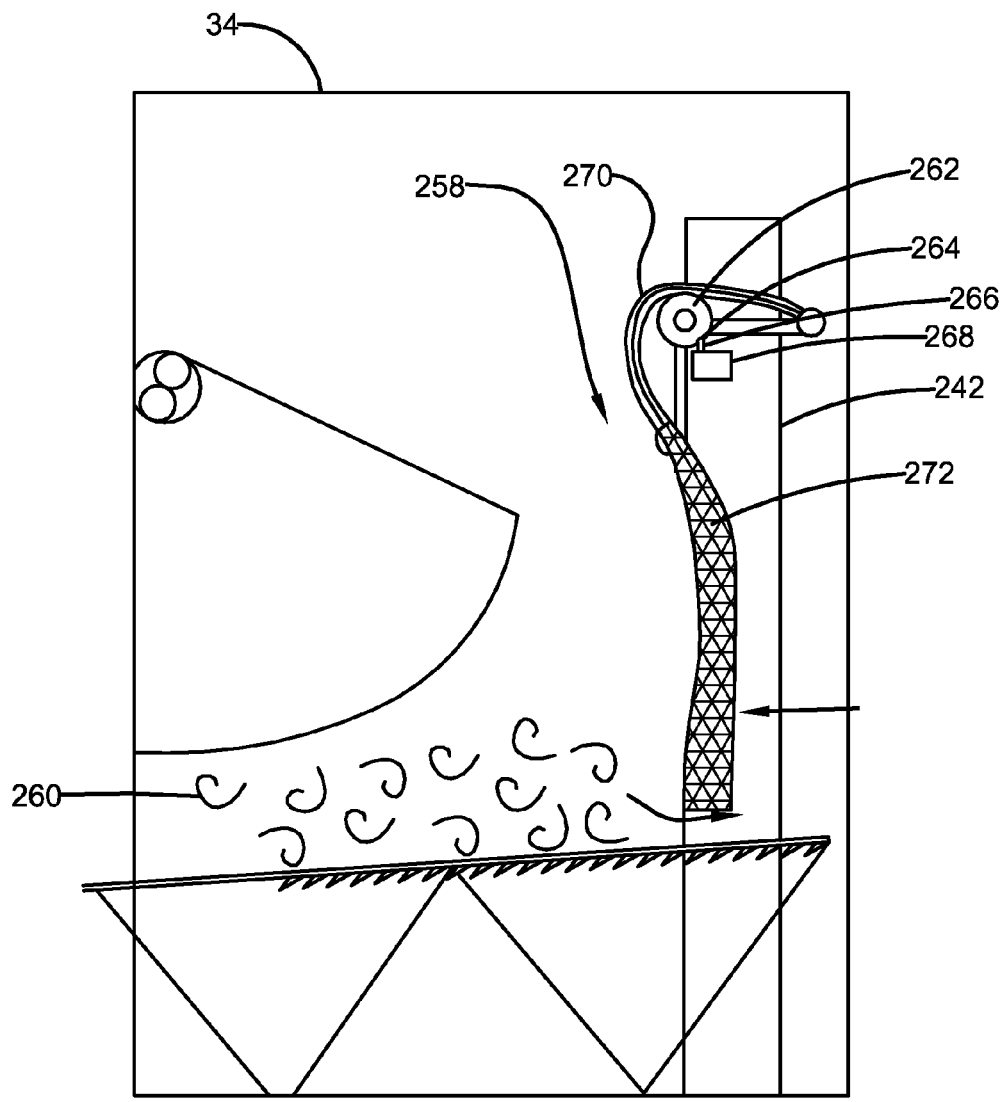
FIG. 14 is a schematic side view of an exemplary arrangement for detecting the salt level in the brine tank of a water softener system.

As seen in FIG. 14, the brine tank 34 may include an indicating arrangement 258 that indicates when the salt 260 in the brine tank 34 needs to be replenished. In particular, the indicating arrangement 258 includes a cam wheel 262 rotatably mounted to the riser tube 242 or tank 34. The cam wheel 262 includes a recess 264 in which a push button 266 of a microswitch 268 extends therein. The microswitch is operatively connected to the controller 126 (shown in FIG. 7). An elastomeric band 270 engages the cam wheel 262 and is connected to a paddle 272. When the salt level is above the bottom of the paddle, the paddle 272 is pushed against the riser tube 242 from the force of the salt that also overcomes the biasing force of the band 270. When the salt level goes below the paddle 272, the biasing force of the band 270 causes the cam wheel 262 to rotate the wheel 262 clockwise until the push button 266 of the microswitch 268 moves out of the recess 264 and is depressed by the cam wheel 262. The pressing of the push button 266 causes a signal to be sent to the controller 126 indicating that the salt needs to be replenished.

The operation of the water softener 30 will now be discussed. Referring to FIG. 1, the control valve 36 is in the service position in which the untreated water inlet orifice 274 is in fluid communication with the top opening 54 of the resin tank 32, and the distribution tube 55 of the resin tank 32 is in fluid communication with the treated water outlet orifice 276. The brine valve 140 is in the closed position blocking fluid from entering or exiting the brine tank 34. In this closed position, the upper end of the valve stem 148 is located adjacent the trailing end 182 (in the counterclockwise direction as shown in FIG. 10) of the cam projection 180 and is therefore not engaged by the cam projection 180. In this position, the push button 214 (shown in FIG. 8) is not in the recess 184 and depressed by the body 186 of the base 174 of the cam so that the microswitch 210 causes a signal to be sent to the controller 126 indicating that the brine valve 140 is in the closed position. In the service position, the piston 84 (shown in FIG. 1) is in a position to allow treated water to exit the outlet orifice 276. Thus, untreated water flows from the untreated water inlet orifice 274 through the resin tank 32 and then through the distribution tube 55 to the outlet orifice 276 of the valve body 56 and to a treated water line 40.

When the system determines that the ion exchange capacity of the resin bed 48 will be exhausted in a designated period, a regeneration cycle may commence. This decision may be based on the time since the last regeneration cycle and/or sensed usage and/or other factors. To begin a regeneration cycle, the motor 102 for the piston 84 causes the piston 84 to move to the fill position shown in FIG. 2. Also, the motor 198 for the brine valve 140 causes the cam 172 to rotate clockwise until the cam projection 180 engages and moves the valve stem 148 down to open the valve 140 and allow fluid communication with the brine port 144 and the brine tank 34. In this position, the untreated water inlet orifice 274 remains in fluid communication with the top opening 54 of the resin tank 32, and the distribution tube 55 is now in fluid communication with both the treated water outlet orifice 276 and the brine port 144. Thus, treated water flows to both the treated water outlet orifice 276 and into the brine tank 34 thereby filling the brine tank 34 with treated water to dissolve some of the particles such as salt in the brine tank 34, thereby forming regenerant solution 52. In this position too, the push button 214 is extended into the recess 184 so that the microswitch 210 cause a signal to be sent to the controller 126 indicating that the brine valve 140 is in the open position.

Figure 3:
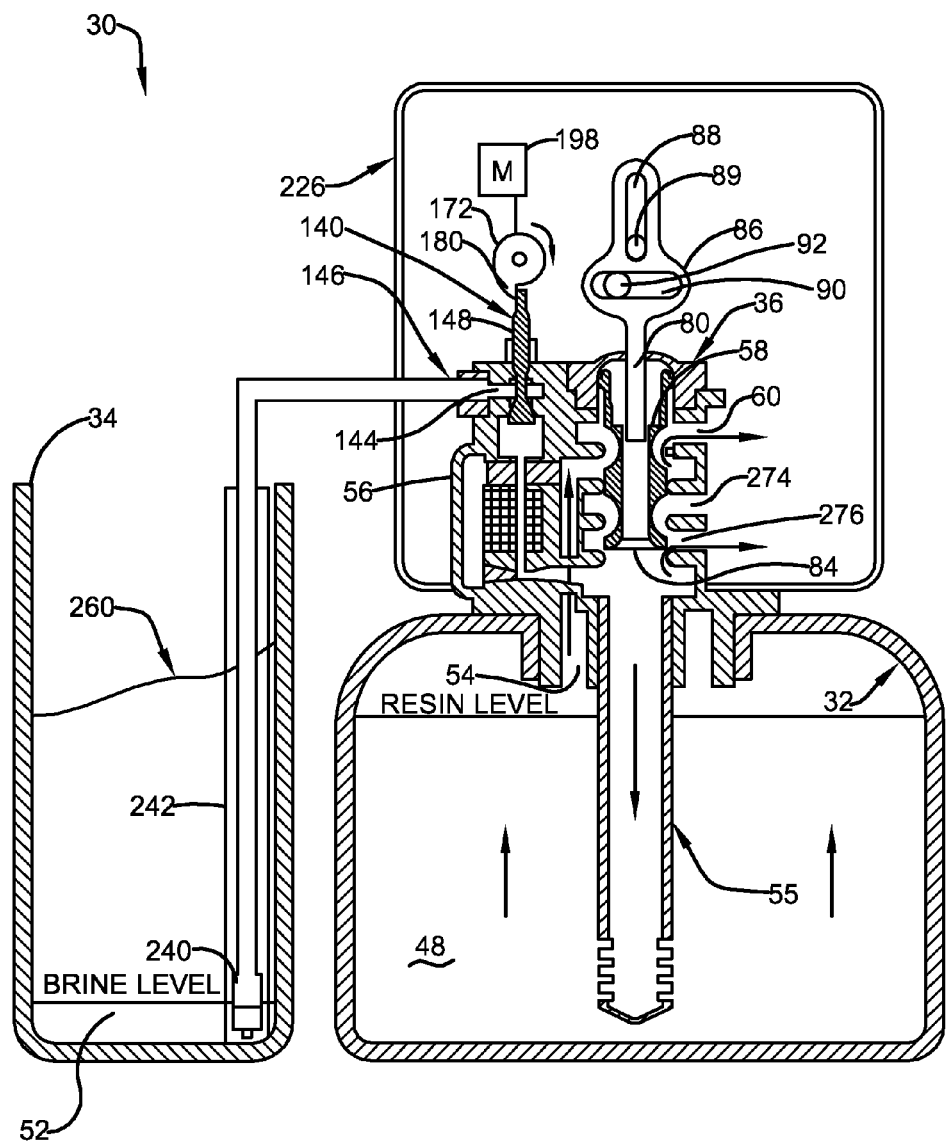

When the fill phase is complete, the motor 102 for the piston 84 causes the piston 84 to move to the backwash position shown in FIG. 3. Also, the motor 198 for the brine valve 140 causes the cam 172 to rotate clockwise until the cam projection 180 is disengaged from the valve stem 148 to place the brine valve 140 in the closed position to prevent fluid from flowing into or out of the brine tank 34. In this position, the top opening 54 of the resin tank 32 is in fluid communication with the drain port 60, and the untreated water inlet orifice 274 is in fluid communication with both the treated water outlet orifice 276 and the distribution tube 55. Thus, untreated water entering from the inlet orifice 274 flows both through the outlet orifice 276 to supply untreated water to the treated water line, and also through the distribution tube 55. The untreated water flows down through the distribution tube 55 and up through the resin bed 48 and out the drain port 60 to flush trapped particulate matter from the resin bed 48. In this position, the push button 214 (shown in FIG. 8) is not in the recess and is depressed by the cam so that the microswitch 210 causes a signal to be sent to the controller 126 indicating that the brine valve 140 is in the closed position.

Figure 4:
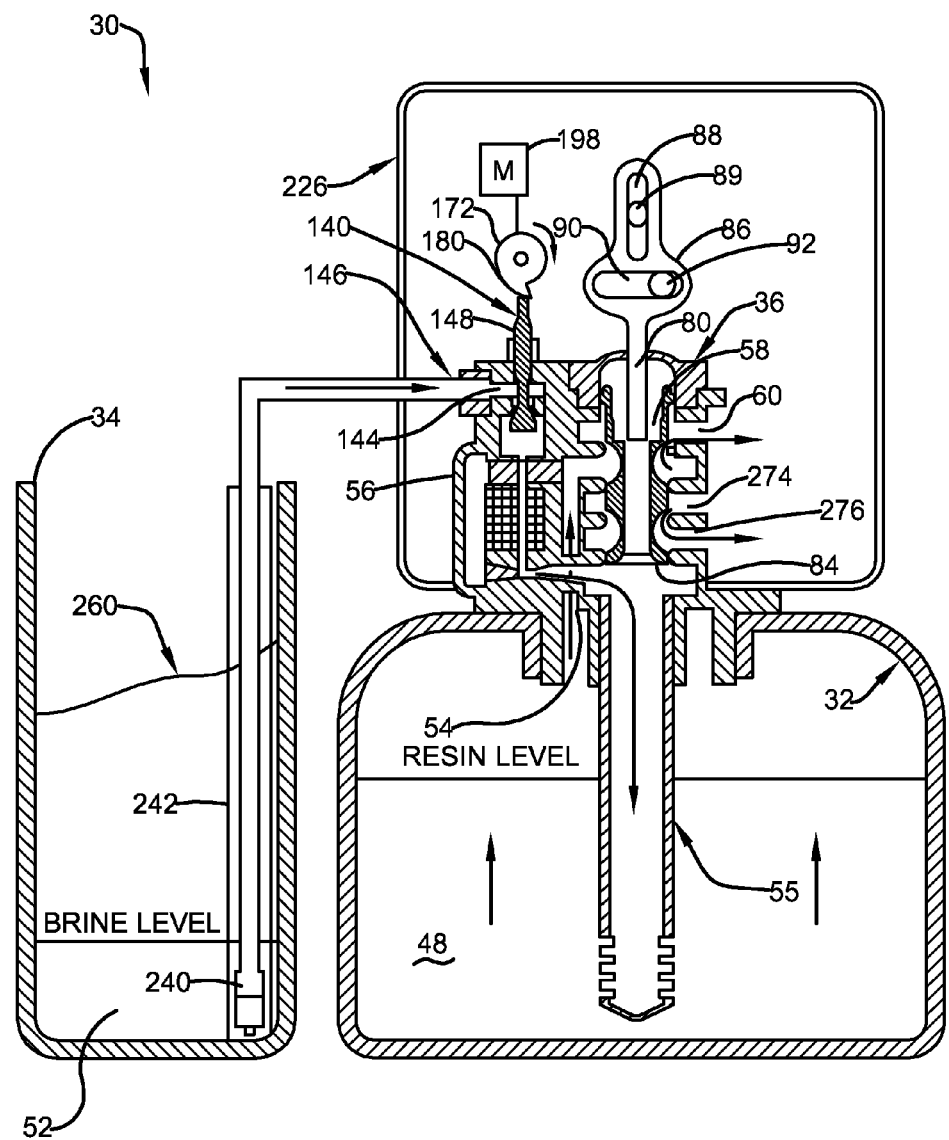

After the back wash phase, the motor 102 for the piston 84 causes the piston 84 to move to the regenerate position shown in FIG. 4. Also, the motor 198 for the brine valve 140 causes the cam 172 to rotate clockwise until the cam projection 180 engages and moves the valve stem 148 down to open the brine valve 140 and allow fluid communication with the brine port 144 and brine tank 34. In this position, the untreated water inlet orifice 274 is in fluid communication with the treated water outlet orifice 276, the brine port 144 is in fluid communication with the distribution tube 55, and the top opening 54 of the resin tank 32 is in fluid communication with the drain port 60. In this position, the pump 240 pumps brine 52 from the brine tank 34 through the brine port and through the distribution tube 55. The brine 52 goes down through the distribution tube 55 and then up through the resin bed 48 and then through the tank opening 54 to the drain port 60, thereby flushing the resin tank 32 with the regenerate solution to regenerate the resin bed 48 by replacing objectionable ions such as calcium ions in the exhausted resin bed 48 with less objectionable ions such as sodium ions. This operation is called upflow regeneration since the brine 52 flows first through the distribution tube 55 and then up through the resin bed 48 and the top opening 54 of the resin tank 32 and then to the drain port 60. In this position too, the push button 214 is extended so that the microswitch 210 causes a signal to be sent to the controller 126 indicating that the brine valve 140 is in the open position.

Figure 5:
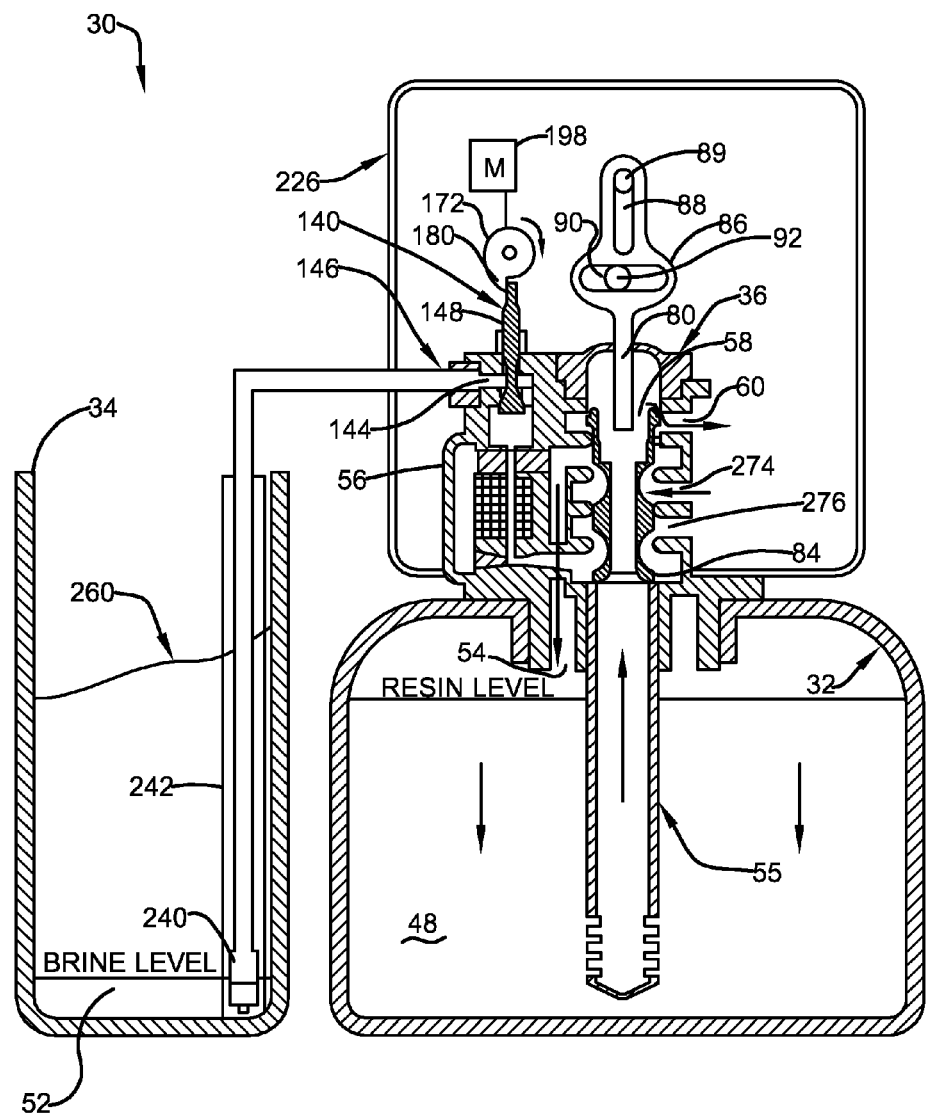

After the regeneration phase of the cycle is complete, the motor 102 causes the piston 84 to move to the rapid rinse position seen in FIG. 5. Also, the motor 198 for the brine valve 140 causes the cam 172 to rotate clockwise until the cam projection 180 is disengaged from the valve stem 148 to place the brine valve 140 in the close position to prevent fluid from flowing into or out of the brine tank 34. In this position, the untreated water inlet orifice 274 is connected to the treated water outlet orifice 276 and the top opening 54 of the resin tank 32. The distribution tube 55 is connected to the drain port 60, thereby rinsing the resin tank 32 with untreated water to remove the regenerant solution 52 from the resin tank 32. The resin bed 48 is now fully-regenerated and ready to resume water treatment. In this position too, the push button 214 (shown in FIG. 8) is depressed so that the microswitch 210 causes a signal to be sent to the controller 126 indicating that the brine valve 140 is in the closed position. The motor 102 for the piston 84 then causes the piston 84 to move back to the service position and the motor 198 for the brine valve 140 causes the brine valve 140 to be in the service position as shown in FIG. 1 to resume normal operation of the water softener.

In another exemplary embodiment, brine is supplied to the resin bed 48 in a manner that greatly increases the efficiency of regeneration. In this exemplary embodiment, the resin bed 48 is only backwashed periodically on spaced intervals instead of every regeneration cycle. For example, the resin bed 48 may be backwashed every fifth regeneration cycle. This interval for the back wash may vary depending on the pretreatment of the untreated water. This periodic backwash allows the resin bed 48 to be more efficient, since it is not disturbed by a backwash cycle each time it is regenerated.

In this exemplary embodiment, the cycle begins with the brine line being opened and the brine tank 34 being filled with an amount of untreated water to make a minimum amount of saturated brine that would match the theoretical amount of saturated brine that would regenerate the given amount of resin if very high efficiency levels were achieved. After several hours of saturation have elapsed, the brine is pumped by the pump 240 into the bottom of the resin tank 32 to slowly displace the existing water around the resin bed 48 with brine that is immediately being diluted by the treated water. The brine is allowed to reside around the resin bed 48 for a period of time to commence the ion exchange process. The controller 126 then operates the components of the water softener to cause a controlled amount of treated water to flow into the brine tank 34 that will be immediately pumped into the resins tank 32 before it can dissolve any amount of salt. As the brine enters the resin bed area it will completely surround the resin bed 48 with a now diluted brine that is diluted to the most effective concentration for an efficient regeneration. A greatly shortened final rinse is then initiated to remove the transfer byproducts. The water is reduced because the free board area above the resin is not contaminated with calcium and brine as it is in the previously mentioned brining method. This also contributes to a reduced water use.

Figure 20:
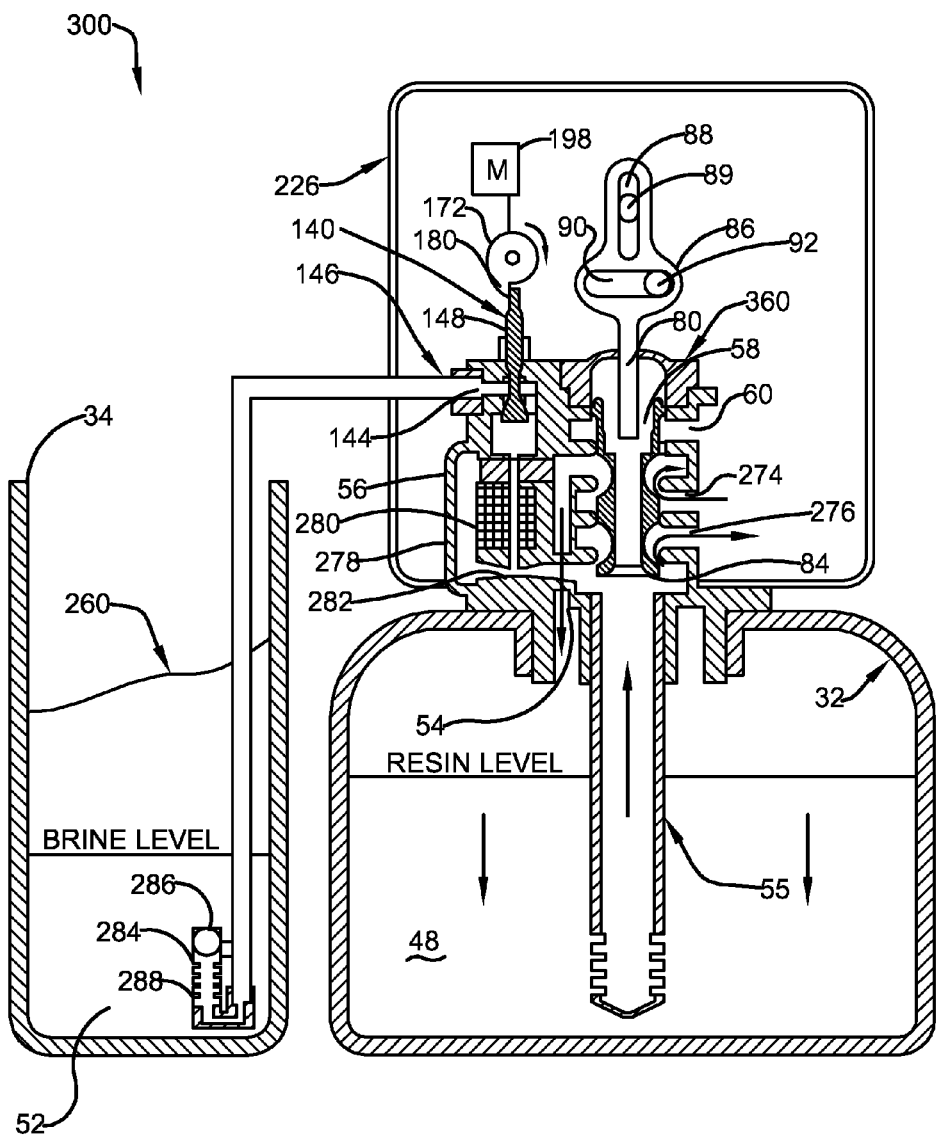
FIGS. 20-24 is a cross sectional view of another exemplary embodiment of a water softener system at various phases of the operation.
Figure 21:
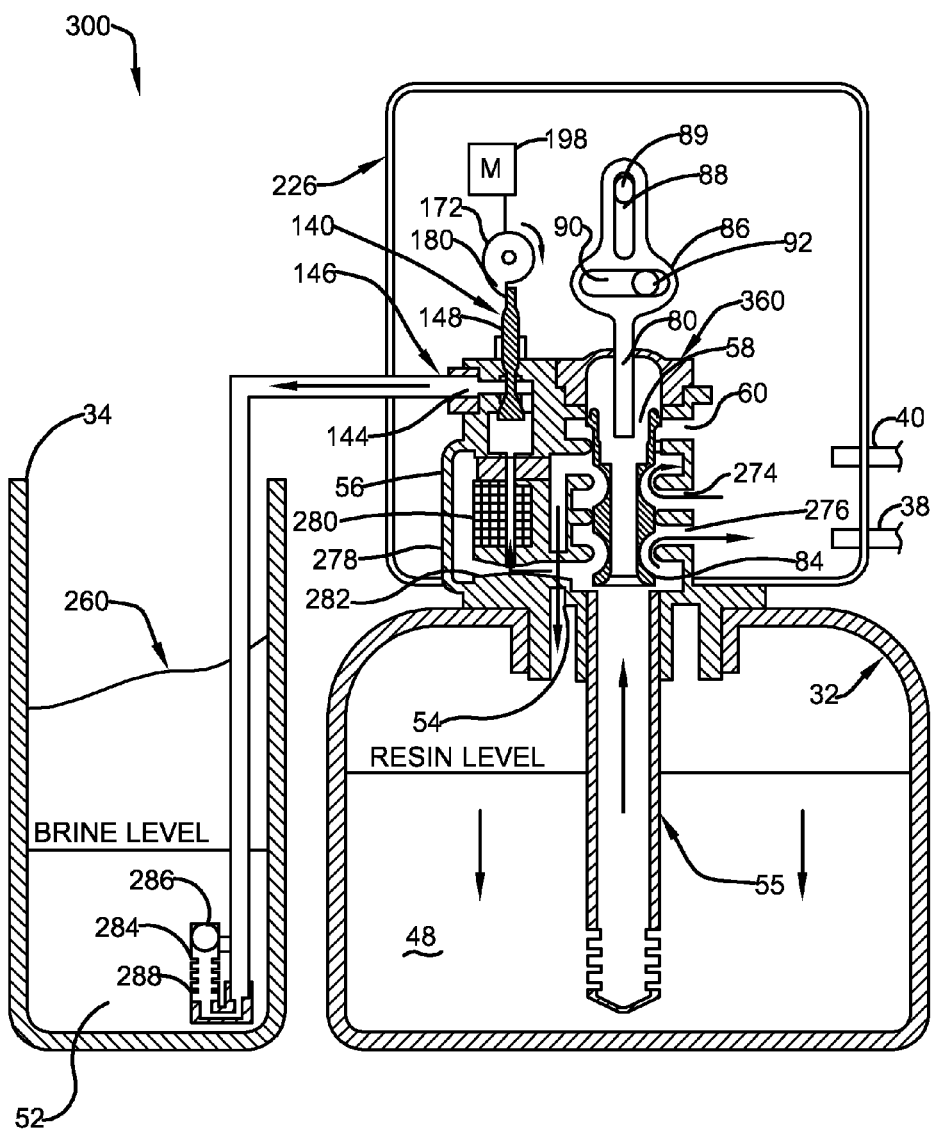

In another exemplary embodiment, a venturi type injector 278 may be used instead of the pump to draw brine from the brine tank 34 in to the resin tank 32. Such an arrangement is shown in FIG. 20-24, which illustrate the operation of another example embodiment of a water softener 300. In this exemplary embodiment, the same reference numbers are used for elements that are similar in construction and function as that of the water softener 30 of the previous embodiment. In particular, the injector 278 is provided in the control valve 360. The injector 278 includes a control valve 280 and venturi nozzle 282 in which untreated water flows therethrough to draw brine from the brine tank 34 into the resin tank 32. The operation of this water softener is as follows. Referring to FIG. 20, the control valve 360 is in the service position in which the untreated water inlet orifice 274 is in fluid communication with the top opening 54 of the resin tank 32, and the distribution tube 55 of the resin tank 32 is in fluid communication with the treated water outlet orifice 276. The brine valve 140 is in the closed position blocking fluid from entering or exiting the brine tank 34. In this closed position, the upper end of the valve stem 148 is located adjacent the trailing end 182 (in the counterclockwise direction) of the cam projection 180 and is therefore not engaged by the cam projection 180. In this position, the push button 266 is not in the recess 184 and depressed by the body 186 of the base 174 of the cam 172 so that the microswitch 210 causes a signal to be sent to the controller 126 indicating that the brine valve 140 is in the closed position. In the service position, the piston 84 is in a position to allow treated water to exit the outlet orifice 276. Thus, untreated water flows from the untreated water inlet orifice 274 through the resin tank 32 and then through the distribution tube 55 to the outlet orifice 276 of the valve body 56 and to a treated water line 40 shown in FIG. 20.

When the system determines that the ion exchange capacity of the resin bed 48 will be exhausted in a designated period, a regeneration cycle may commence. This decision may be based on the time since the last regeneration cycle and/or sensed usage and/or other factors. To begin a regeneration cycle, the motor 102 for the piston 84 causes the piston 84 to move to the fill position shown in FIG. 21. Also, the motor 198 for the brine valve 140 causes the cam 172 to rotate clockwise until the cam projection 180 engages and moves the valve stem 148 down to open the valve 140 and allow fluid communication with the brine port 144 and the brine tank 34. In this position, the untreated water inlet orifice 274 remains in fluid communication with the top opening 54 of the resin tank 32, and the distribution tube 55 is now in fluid communication with both the treated water outlet orifice 276 and the brine port 144. Thus, treated water flows to both the treated water outlet orifice 276 and into the brine tank 34 thereby filling the brine tank 34 with treated water to dissolve some of the particles such as salt in the brine tank 34, thereby forming regenerant solution 52. In this position too, the push button 214 is extended into the recess 184 so that the microswitch 210 cause a signal to be sent to the controller 126 indicating that the brine valve 140 is in the open position.

Figure 22:
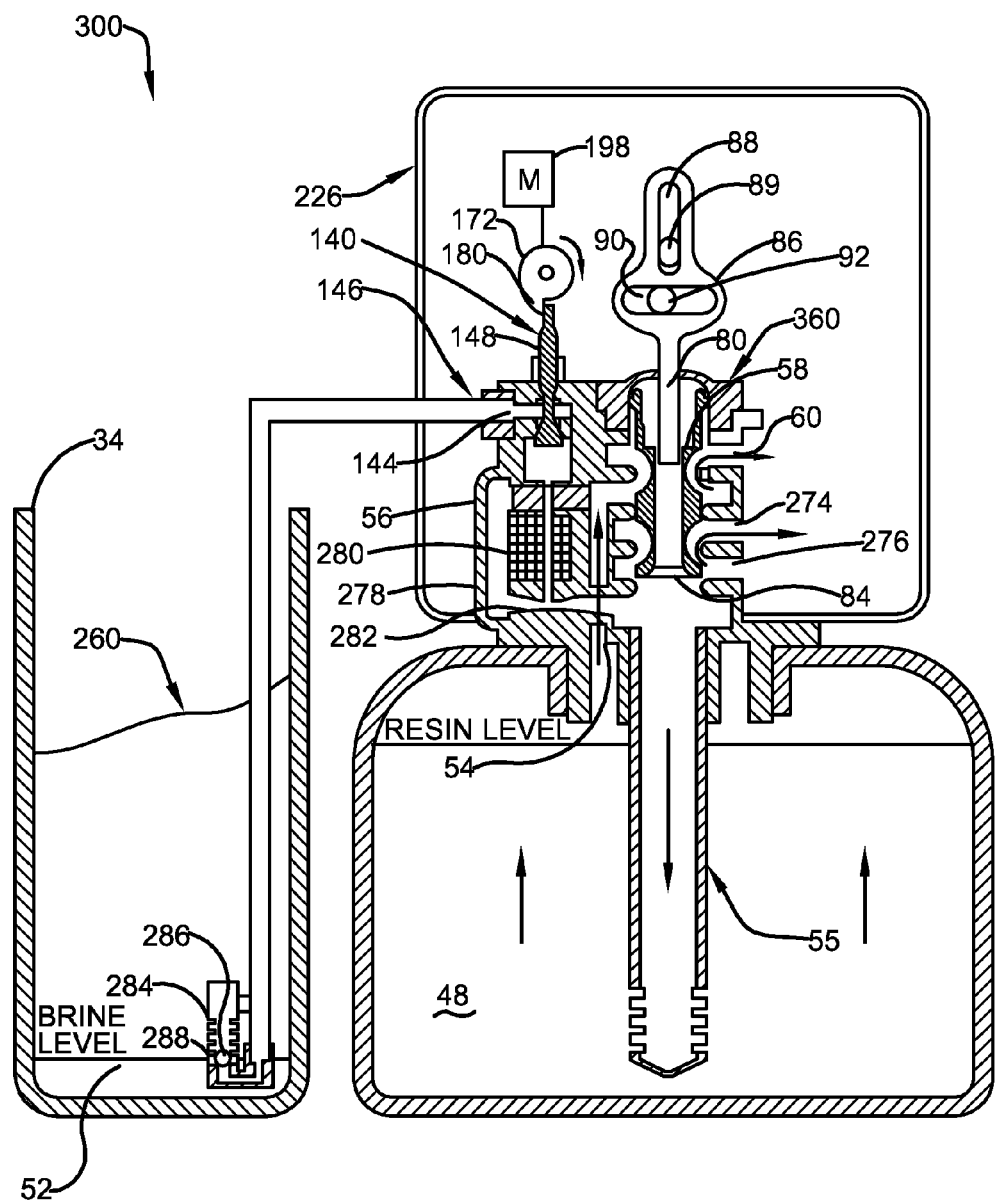

When the fill phase is complete, the motor 102 for the piston 84 causes the piston 84 to move to the backwash position shown in FIG. 22. Also, the motor 198 for the brine valve 140 causes the cam 172 to rotate clockwise until the cam projection 180 is disengaged from the valve stem 148 to place the brine valve 140 in the closed position to prevent fluid from flowing into or out of the brine tank 34. In this position, the top opening 54 of the resin tank 32 is in fluid communication with the drain port 60, and the untreated water inlet orifice 274 is in fluid communication with both the treated water outlet orifice 276 and the distribution tube 55. Thus, untreated water entering from the inlet orifice 274 flows both through the outlet orifice 276 to supply untreated water to the treated water line, and also through the distribution tube 55. The untreated water flows down through the distribution tube 55 and up through the resin bed 48 and out the drain port 60 to flush trapped particulate matter from the resin bed 48. In this position, the push button is not in the recess and is depressed by the cam so that the microswitch 210 causes a signal to be sent to the controller 126 indicating that the brine valve 140 is in the closed position.

Figure 23:
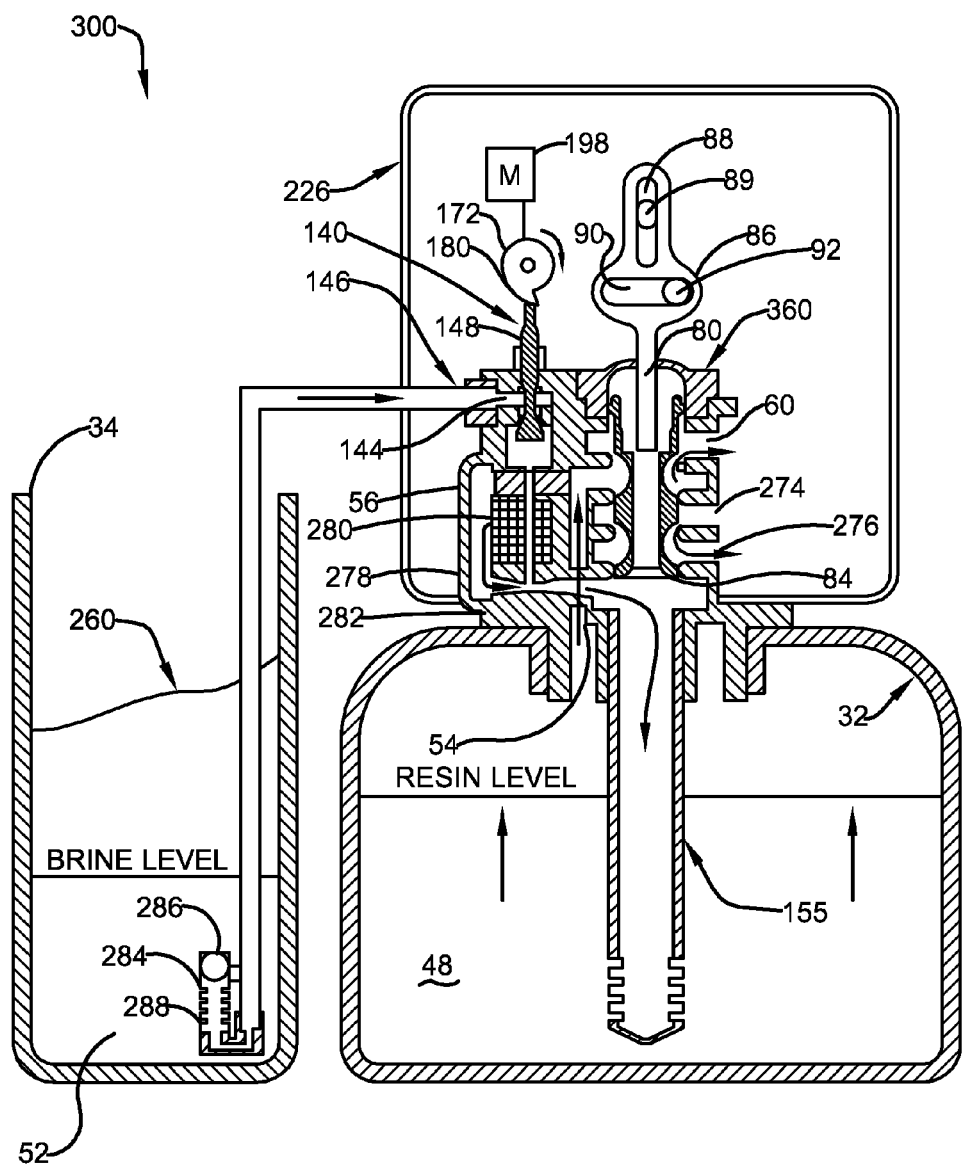

After the back wash phase, the motor 102 for the piston 84 causes the piston 84 to move to the regenerate position shown in FIG. 23. Also, the motor 198 for the brine valve 140 causes the cam 172 to rotate clockwise until the cam projection 180 engages and moves the valve stem 148 down to open the brine valve 140 and allow fluid communication with the brine port 144 and brine tank 34. In this position, the untreated water inlet orifice 274 is in fluid communication with the treated water outlet orifice 276, the brine port 144 is in fluid communication with the distribution tube 55 and untreated water inlet orifice 274, and the top opening 54 of the resin tank 32 is in fluid communication with the drain port 60. In this position, the untreated water enters the inlet orifice 274 and flows into injector control valve 280 and through the injector nozzle 282 to draw brine from the brine tank into the distribution tube 55. The brine 52 goes down through the distribution tube 55 and then up through the resin bed 48 and then through the tank opening 54 to the drain port 60, thereby flushing the resin tank 32 with the regenerate solution to regenerate the resin bed 48 by replacing objectionable ions such as calcium ions in the exhausted resin bed 48 with less objectionable ions such as sodium ions. As discussed previously, this operation is called upflow regeneration since the brine 52 flows first through the distribution tube 55 and then up through the resin bed 48 and the top opening 54 of the resin tank 32 and then to the drain port 60. In this position too, the push button 214 is extended so that the microswitch 210 causes a signal to be sent to the controller 126 indicating that the brine valve 140 is in the open position.

Figure 24:
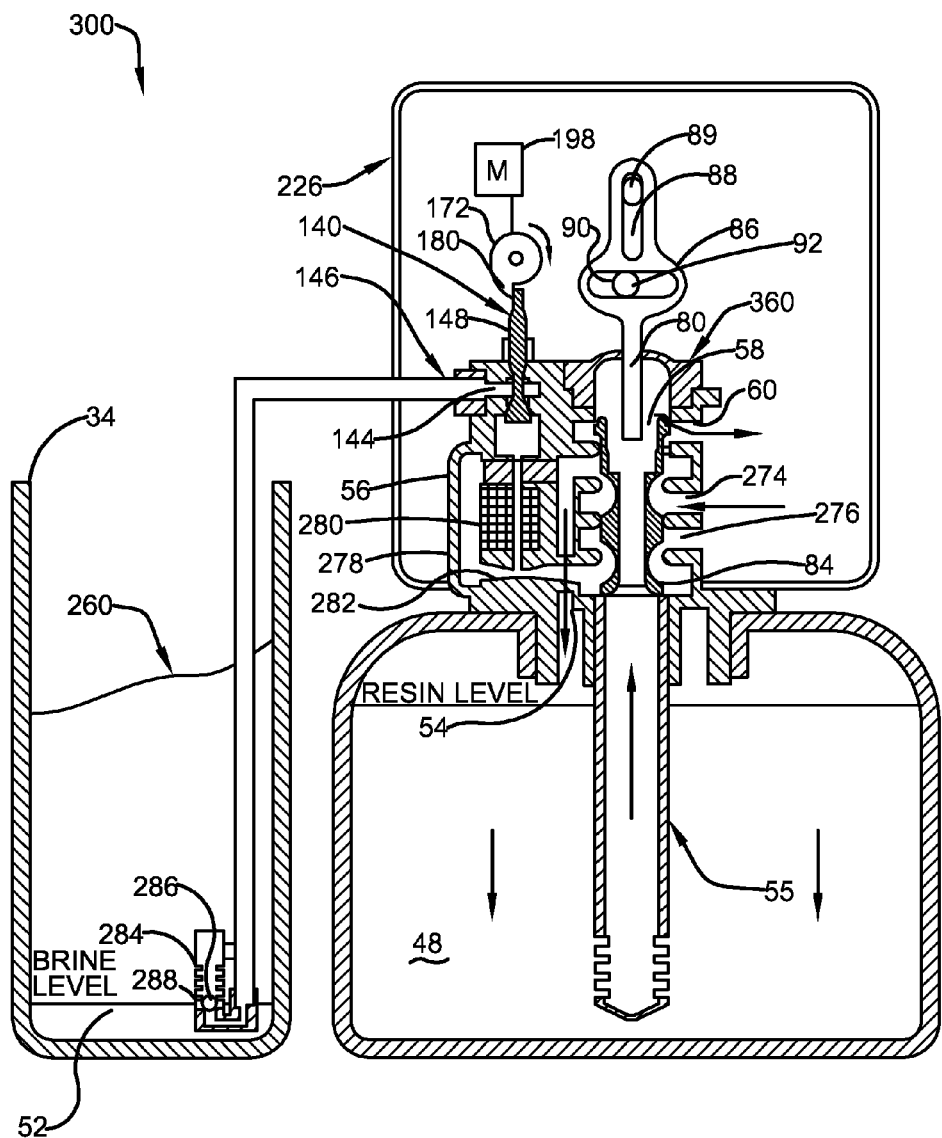

After the regeneration phase of the cycle is complete, the motor 102 causes the piston 84 to move to the rapid rinse position seen in FIG. 24. Also, the motor 198 for the brine valve 140 causes the cam 172 to rotate clockwise until the cam projection 180 is disengaged from the valve stem 148 to place the brine valve 140 in the closed position to prevent fluid from flowing into or out of the brine tank 34. In this position, the untreated water inlet orifice 274 is connected to the treated water outlet orifice 276 and the top opening 54 of the resin tank 32. The distribution tube 55 is connected to the drain port 60, thereby rinsing the resin tank 32 with untreated water to remove the regenerant solution 52 from the resin tank 32. The resin bed 48 is now fully-regenerated and ready to resume water treatment. In this position too, the push button 214 is depressed so that the microswitch 210 causes a signal to be sent to the controller 126 indicating that the brine valve 140 is in the closed position. The motor 102 for the piston 84 then causes the piston 84 to move back to the service position and the motor 198 for the brine valve 140 causes the brine valve 140 to be in the service position as shown in FIG. 20 to resume normal operation of the water softener. In the embodiment incorporating the venturi type injector, an air check arrangement 284 may be provided to indicate the brine level. The air check arrangement 284 may include a ball float 286 provided in a tube 288, which is in fluid communication with the brine line at the bottom of the brine tank 34.

FIGS. 25-29 show another exemplary embodiment in which water softener 400 may be configured to incorporate downflow regeneration in which the brine 52 flows first down through the top opening 54 and the resin bed 48 and then up through the distribution tube 55 and then up through the resin bed 48 and the top opening 54 of the resin tank 32 and then to the drain port 60. In this exemplary embodiment the piston 484 is configured to be longer than that of the piston 84 of the previous exemplary embodiments. The same reference numbers are used for elements that are similar in construction and function as that of the water softener 30 of the previous embodiment.

Figure 25:
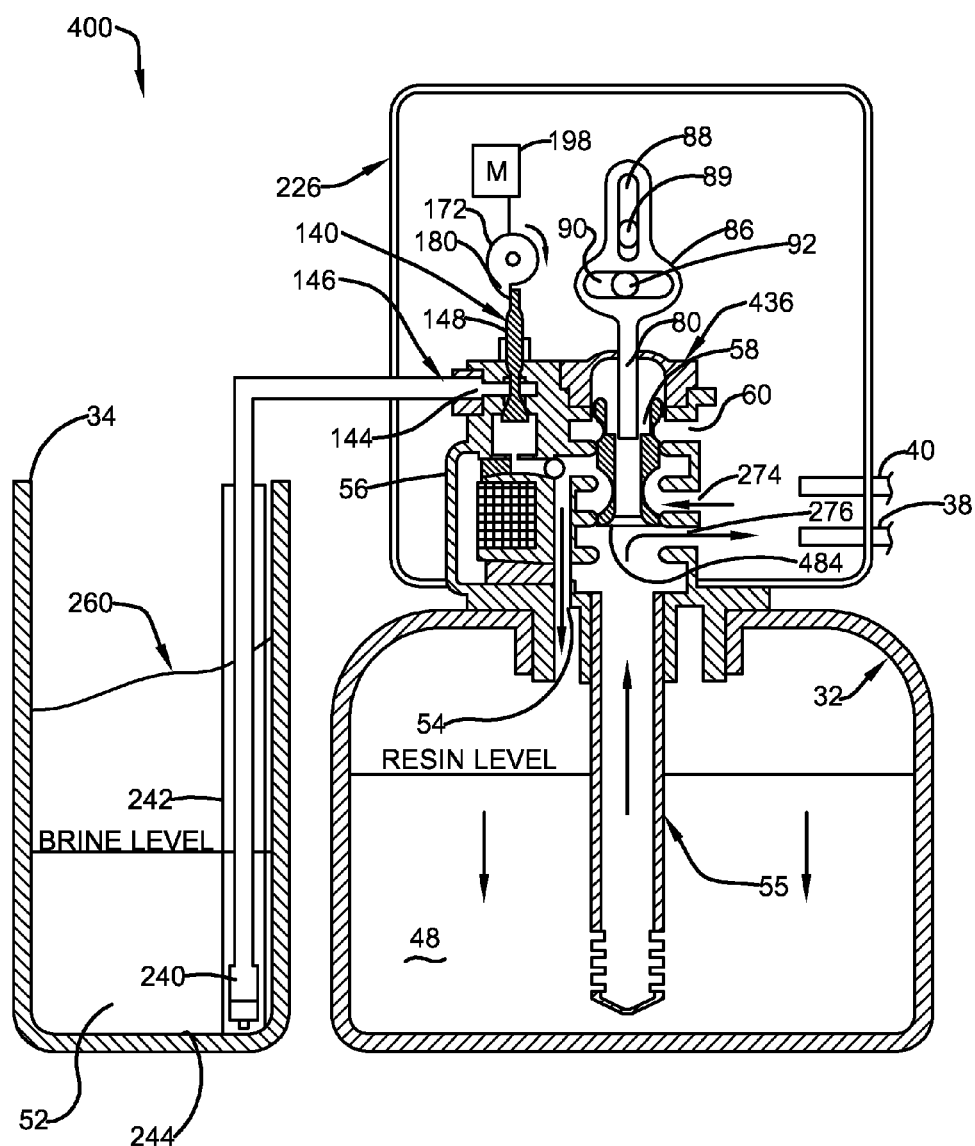
FIGS. 25-29 is a cross sectional view of still another exemplary embodiment of a water softener system at various phases of the operation.
Figure 26:
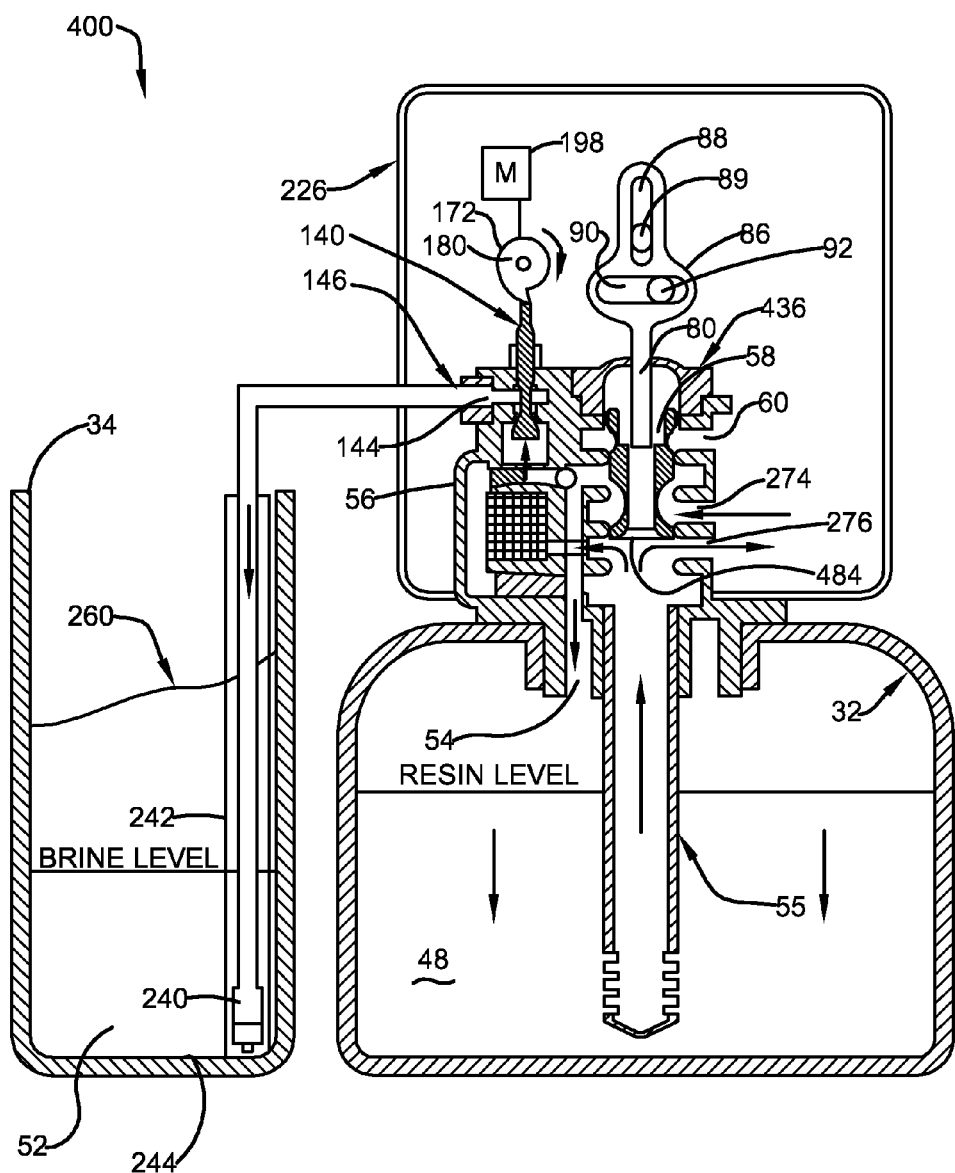

The operation of the water softener 400 will now be discussed. Referring to FIG. 25, the control valve 436 is in the service position in which the untreated water inlet orifice 274 is in fluid communication with the top opening 54 of the resin tank 32, and the distribution tube 55 of the resin tank 32 is in fluid communication with the treated water outlet orifice 276. The brine valve 140 is in the closed position blocking fluid from entering or exiting the brine tank 34. In this closed position, the upper end of the valve stem 148 is located adjacent the trailing end 182 (in the counterclockwise direction) of the cam projection 180 and is therefore not engaged by the cam projection 180. In this position, the push button 266 is not in the recess 184 and is depressed by the body 186 of the base 174 of the cam so that the microswitch 210 causes a signal to be sent to the controller 126 indicating that the brine valve 140 is in the closed position. In the service position, the piston 484 is in a position to allow treated water to exit the outlet orifice 276. Thus, untreated water flows from the untreated water inlet orifice 274 through the resin tank 32 and then through the distribution tube 55 to the outlet orifice 276 of the valve body 56 and to a treated water line 40 (shown in FIG. 25).

When the system determines that the ion exchange capacity of the resin bed 48 will be exhausted in a designated period, a regeneration cycle may commence. This decision may be based on the time since the last regeneration cycle and/or sensed usage and/or other factors. To begin a regeneration cycle, the motor 102 for the piston 484 causes the piston 484 to move to the fill position shown in FIG. 26. Also, the motor 198 for the brine valve 140 causes the cam 172 to rotate clockwise until the cam projection 180 engages and moves the valve stem 148 down to open the valve 140 and allow fluid communication with the brine port 144 and the brine tank 34. In this position, the untreated water inlet orifice 274 remains in fluid communication with the top opening 54 of the resin tank 32, and the distribution tube 55 is now in fluid communication with both the treated water outlet orifice 276 and the brine port 144. Thus, treated water is flows to both the treated water outlet orifice 276 and into the brine tank 34 thereby filling the brine tank 34 with treated water to dissolve some of the particles such as salt in the brine tank 34, thereby forming regenerant solution 52. In this position too, the push button 214 is extended into the recess 184 so that the microswitch 210 causes a signal to be sent to the controller 126 indicating that the brine valve 140 is in the open position.

Figure 27:
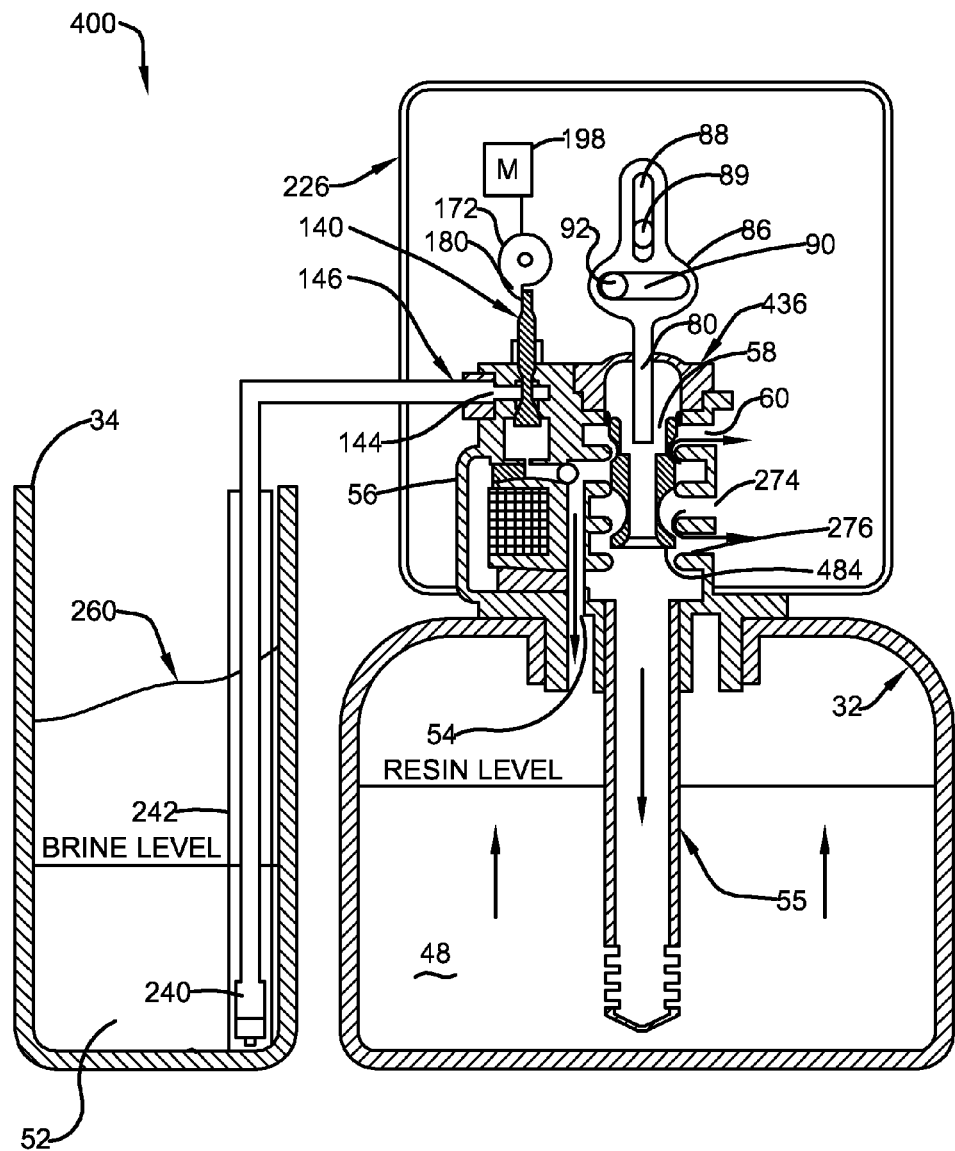

When the fill phase is complete, the motor 102 for the piston 484 causes the piston 484 to move to the backwash position shown in FIG. 27. Also, the motor 198 for the brine valve 140 causes the cam 172 to rotate clockwise until the cam projection 180 is disengaged from the valve stem 148 to place the brine valve 140 in the closed position to prevent fluid from flowing into or out of the brine tank 34. In this position, the top opening 54 of the resin tank 32 is in fluid communication with the drain port 60, and the untreated water inlet orifice 274 is in fluid communication with both the treated water outlet orifice 276 and the distribution tube 55. Thus, untreated water entering from the inlet orifice 274 flows both through the outlet orifice 276 to supply untreated water to the treated water line, and also through the distribution tube 55. The untreated water flows down through the distribution tube 55 and up through the resin bed 48 and out the drain port 60 to flush trapped particulate matter from the resin bed 48. In this position, the push button is not in the recess and is depressed by the cam so that the microswitch 210 causes a signal to be sent to the controller 126 indicating that the brine valve 140 is in the closed position.

Figure 28:
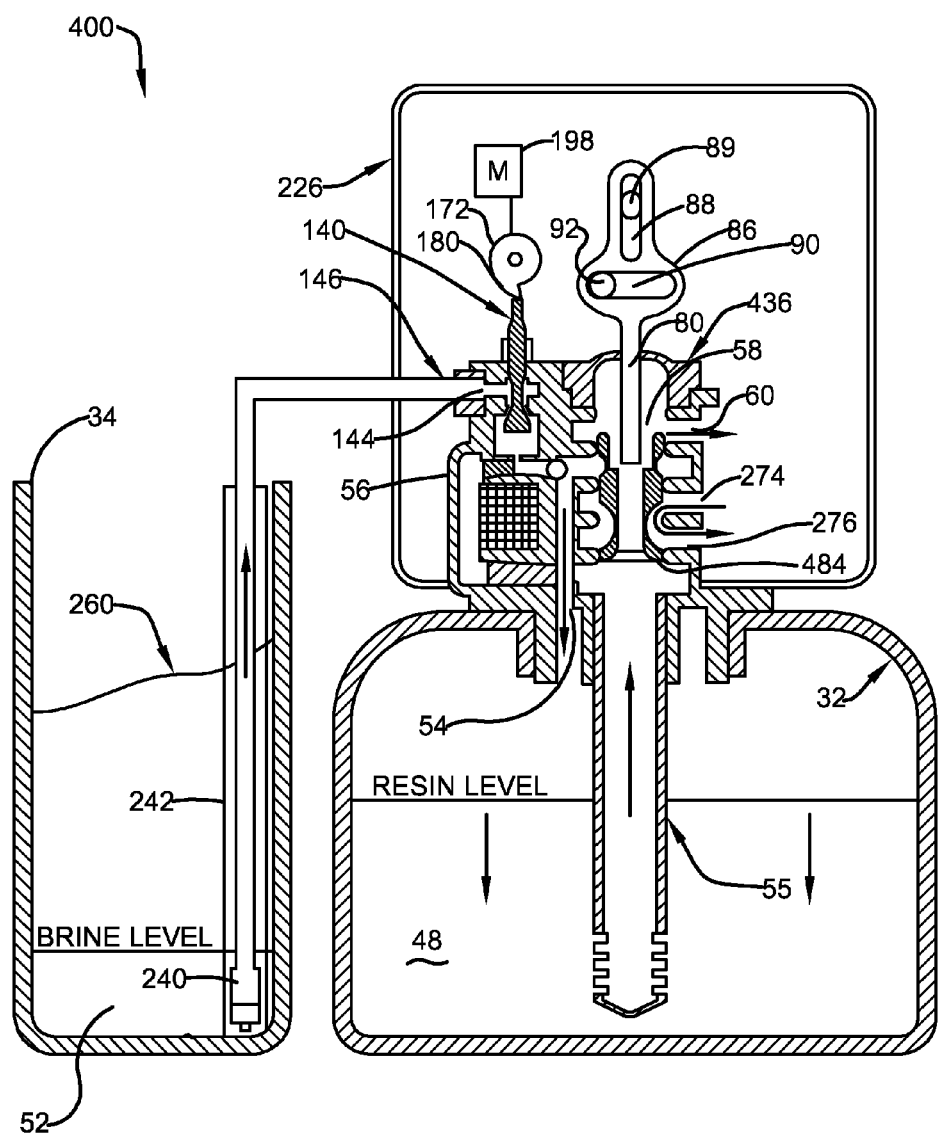

After the back wash phase, the motor 102 for the piston 484 causes the piston 484 to move to the regenerate position shown in FIG. 28. Also, the motor 198 for the brine valve 140 causes the cam 172 to rotate clockwise until the cam projection 180 engages and moves the valve stem 148 down to open the brine valve 140 and allow fluid communication with the brine port 144 and brine tank 34. In this position, the untreated water inlet orifice 274 is in fluid communication with the treated water outlet orifice 276, the brine port 144 is in fluid communication with the distribution tube 55, and the top opening 54 of the resin tank 32 is in fluid communication with the drain port 60. In this position, the pump 240 pumps brine 52 from the brine tank 34 through the brine port and through the distribution tube 55. The brine 52 goes down through the tank opening 54 and resin bed 48 and then up through the distribution tube 55 to the drain port 60, thereby flushing the resin tank 32 with the regenerate solution to regenerate the resin bed 48 by replacing objectionable ions such as calcium ions in the exhausted resin bed 48 with less objectionable ions such as sodium ions. This operation is called downflow regeneration since the brine 52 flows first through the distribution tube 55 and then up through the resin bed 48 and the top opening 54 of the resin tank 32 and then to the drain port 60. In this position too, the push button 214 is extended so that the microswitch 210 causes a signal to be sent to the controller 126 indicating that the brine valve 140 is in the open position.

Figure 29:
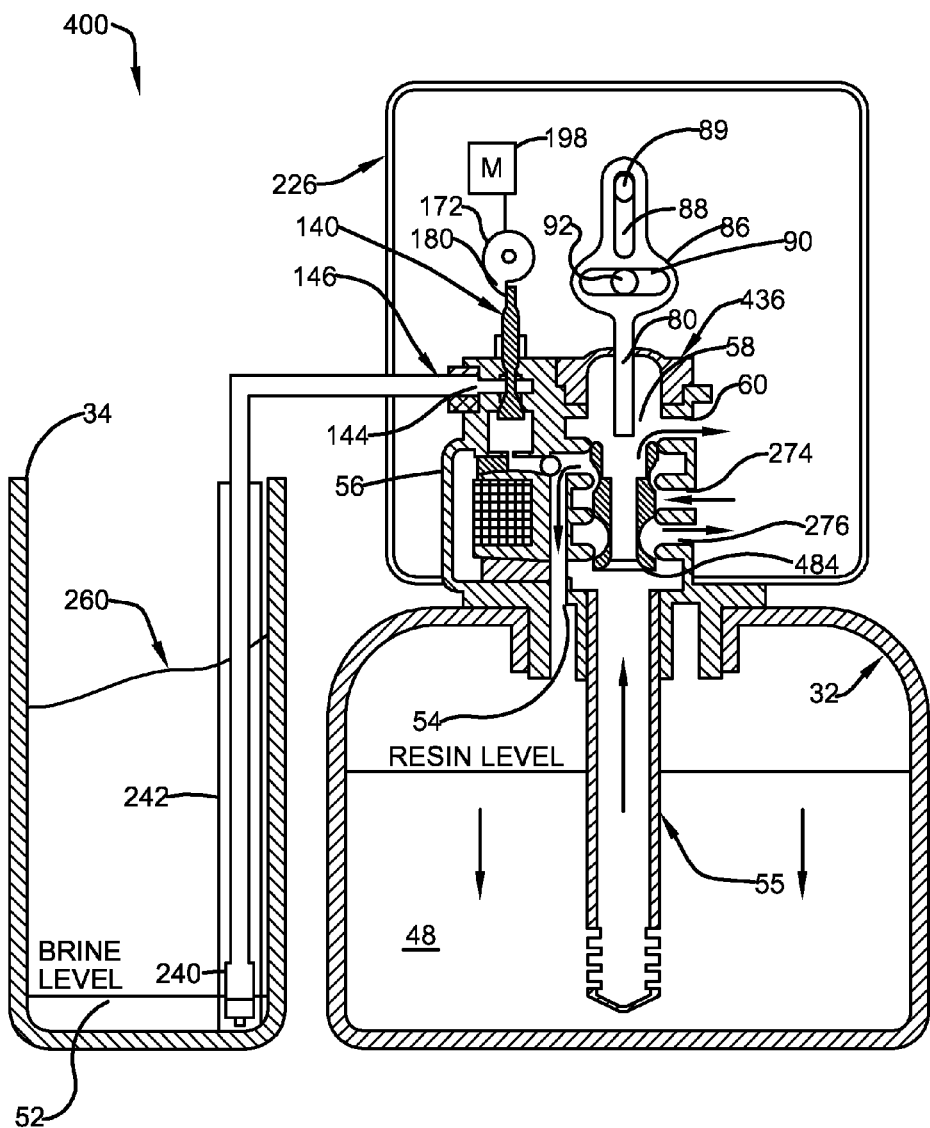

After the regeneration phase of the cycle is complete, the motor 102 causes the piston 84 to move to the rapid rinse position shown in FIG. 29. Also, the motor 198 for the brine valve 140 causes the cam 172 to rotate clockwise until the cam projection 180 is disengaged from the valve stem 148 to place the brine valve 140 in the closed position to prevent fluid from flowing into or out of the brine tank 34. In this position, the untreated water inlet orifice 274 is connected to the treated water outlet orifice 276 and the top opening 54 of the resin tank 32. The distribution tube 55 is connected to the drain port 60, thereby rinsing the resin tank 32 with untreated water to remove the regenerant solution 52 from the resin tank 32. The resin bed 48 is now fully-regenerated and ready to resume water treatment. In this position too, the push button 214 is depressed so that the microswitch 210 causes a signal to be sent to the controller 126 indicating that the brine valve 140 is in the closed position. The motor 102 for the piston 484 then causes the piston 484 to move back to the service position and the motor 198 for the brine valve 140 causes the brine valve 140 to be in the service position as shown in FIG. 25 to resume normal operation of the water softener. Alternatively, a venturi type injector such as that provided for the embodiment shown in FIGS. 20-24 may be used instead of the pump 240. In this alternative version, an air check arrangement such as that provided for the embodiment shown in FIGS. 20-24 may be provided to indicate the brine level.

Figure 13:
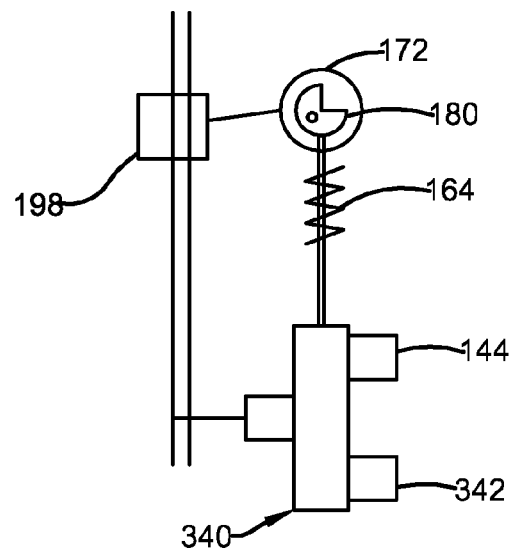
FIG. 13 is a schematic side view of a portion of the water system of FIGS. 1-5 but with another exemplary brine valve for controlling fluid flow through three ports.

Since the brine valve 140 is operated independently of the piston, the brine valve 140 may, in the open position, allow the brine tank 34 to be filled with treated water at any time prior to the regeneration phase. It also allows operation of the rapid rinse to clean any residual brine from the pump for the embodiment in which the pump is used. In another exemplary arrangement as shown in FIG. 13, the brine valve may be configured to be a three-way brine valve 340 in which it opens and closes an additional ambient air port 342 for injecting air into the control valve so as to facilitate drawing brine from the brine tank 34 or water into the brine tank 34. For example, the brine valve 340 may in a first position that closes the brine port 144 and the air port 342. The brine valve may be in a second position that opens both ports. The brine may be a third position the opens the brine port 144 and closes the air port 342, or a fourth position that closes the brine port 144 and opens the air port 342. The speed of the motor 198 may be controlled for the air releases.

For the embodiments with the pump 240, it should be noted that the pump 240 uses significantly less water to draw the brine from the brine tank 34 than that of the venturi type injector. In one example, the pump 240 may use only 4 gallons of water during the regeneration phase as opposed to 100 gallons of water which may be needed for a venturi type injector. In the embodiment in which the resin bed is backwashed periodically in spaced intervals, the amount of water may be reduced by ninety percent from that using the injector. This reduction is due in part to the fact that the amount of water that is needed when an injector pulls the brine through the resin is not required.

In a further embodiment, two or more of the previously described water softeners may be coupled together using a manifold 304. Referring to FIGS. 15 and 16, the manifold 304 may include a bypass valve assembly 302 that may be operatively mounted to the control valve 36, 360, or 436 and be in fluid communication with the untreated water inlet orifice 274 and treated water outlet orifice 276 located rearwardly from the valve body 56. The bypass valve assembly 302 may include knobs or other devices that can close the control valve 36 to permit the water to be bypassed for service or repair. The bypass valve assembly 302 may be configured to connect to first control valve 36, 360, or 436 and a second control valve 536 to the treated water line 40 and the untreated water line 38. The second control valve 536 may be similar to the first control valve except as discussed below. The second control valve 536 is operatively connected to another resin tank. Another brine tank is in fluid communication with the resin tank through the second control valve 536. The brine tank, resin tank and other elements of the water softener system for the second control valve may be similar in construction and/or function as that of the water softener system 30, 300 or 400 for the first control valve and thus will not be further described in the interest of brevity.

As shown in the top plan view of FIG. 15, the bypass valve assembly 302 includes an outlet flow portion 306 and an inlet flow portion 308. The outlet flow portion 306 includes first and second branches 310, 312 that merge into a main branch 314. The main branch 314 includes an outlet port 316 that is in fluid communication with the treated water line 40 for use in the home. The first branch 310 is in fluid communication with the treated water outlet port 350 of the first control valve. The second branch 312 is in fluid communication with the treated water outlet port 650 of the second control valve 536. A three way valve 320 is provided at the junction of all of the branches 310, 312, 314 and is operative to control the flow of treated water from the outlet ports 350, 650 of the first and second flow control valves. In the first valve position, the treated water is allowed to flow from the outlet port 350 of the first control valve to the outlet port 316 of the main branch 314, but treated water from the outlet port 650 of the second control valve 536 is blocked or prevented from flowing from the outlet port 650 of the second control valve 536 to the outlet port 316 of the main branch 314. In the second valve position, the treated water is allowed to flow from the outlet port 650 of the second control valve 536 to the outlet port 316 of the main branch 314, but treated water from the outlet port 350 of the first control valve is blocked or prevented from flowing from the outlet port 350 of the first control valve to the outlet port 316 of the main branch 314. In the third valve position, the treated water from both outlet ports 350, 650 of the first and second control valves is prevented from flowing to the outlet port 316 of the main branch 314. The three-way valve 320 may be operated by an alternator motor 322 (FIG. 19) and controlled electronically by the controller 126 in the control module 124.

The inlet flow portion 308 includes first and second branches 324, 326 that merge into a main branch 328. The main branch 328 includes an inlet port 330 that is in fluid communication with the untreated water line 38. The first branch 324 is in fluid communication with the untreated water inlet port 318 of the first control valve. The second branch 326 is in fluid communication with the untreated water inlet port 618 of the second control valve 536. A first valve 352 is provided between the inlet port 318 of the first control valve and the inlet port 330 of the main branch 328. The first valve 352 is operative in an open position to allow untreated water from the untreated water line 38 to flow into the first control valve, and in a closed position to prevent untreated water from the untreated water line 38 from flowing into the first control valve. A second valve 354 is provided between the inlet port 618 of the second control valve 536 and the inlet port 330 of the main branch 328. The second valve 354 is operative in an open position to allow untreated water from the untreated water line 38 to flow into the second control valve 536, and in a closed position to prevent untreated water from the untreated water line from flowing into the second control valve 536. The first and second valves 352, 354 may include knobs or other devices to permit the valve to be turned by hand between their open and closed positions. The valves may be any suitable type such as a ball valve. Optionally, alternator motor(s) may control operation of the first and second valves 352, 354 as well as the three-way valve 320 and inflow valves of the manifold of the bypass valve assembly.

Figure 17:
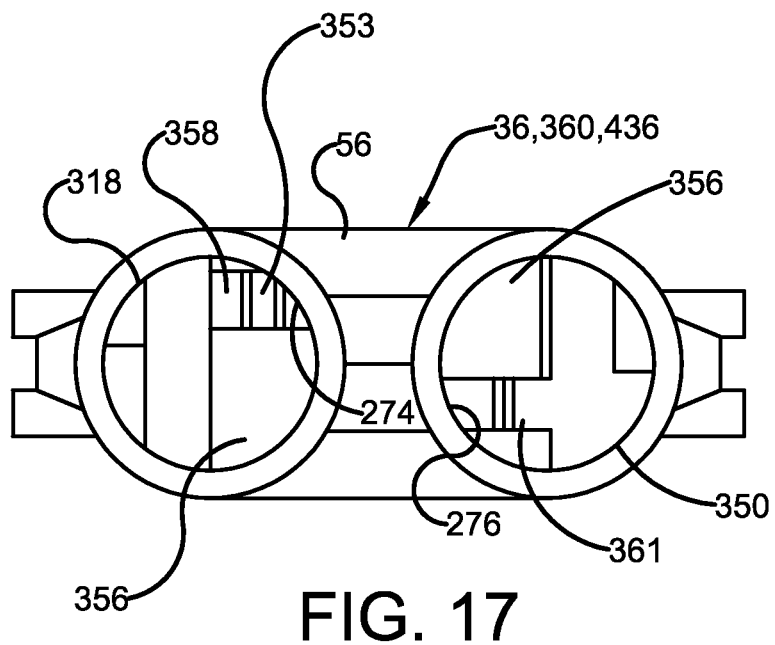
FIG. 17 shows a portion of the first control valve of the water softener system of FIGS. 1-5.
Figure 18:
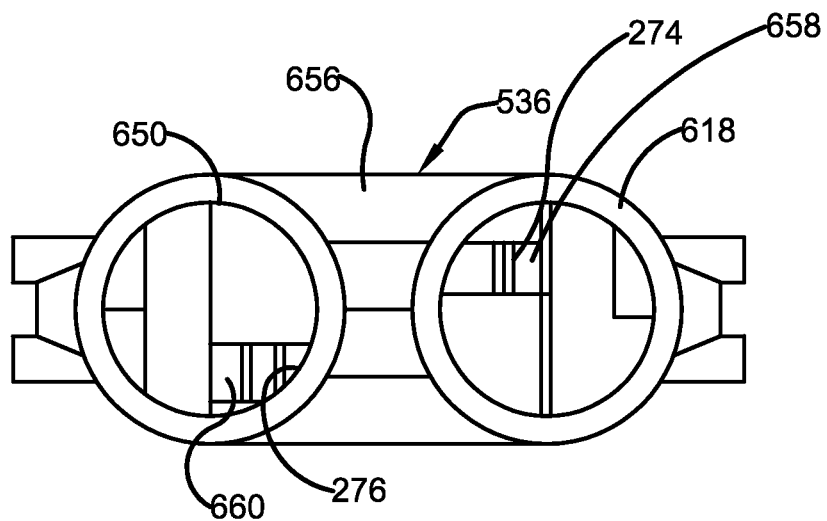
FIG. 18 shows a portion of the second control valve of the water softener system of FIGS. 15 and 16.

As seen in a side plan view in FIG. 16, the inlet flow portion 308 is routed underneath the main branch 314 (shown in FIG. 16) of the outlet flow portion 306. Alternatively, the main branch 314 of the outlet flow portion 306 may be routed underneath the inlet flow portion 308. As seen in FIGS. 17 and 18, the inlet and outlet ports 618, 650 of the second control valve 536 are in reverse locations to the inlet and outlet ports 318, 350 of the first control valve. This allows the outlet port 350 of the first control valve to align with the outlet port 650 of the second control valve 536 and the inlet port 318 of the first control valve to align with the inlet port 618 of the second control valve 536 so that the manifold can be easily mounted to the control valves. The process of reversing the inlet and outlet ports 618, 650 of the second control valve 536 is accomplished by reversing slots of its valve body 656 that are in fluid communication with inlet and outlet ports 618, 650 of the second control valve 536 and with inlet and outlet orifices 274, 276 of the interior of the valve body 656, after the molding the valve body.

In particular, FIG. 17 shows the inlet and outlet port 318, 350 of the first control valve. The valve body 56 includes a cavity 353 that is bounded by a wall 356. A first slot 358 is machined or cut out of the wall 356 at the upper end of the wall 356. The first slot 358 fluidly communicates with the inlet orifice 274, which is located upwardly from the outlet orifice 276, and the inlet port 318. A second slot 361 is machined or cut out of the wall 356 at the lower end of the wall 356. The second slot 361 fluidly communicates with the outlet orifice 276 and the outlet port 350. The first and second slots 358, 361 are vertically and horizontally spaced apart such that the first slot 358 is located higher than the second slot 361. The inlet port 318 is located left (as viewed in FIGS. 6 and 17 from the rear of the control valve) of the outlet port 350. FIG. 18 shows slots 658, 660 of the inlet and outlet ports 618, 650 of the second control valve 536. In this case, the inlet port 618 is now located right (as viewed in FIG. 18 from the rear of the control valve) of the outlet port 650. That is, the first slot 658 is machined or cut out of the wall 356 at the upper end of the wall 356 and fluidly communicates with the inlet orifice 274 and the inlet port 618. The second slot 660 is machine or cut out of the wall at the lower end of the wall and fluidly communicates with the outlet orifice 276 and the outlet port 650.

FIG. 19 shows an example embodiment of a control module 124 that includes a display 362 and function buttons 364 to operate one or more of the previously described water softeners. The control module 124 may include a mechanical indicator dial 366 that can be used to set the time of certain operations in the water softener. Alternatively, the control module 124 may include an electronic timer to set the time of certain operations of the water softener. An atomic clock signal receiver device (which sets the correct time via a received radio signal) 368 could be operatively connected to the timer for accurate timing and to allow adjustment of the time after a power loss or time change due to daylight savings. In another exemplary arrangement, the control module 124 may be remotely mounted to locations other than that of water softener. These remote locations may be in more convenient places for operation by a user. For example, the control module may located in a garage or bath room of a house.

FIG. 19 also shows an electronic platform that can be incorporated with the control module. The platform may include sensors that may be connected to the control module to control the operation of the water softener(s) based on certain sensed conditions. For example, a remote moisture sensor 370 may be operatively connected to the control module 124. The control module 124 controls the control valves and three-way valve based on the sensed moisture. A moisture sensor 370 may be operatively connected to the brine tank 34 to detect moisture in the tank. The control module 124 could use the sensed data to determine when the filing or regeneration phase is occurring. The moisture sensor 370 may detect that the moisture level is low for a long period, which may indicate that the water softener is not operating correctly to fill the brine tank 34. A remote moisture sensor 370 may also be used to detect moisture coming from a broken pipe and transmit that data to the control module 124. The control module 124 would then operate the valves to prevent water from entering the water softener. For example, the controller 126 in the control module 124 may cause the piston to move to a standby position that prevents untreated water from entering the water softener. Alternatively or in addition, other types of sensor could be provided to detect broken water lines. The controller 126 also could detect power loss during the regeneration of the brine and use power from a battery 384 to cause motor 102 to move the piston to the standby position. Alternatively, a salt sensor may be operatively connected to the brine tank to detect the salt level in the brine tank. The salt sensor may be operatively connected to the controller 126 to determine when the brine tank is being filled or being emptied in response to the salt sensor The control module 124 may be operatively connected to a user remote device 372 as schematically illustrated in FIG. 19 that allows a user to shut off the water to the water softener system when they go on vacation or operate the control valve (s) to temporary bypass the water softener. The control module 124 may be operatively connected to a smart grid 374 associated with an electric company. The control module 124 may be connected to an internet interface 376 to allow access and control of the water softener by a user over the internet. The control module 124 may also be operatively connected to telemetry systems that provide information in which the control module 124 uses to control the water softener. As illustrated in FIG. 19, the control module 124 may operate to control the motors of the first and second control valves connected to the bypass valve assembly in a manner that continues the supply of treated water to the household even, for example, during the regeneration, rapid rinse, or back wash phases of one of the water softeners associated with one of the control valves or at any other time that that water softener is not operative to supply treated water to the household. In particular, the control module 124 may be operatively connected to a leading slave board 378, which is operatively connected to the piston motor 102 and brine valve motor 198 of the first control valve 36. The control module 124 may be operatively connected to a lagging slave board 380, which is operatively connected to the piston motor 102 and brine valve motor 198 of the second control valve 536. The alternator motor 322 is operatively connected to the leading slave board 378.

In operation, the first control valve 36 is operative to allow operation of its associated water softener. When the control module 124 receives data that the water softener is about to enter the one of the phases in the regeneration cycle (e.g. regeneration, rapid rinse, or back wash), the control module 124 sends a control signal to the second control valve 536 to place it in the service position. This data may come from a flow meter or the moisture or other sensors. Alternatively, the data may come from the timer that causes the regeneration cycle to operate at a predetermined time. The control module 124 also sends a control signal via the leading slave board to the alternator motor 322 to control the three-way valve 320 to place it in the first position to prevent treated water from first control valve 36 from flowing into the treated water line 40 but allow treated water from the second control valve 536 to flow into the treated water line 40. When the regeneration cycle of the water softener associated with the first control valve 36 is complete and the first control valve 36 is in the service position, the control module 124 sends a control signal via the leading slave board 378 to the alternator motor 322 to control the three-way valve 320 to place it in the second position to prevent treated water from the second control valve 536 from flowing into the treated water line 40 but allow treated water from the first control valve 36 to flow into the treated water line 40. The control module 124 may be connected to the above mentioned components shown in FIG. 19 by a hard wire connection 381 or wireless connection 382. The wireless technology may be a Zigby, Bluetooth, or Near Field connection.

The functions of the controller described herein may be implemented using computer executable instructions (e.g. whether software or firmware) operate to execute in one or more processors. Such instructions may be resident on and/or loaded from computer readable media or articles of various types into the respective processors. Such computer executable software instructions may be included on and loaded from one or more articles of computer readable media such as firmware, hard drivers, solid state drives, flash memory devices, CDs, DVDs, tapes, RAM, ROM and/or other local, remote, internal, and/or portable storage devices placed in operative connection with the described system and other systems described herein.

Water softener systems may use large amounts of water and salt to regenerate the resin bed. This additional amount of water and salt adds to the cost of operating the water softener system and also the wasted brine is sent down in the drain, which may be bad for the environment. In addition, consumer and regulatory agencies are demanding that water softeners use less water and salt.

Figure 38:
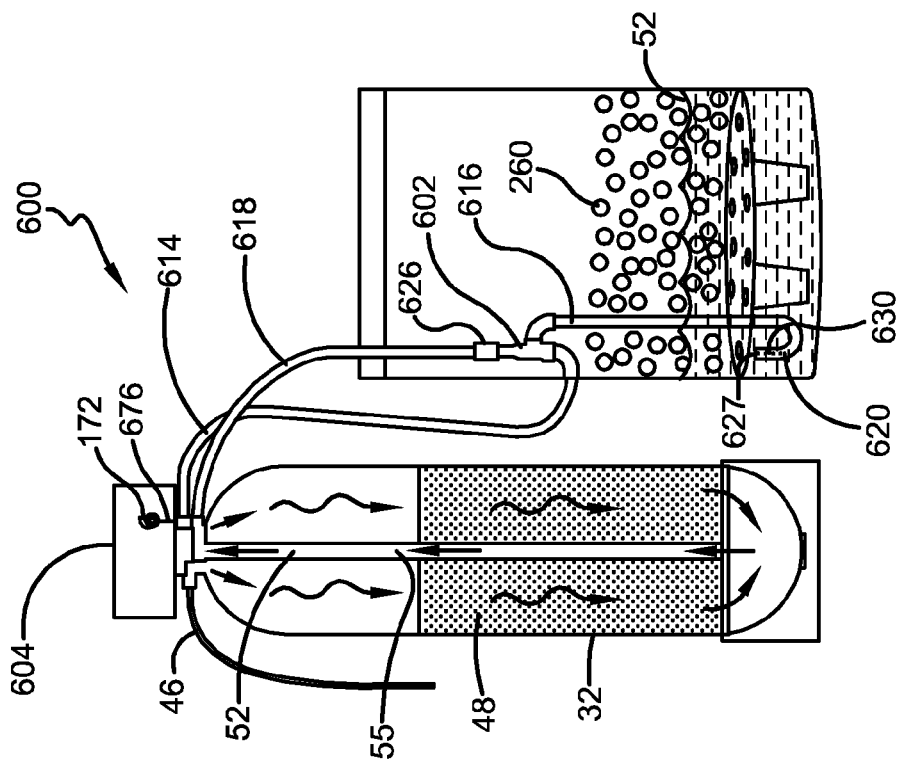
FIG. 38 is a view similar to FIG. 37 except that the water softener system is in the service position for normal operation.
Figure 37:
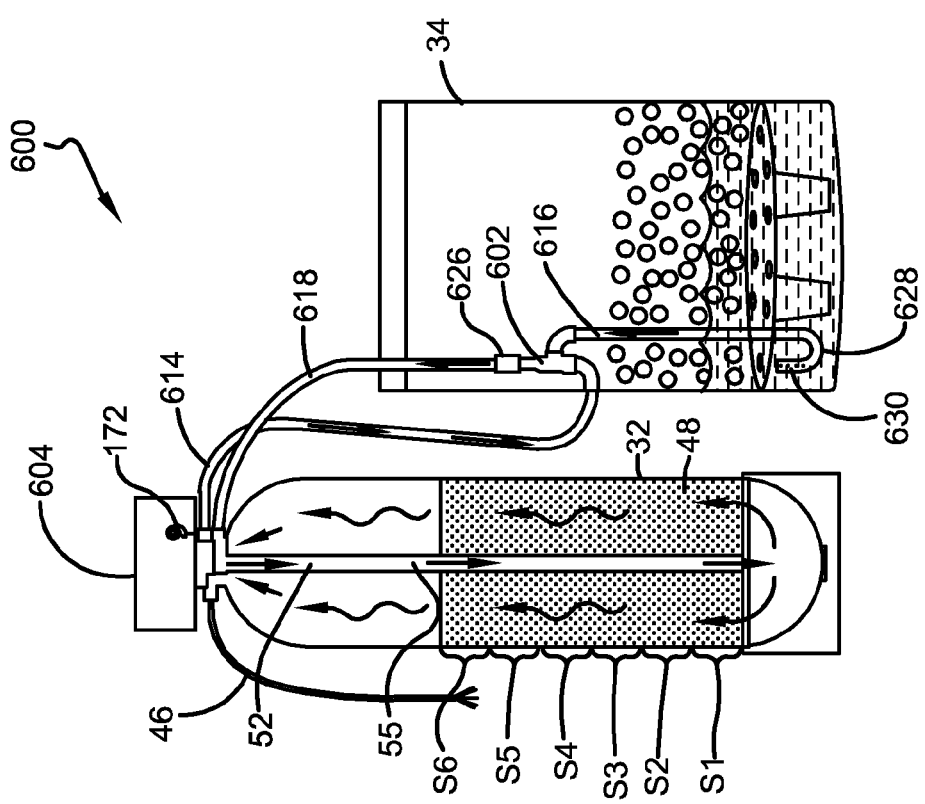
FIG. 37 is a schematic side view of another exemplary embodiment of a water softener system during the regeneration phase of operation.
Figure 39:
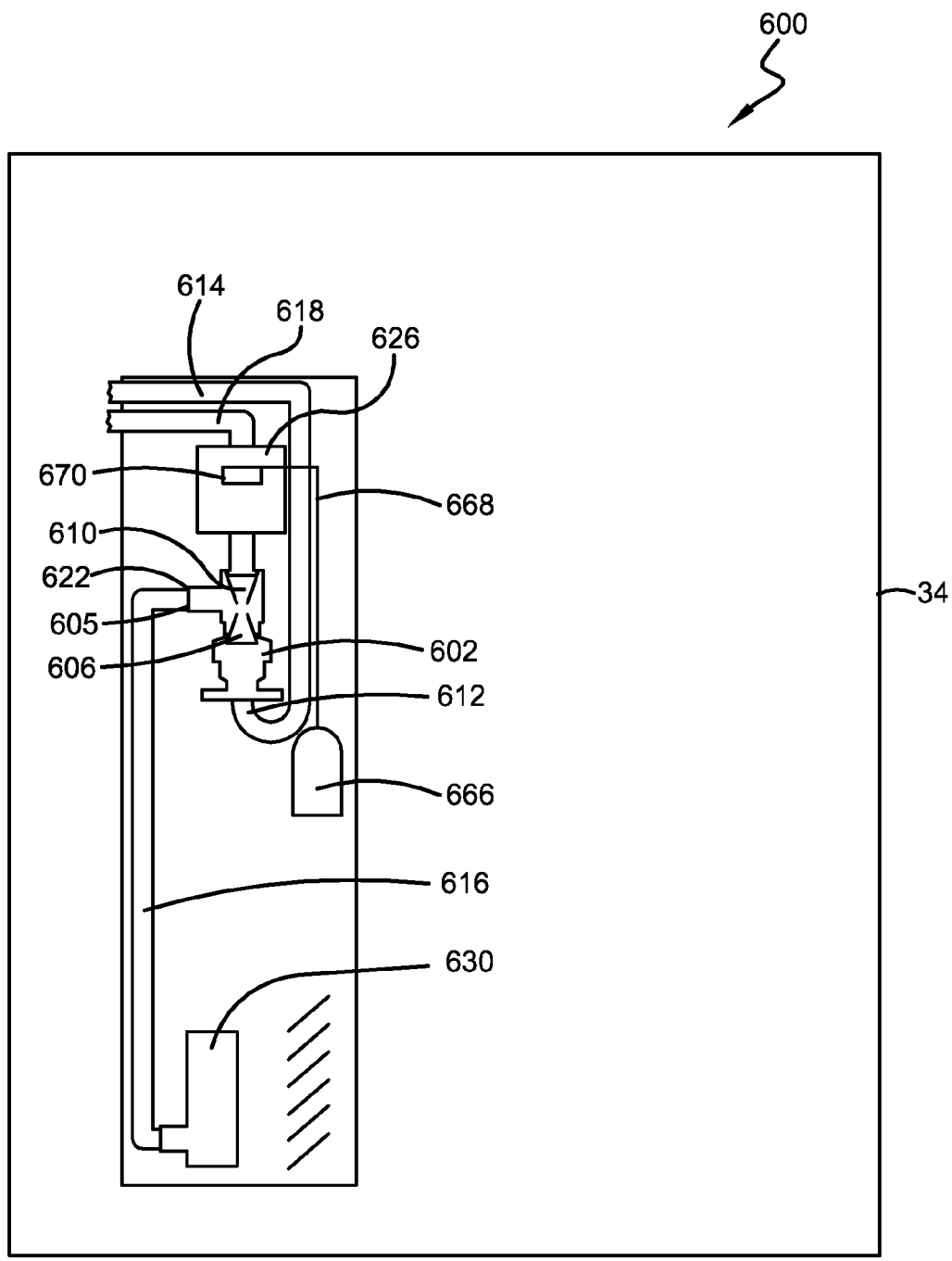
FIG. 39 is a schematic side view of the brine tank and related elements with portions removed for illustration.

FIGS. 37 and 38 show another exemplary embodiment of a water softener system that can reduce the amount of water and salt needed to regenerate the resin bed. In this exemplary embodiment, the same reference numbers are used for elements that are similar in construction and function as that of the water softener 30 of the previous embodiment. Referring to FIGS. 37-39, this water softener 600 includes a venturi type injector assembly 602 to push the brine from the brine tank 34 to the control valve 604. The control valve 604 is similar to the control valve 36 except for that discussed below. The venturi injector assembly 602 is located in the brine tank 34. As seen in FIGS. 39-44, the injector assembly includes a nozzle body 605, an injector nozzle 606, a threaded opening or port 622, and a throat 610. As depicted in FIG. 39, the injector nozzle 606 is fluidly connected to an outlet end 612 of a drive water line 614. The port 622 is fluidly connected to one end of a J-shaped brine pick up tube 616. The throat 610 is fluidly connected to a brine line 618. As depicted in FIGS. 40-44, the nozzle body 605 includes threaded openings 620 and 622 for threaded connection with their respective drive water line 614 and brine pick up tube 616. The injector nozzle 606 is securely received in the nozzle body at the threaded opening 620. The nozzle body 605 is configured to receive different sizes of injector nozzles therein. The outlet opening 624 of the nozzle body 605 is received by a safety valve 626 (FIGS. 37-39) provided in the brine line 618.

As seen in FIGS. 37-38, the other end 627 of the pick up tube 616 is immersed into the brine such that bight portion 628 of the pick up tube 616 tube is at the lowest point of the brine tank 34. An air check arrangement 630 may be provided in the end 627 to indicate the brine level. The air check arrangement 630 may include a ball float provided in the pick up tube 616 that moves between the bight portion 628 and the end 627 based on the brine level of the brine tank 34.

Figure 45:
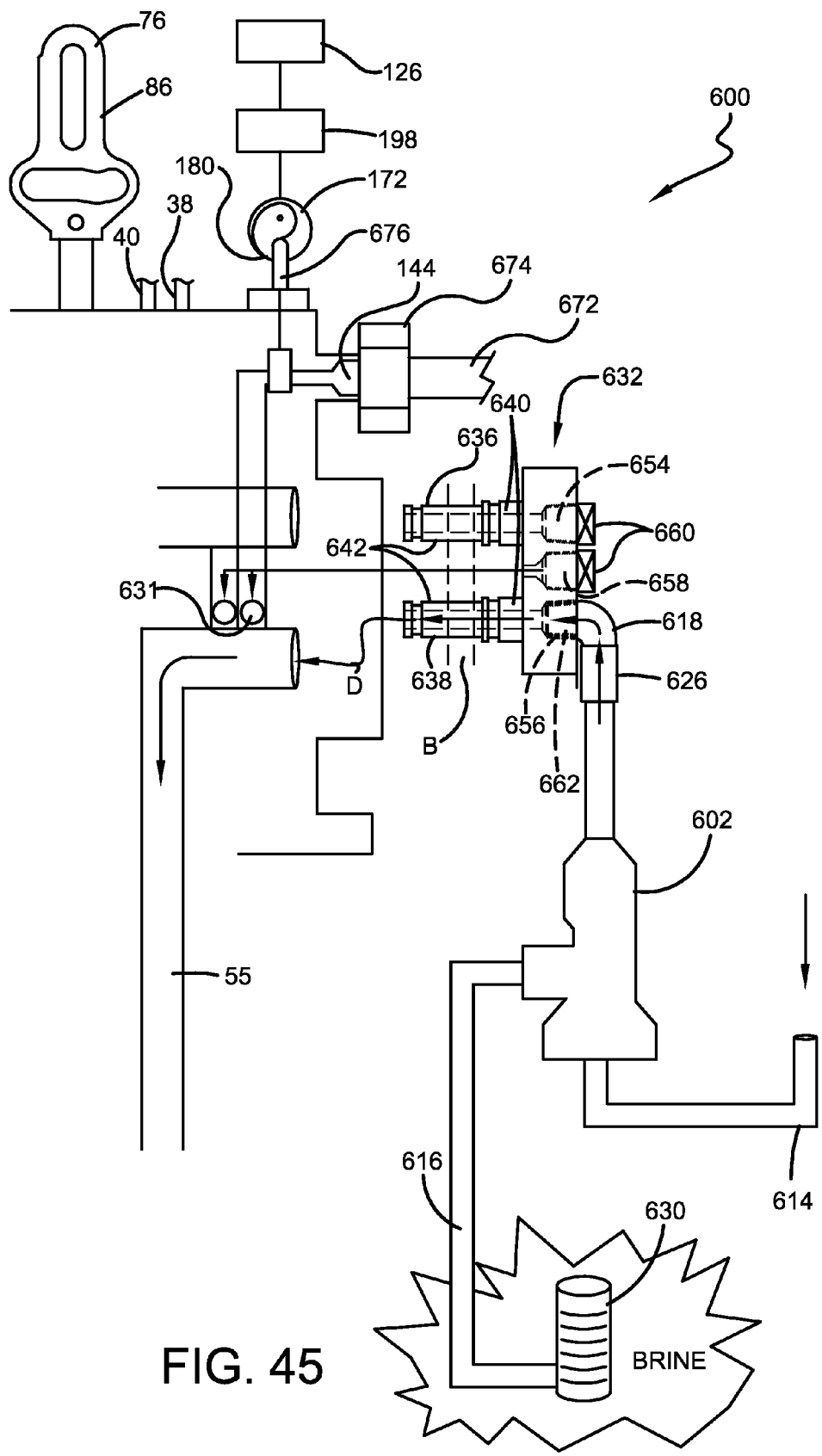
FIG. 45 is a schematic view of a portion of the water softener system of FIG. 37.
Figure 46:
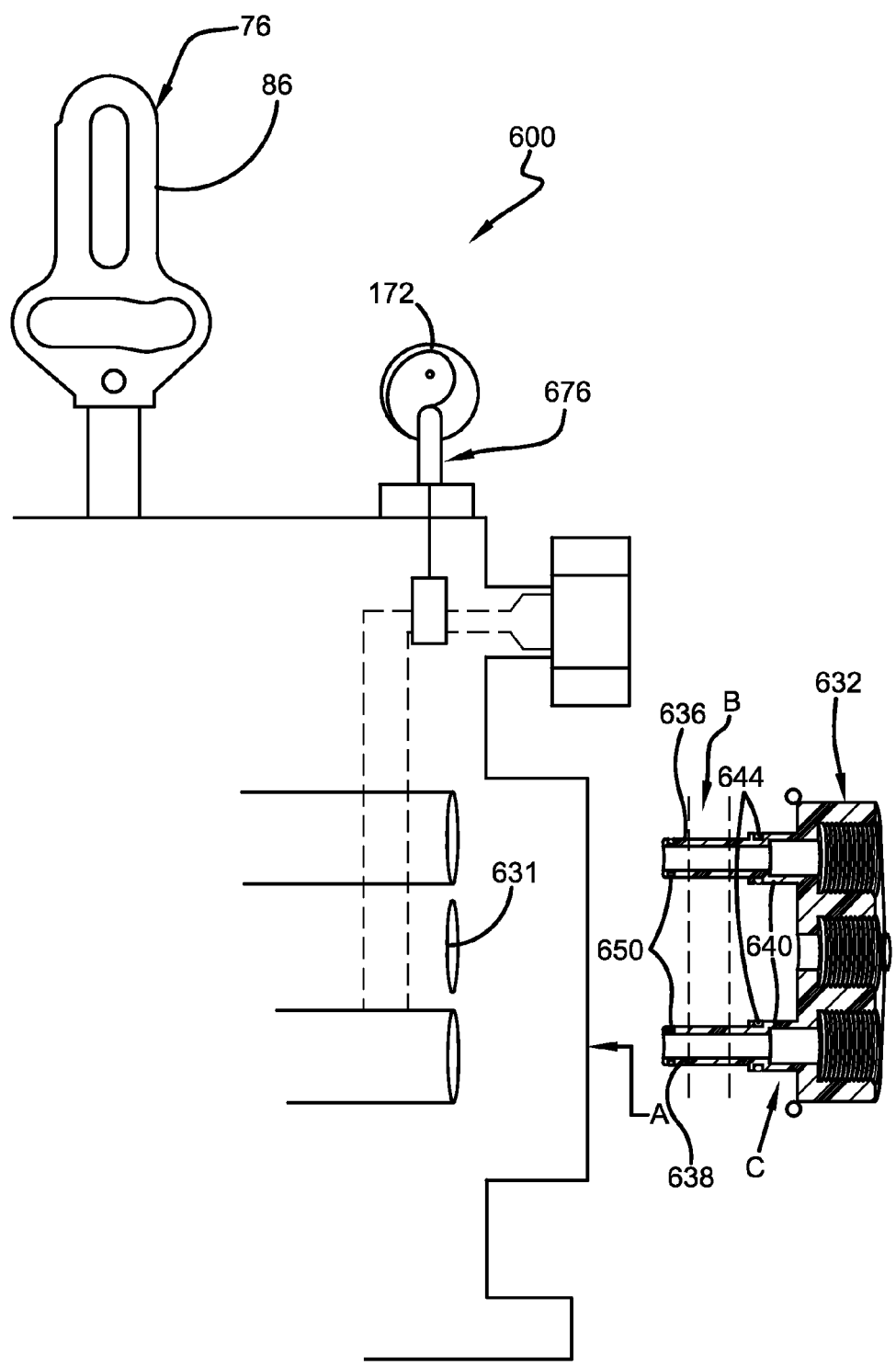
FIG. 46 is a view similar to FIG. 45 with portions removed for illustrative purposes.
Figure 48:
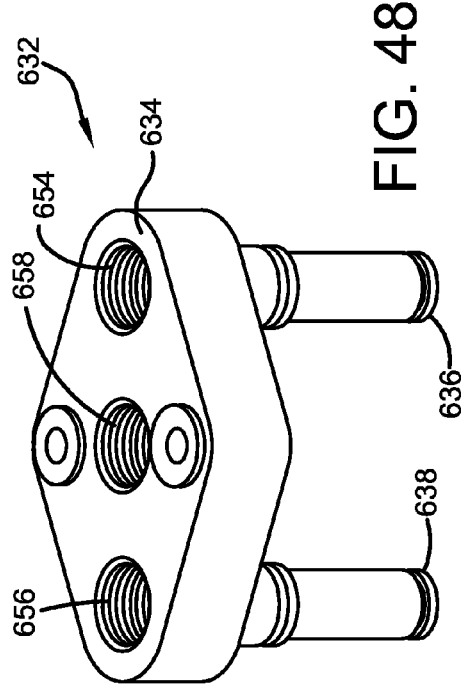
FIG. 48 is a side and top perspective view of the body cover of FIG. 47 as viewed from the side opposite the side viewed in FIG. 47.
Figure 47:
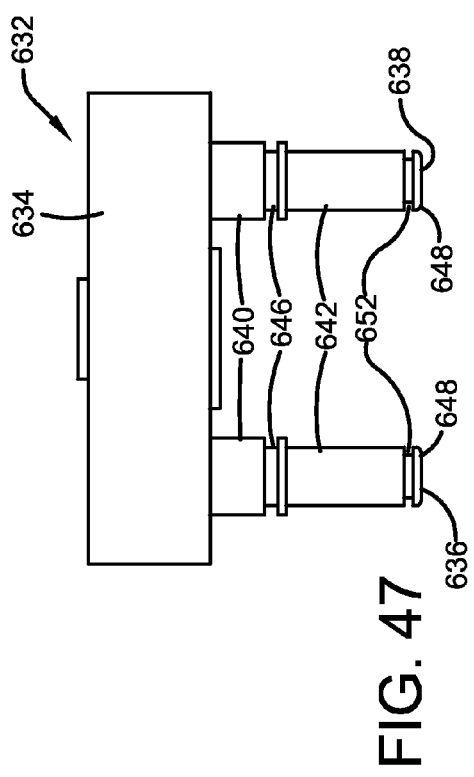
FIG. 47 is a side view of the body cover for the water softener system of the exemplary embodiment of FIG. 37.
Figure 49:
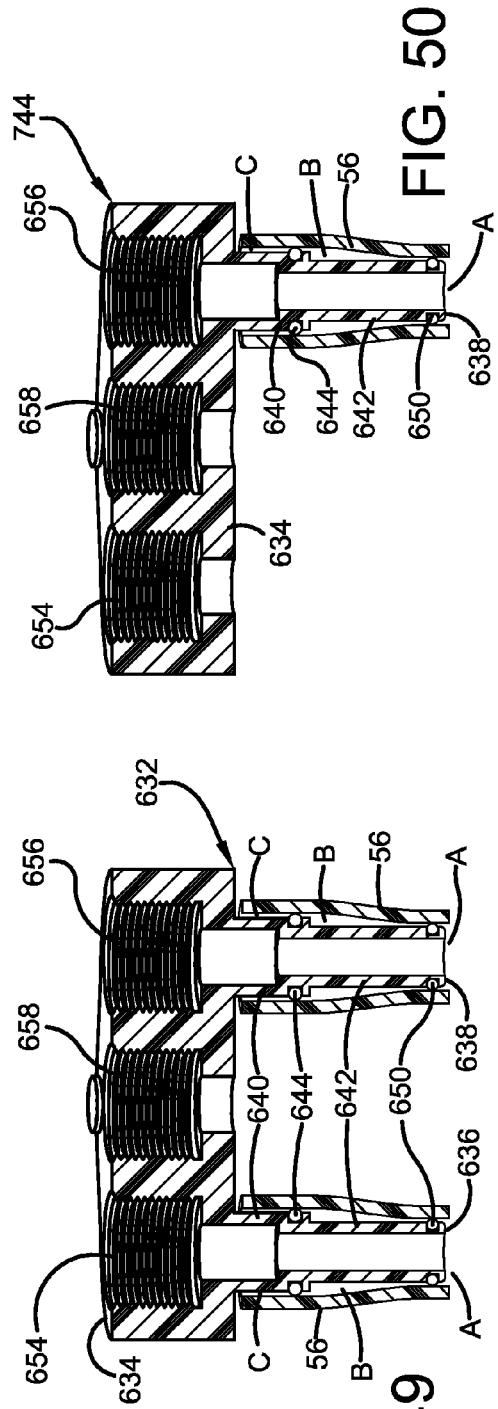
FIG. 49 is a side sectional view of the body cover of FIG. 47 taken through the center and viewed in the same direction as FIG. 47 and including portions of the valve body.

The inlet end of the drive water line 614 is fluidly connected to an outlet 631 (FIG. 45) of the control valve 604. The outlet 631 is in fluid communication with a fluid passage B defined by the valve body 56 and a body cover 632 (see FIGS. 45-47). In particular, the body cover 632 is mounted to the control valve 604 below the external port 144 as seen in FIGS. 45 and 46. Referring to FIGS. 47-49, the body cover 632 is made of plastic and molded in one piece. The body cover 632 includes a base 634 and two tubular finger like projections that define a first port 636 and a second port 638, respectively. Each projection is divided into first and second sections 640, 642. The first section 640 is located adjacent the base 634 of the body cover 632. The second section 642 is adjacent the first section 640. The second section 642 has an outer diameter that is less than the outer diameter of the first section 640.

Referring to FIG. 49, the outer surface of the first and second sections 640, 642 in combination with the valve body 56 define a first passageway C and a second fluid passageway B, respectively (also schematically indicated by the dash lines in FIG. 46). A first O-ring 644 is inserted into a circumferential groove 646 (FIG. 47) formed in the projection at the junction of the first and second sections 640, 642 to seal the first and second fluid passageways C, B from each other. A third fluid passageway or zone A is located adjacent a distal end 648 of the projection. A second O-ring 650 is inserted into a circumferential groove 652 formed in the distal end 648 to seal the second passageway B and third fluid passageway A from each other. The base 634 includes first, second, and third threaded openings 654, 656, 658. The first threaded opening 654 is in fluid communication with the first port 636. The second threaded opening 656 is in fluid communication with the second port 638.

The third threaded opening 658 may be plugged by a plug 660 (FIG. 45) to prevent fluid flowing therethrough or remain unplugged to allow fluid to flow therethrough depending on the application. The first port 636 may be plugged by a plug 660, threadily inserted into the first opening 654, to prevent flowing through the first port 636 or remained unplugged to allow fluid to flow through the first port 636 depending on the application. The second port 638 may be plugged by a plug 660, threadily inserted into the second opening 656, to prevent flowing through the second port 638 or remained unplugged to allow fluid to flow through the second port 638 depending on the application. In this embodiment, the third opening 658 and the first port 636 are each plugged by a plug 660, and the second port 638 is unplugged as seen in FIG. 45.

As previously mentioned, the drive water line 614 is in fluid communication with fluid passageway B. The brine line 618 is fluidly connected at one end to the second opening 656 via a threaded fitting 662. The other end of the brine line 618 is fluidly connected to the throat 610 of the injector assembly 602 as previously mentioned. Referring to FIG. 39, the safety valve 626 provided in the brine line 618 closes when the fluid level in the brine tank 34 reaches a predetermined high level due to, for example, a failure of a control valve. The closing of the safety valve 626 prevents the flow of fluid in the brine tank 34 in to the resin tank 32 and thus prevents a flooded room in a home where the water softener is located. In particular, the safety valve 626 includes a float 666 that is attached to a lever 668. The lever 668 is attached to a valve part 670. Movement of the lever 668 moves the valve part 670 between a valve open position and valve closed position. When the liquid level in the brine tank 34 increase to a predetermined level, the float 666 will move upward which in turn moves the lever 668 to move the valve part 670 to the valve closed position, which closes the safety valve 626.

Referring to FIG. 45, an untreated water line 672 is fluidly connected to injector 674. The injector 674 is located at the external port 144 of a water valve 676. The water valve 676 is provided in a bore 142 (FIG. 6) of the valve body 56 that fluidly communicates with the external port 144 connected to the water line 672. The water valve 676 is of similar construction and design as the brine valve 140 of the previous embodiments except that in this exemplary embodiment it is being used to control the flow of untreated water from the untreated water line 672 to the venturi injector assembly 602. This untreated water is used to drive the venturi injector assembly 602 to draw brine from the brine tank 34 into the resin tank 32. The water valve 676 is operated to move between the open and close positions to permit pulses of water to flow from the untreated water line 672 to the venturi injector assembly 602. In particular, initially the water valve 676 is in the closed position as shown in FIG. 38. When a determination is made by the controller 126 to regenerate the resin, the controller 126 is programmed to send a control signal to the motor 198 for the water valve 676 to cause the cam to rotate clockwise until the cam projection 180 engages and moves the valve stem 148 down to open the water valve 676 (FIG. 37) for a programmed predetermined time such as for two minutes or thirty seconds. The controller 126 may include a timer to start timing when the control signal is sent.

With the water valve 676 opened, the drive water can flow from the untreated water line 672 through the port 144 out of the outlet 631 and through the fluid passageway B to the drive water line 614. The drive water then flows into the nozzle 606 of the venturi injector assembly 602 and pulls or draws the brine through the nozzle 606 and mixes with the brine. The brine and drive water solution flows out of the throat 610 of the injector assembly 602 and through the brine line 618 and the second port 638. Then, as indicated by arrow D, the drive water and brine solution flow out of the second port and then through the distributor tube 55 to the bottom of the resin tank 32. After the controller 126 determines that the drive water and brine solution has flowed for the predetermined time, the controller 126 then sends a control signal to the motor 198 for the water valve to cause the cam 172 to rotate clockwise until the cam projection 180 is disengaged from the valve stem 148 to place the water valve 676 in the closed position for a predetermined time such as for two minutes or thirty seconds. With the water valve 676 in the closed position, drive water is prevented from flowing through the port 144 to the venturi injector assembly 602. Thus, no drive water and brine solution mix flows into the resin tank 32 for this predetermined time period. After the controller 126 determines that the predetermined time has lapsed, the controller 126 causes the water valve 676 to open to produce another pulse of drive water and brine solution and the valve open/close cycle repeats.

This process continues to produce subsequent pulses of drive water and brine solution until the air check in the brine tank 34 closes to indicate that there is no more brine. Alternatively, the process may stop after a predetermined time by the controller 126. The process may also stop when it is determined that the entire resin bed 48 just becomes charged with a predetermined amount of brine. This predetermined amount may be the amount of brine in the brine tank 34. The controller 126 may be programmed to cause valves to open for a predetermined amount of time during the filling phase to send a predetermined amount of treated water into the brine tank to mix with the salt to produce this predetermined amount of brine needed to just charge the resin bed 48. In essence, the predetermined amount of water sent to the brine tank 34 is the exact amount that will saturate the exact amount of brine needed to charge the resin bed 48.

Alternatively, a pump may be used instead of the injector assembly to draw the brine into the resin bed 48 at intermittent pulses. This exemplary embodiment is similar in structure and function as the exemplary embodiment shown in FIGS. 1-19 except for that discussed below. As previously mentioned, referring to FIG. 12, the brine tank 34 may include the pump 240 to pump out the brine or regenerate solution 52 (FIGS. 1-5 and 20-29) from the brine tank 34 to the resin tank 32. Specifically, the pump 240 is inserted into a riser tube 242 that extends upwardly from the bottom 244 of the brine tank 34. The pump 240 is located near the bottom 244 of the brine tank 34 and may be submersed into the brine solution 52. The pump 240 may be of any suitable type such as a gear pump or centrifugal pump. The line 146 (shown in FIG. 1) may comprise a flexible tube 246 that extends from the outlet of the pump 240 through the riser tube 242 and to the brine port 144 of the control valve 36 to transport the brine from the brine tank 34 to the resin tank 32 and also transports treated water from the resin tank 32 to the brine tank 34. A lid 256 covers the top of the brine tank 34. The pump 240 is electrically coupled via a power cord 243 to a controller 248 mounted on a printed circuit board 250 for controlling the output of the pump 240. The controller 248 and circuit board 250 may be provided in a control valve 252 that is mounted to the sidewall 254 of the brine tank. The controller 248 may also monitor the pump current to control when the water is at the air level. This controller 248 may be operatively connected to the control module 124 (shown in FIG. 7). Alternatively, the controller 126 of the control module 124 may be used instead of the controller 248 to control and monitor the pump 240.

In this alternative embodiment, the controller operates the pump 240 to draw the brine into the resin bed 48 at intermittent pulses. In operation, in the regeneration phase, the controller 126 sends a control signal to open the brine valve 140 and a control signal to operate the pump 240 for a predetermined time. After the predetermined time lapses, the controller 126 sends a control signal to close the brine valve 140 and to turn off the pump 240. After pump 240 is off for a predetermine time, the controller sends a control signal to open the brine valve 140 and to turn on the pump 240 and this cycle repeats itself. This process continues to produce subsequent pulses of brine solution until there is no more brine in the brine tank 34. Alternatively, the process may stop after a predetermined time by the controller 126. The process may also stop when it is determined that the entire resin bed 48 just becomes charged with a predetermined amount of brine. This predetermined amount may be the amount of brine in the brine tank. The controller 126 may be programmed to cause the valves to open for a predetermined amount of time during the filling phase to send a predetermined amount of water into the brine tank to mix with the salt to produce this predetermined amount of brine needed to just charge the bed. In essence, the predetermined amount of water sent to the brine tank 34 is the exact amount that will saturate the exact amount of brine needed to charge the resin bed 48. The service position for normal operation, fill phase, rapid rinse phase, and backwash phase (optional), are similar to the exemplary embodiment shown in FIGS. 1-19.

The operation of the water softener will now be discussed. Referring to FIG. 38, the control valve 604 is in the service position in which the untreated water inlet orifice 274 is in fluid communication with the top opening 54 of the resin tank 32, and the distribution tube 55 of the resin tank 32 is in fluid communication with the treated water outlet orifice 276 (see FIG. 1). The water valve 676 is in the closed position blocking fluid from entering the brine tank 34. In this closed position, the upper end of the valve stem 148 is located adjacent the trailing end 182 (in the counterclockwise direction) of the cam projection 180 and is therefore not engaged by the cam projection 180. In this position, the push button 266 is not in the recess 184 and depressed by the body 186 of the cam 172 so that the microswitch 210 causes a signal to be sent to the controller 126 indicating that the water valve 676 is in the closed position. In the service position, the piston 84 is in a position to allow treated water to exit the outlet orifice 276. Thus, untreated water flows from the untreated water inlet orifice 274 through the resin tank 32 and then through the distribution tube 55 to the outlet orifice 276 of the valve body 56 and to the treated water line 40.

When the system determines that the ion exchange capacity of the resin bed 48 will be exhausted in a designated period, a regeneration cycle may commence. This decision may be based on the time since the last regeneration cycle and/or sensed usage and/or other factors. To begin a regeneration cycle, the motor 102 for the piston 84 causes the piston 84 to move to a fill position shown in FIG. 2. Also, the motor 198 for the water valve 676 causes the cam 172 to rotate clockwise until the cam projection 180 engages and moves the valve stem 148 down to open the valve 676 and allow fluid communication with the port 144 and the brine tank 34. The distribution tube 55 is now in fluid communication with both the treated water outlet orifice 276 and the fluid passageway B. In this position, untreated water flows through the port 144 and down into the resin tank 32 where it is treated and up through the distributor tube 55 out of the outlet 631 and through the fluid passageway B. The treated water flows through the drive water line 614. Since in the fill position the flow path through the brine line 618 and the second port 638 is closed off, the resin tank 32 is pressurized so there is no pressure to flow the treated water through the brine line 618. Thus, the treated water flows through the venturi injector assembly 602 and through the pick up tube 616 to fill the brine tank 34 with treated water to dissolve some of the particles such as salt in the brine tank 34, thereby forming regenerant solution 52. In this position too, the push button 214 is extended into the recess 184 so that the microswitch 210 causes a signal to be sent to the controller 126 indicating that the water valve 676 is in the open position.

When the fill phase is complete, the motor 102 for the piston 84 causes the piston 84 to move to the regenerate position shown in FIG. 4. Also, the motor 198 for the water valve 676 causes the cam 172 to rotate clockwise until the cam projection 180 engages and moves the valve stem 148 down to open the water valve 676 and allow fluid communication with the brine port 144 and brine tank 34. The water valve 676 is opened and closed to send concentrated pulses of drive water and brine through the brine line 618 and into the resin tank 32 as previously mentioned.

Referring to FIG. 37, during the regeneration stage, the concentrated pulses of brine and water solution enter into the resin tank 32 via the distributor tube 55 and start recharging the resin bed 48 at the bottom of the bed. This saturates or recharges (i.e. replacing objectionable ions such as calcium ions with less objectionable ions such as sodium ions) only a few beads or particles in the resin bed at a time to create an efficient ion exchange. Since the beads at the bottom of the resin bed 48 are first fully recharged, subsequent pulses of brine will then saturate the next area or section of the resin bed 48 upwardly adjacent the bottom section. For example, a first pulse may recharge the first or bottom section 51, and then a second pulse may recharge a second section S2 above the bottom section 51, and then a third pulse may recharge a third section S3 above the second section S2. A fourth pulse may recharge a fourth section S4 above the third section S3, and then a fifth pulse may recharge a fifth section S5 above the fourth section S4, and then a sixth pulse may recharge the top or final sixth section S6 above the fifth section S5.

Thus, a subsequent pulse of brine saturates the next section of the resin bed 48 upwardly adjacent the most recently recharged section. Subsequent sections of the resin are recharged and saturated by pluses in this progressive manner until the top section of the resin bed 48 is saturated and fully recharged so that the entire resin bed is fully recharged. The number of sections may vary depending on the pulse amount and resin bed configuration, resin tank, speed or flow rate of the brine flow, or other factors. During the process, the water in the resin tank 32 is displaced and pulsed to the drain port 60 and through the drain line 46 as each section of the resin bed is recharged. However, the brine does not mix with the water above the charged portion of the resin bed 48 during saturation of each section. Thus, that water still may be used for rinsing or flushing.

In essence, the intermittent pulses of brine injected into the bottom of the resin bed just displaces the water around the resin beads with brine. This action also lifts the bed of the resin and reclassifies the bed strata. This in turn expands the bed to open up exchange sites. However, since there is no constant velocity flow of brine, there is no chance of slippage when the bed fluidizes. The pause between pulses furthers the kinetic motion due to gravity, with the bed gently settling back to the bottom of the resin tank 32. Also, during the administration of the brine pulses, both the contact time and the kinetic motion are provided by the gentle raising and settling of the resin bed 48. No pre backwash cycle is needed to reclassify or recharge the resin bed because the up flow pulses perform that function.

After the resin bed 48 is fully recharged, the water valve 676 remains open. Since the brine in the brine tank 34 is empty, only the drive water flows from the brine line 618 into the resin tank 32 and is used to slowly rinse the resin bed 48.

After the regeneration and slow rinse phase of the cycle is complete, an optional back wash phase may be initiated. In this phase, untreated water flows down through the distribution tube and up through the resin bed 48 and out the drain port 60 to flush trapped particulate matter from the resin bed 48. The untreated water may enter from the inlet orifice 274 and flows both through the outlet orifice 276 to supply untreated water to the treated water line and also through the distribution tube 55. In this example, the water valve 676 would be closed. Alternatively, the water valve may be opened and the control valve may be configured to allow the untreated water from the port 144 to flow through the distribution tube and up through the resin bed and out the drain port.

After the regeneration and slow rinse phase or optional backwash is complete, the motor 102 causes the piston 84 to move to the rapid rinse position as seen in FIG. 5. Also, the motor 198 for the water valve 676 causes the cam 172 to rotate clockwise until the cam projection 180 is disengaged from the valve stem 148 to place the water valve 676 in the closed position to prevent fluid from flowing into the brine tank 34. In this position, the untreated water inlet orifice 274 is connected to the treated water outlet orifice 276 and the top opening 54 of the resin tank 32. The distribution tube 55 is connected to the drain port 60, thereby rinsing the resin tank 32 with untreated water to remove the regenerant solution 52 from the resin tank 32. The resin bed 48 is now fully regenerated and ready to resume water treatment. In this position too, the push button 214 is depressed so that the microswitch 210 causes a signal to be sent to the controller 126 indicating that the water valve 676 is in the closed position. The motor 102 for the piston 84 then causes the piston 84 to move back to the service position and the motor 198 for the water valve 676 causes the water valve 676 to be in the service position as shown in FIG. 1 to resume normal operation of the water softener. It has been show that the water softener in this exemplary embodiment may reduce the amount of water needed to regenerate by 70% and may reduce the amount of salt needed to regenerate by 50%.

Figure 50:
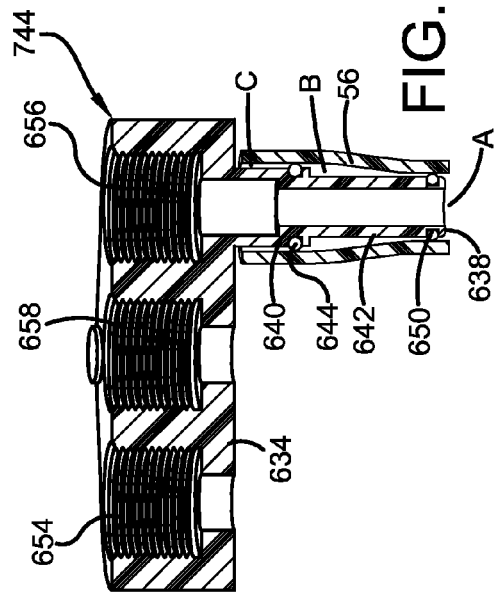
FIG. 50 is a side sectional view of a body cover taken through the center for another exemplary embodiment of a water softener system.
Figure 51:
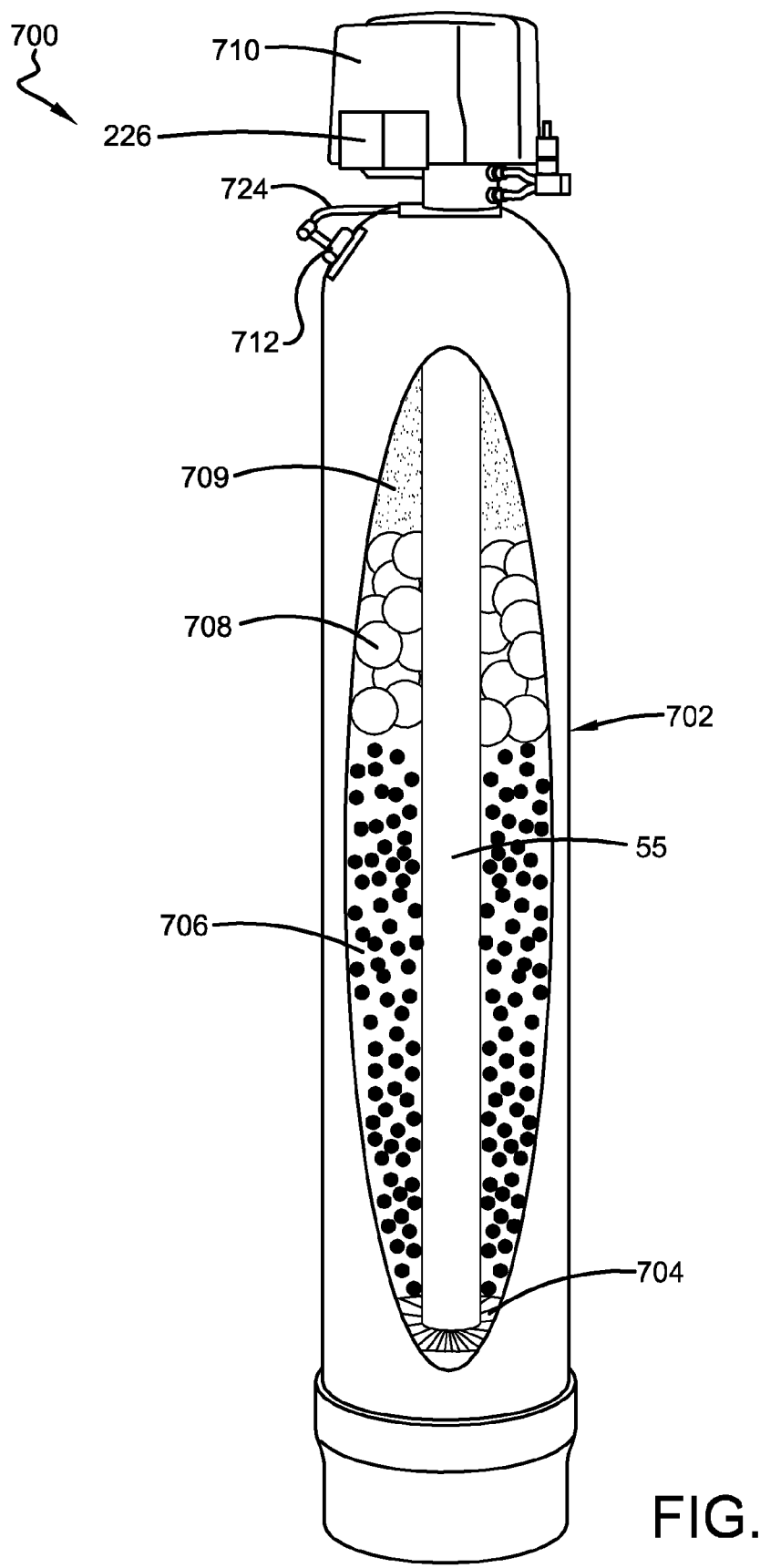
FIG. 51 is a schematic view of the exemplary embodiment of the water softener system mentioned in FIG. 50.
Figure 52:
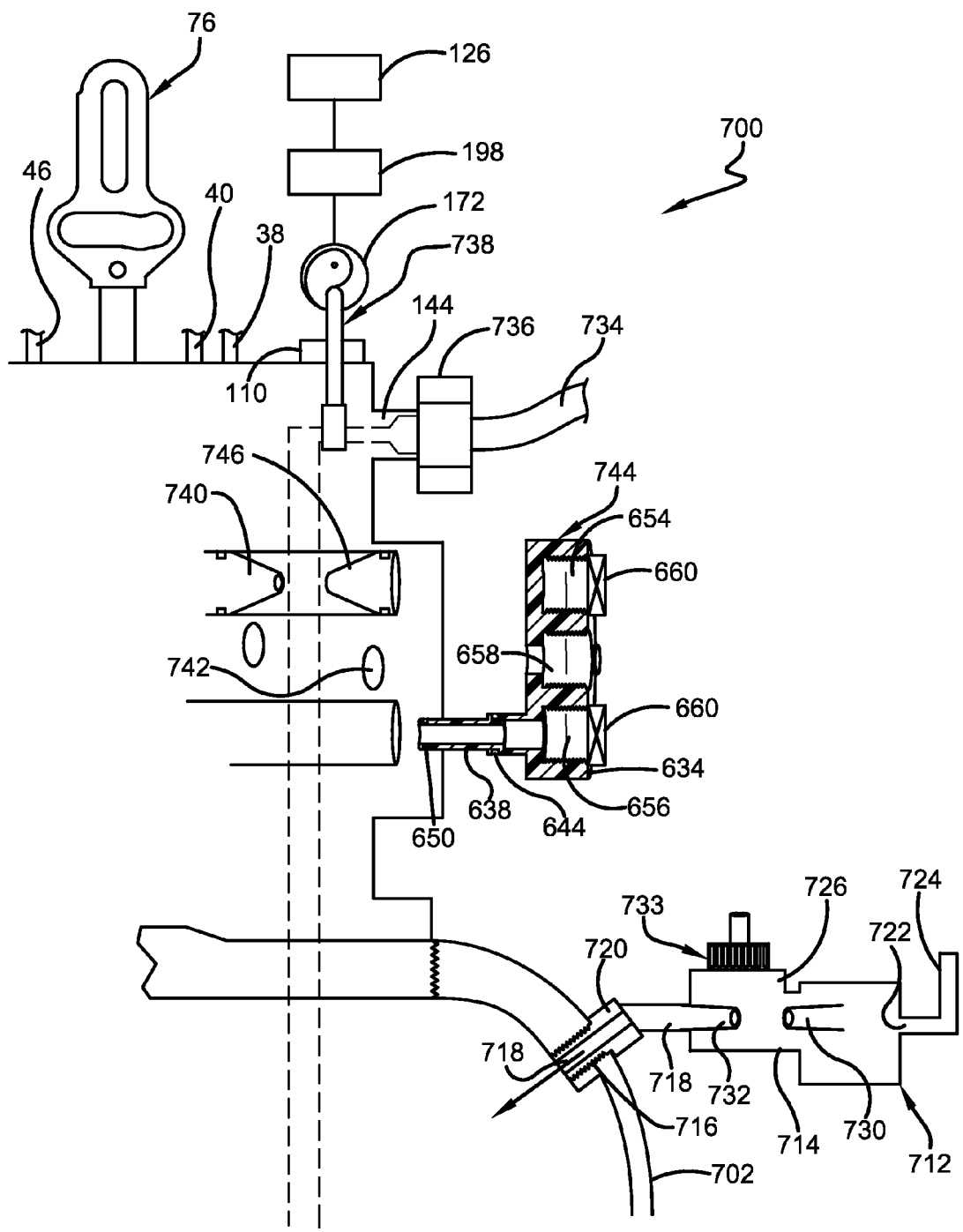
FIG. 52 is a schematic view of a portion of the water softener system of the exemplary embodiment of FIG. 51.

FIGS. 50-52 show another exemplary embodiment of a water softener system 700 that uses oxidation and filtration in which contaminants are first oxidized so that they can be removed by filtration. In this exemplary embodiment, the same reference numbers are used for elements that are similar in construction and function as that of the water softener 30 of the previous embodiment. As seen in FIG. 51, the water softener 700 includes a tank 702. The interior of the tank 702 includes a distributor plate 704 that supports a filtration media 706 placed upon the distributor plate 704. The filtration media 706 may include any suitable media that can filter remove contaminants such as iron, magnesium, or sulfur. Aeration or sorbing balls 708 are provided in the tank on top of the filtration media 706. Theses mass transfer balls 708 attract iron and other contaminants in the water and enhance removal of the iron and contaminants from the untreated water. The oxidation zone in the tank 702 includes a head of air 709 located above the balls 708. A control valve 710 is mounted to the top of the tank 702 and is similar in construction and function as the control valve 36 except for that discussed below.

A venturi type air injector assembly 712 is provided to inject air into the tank 702. As depicted in FIG. 52, the air injector assembly 712 includes an external body 714 and a threaded fitting 716. The threaded fitting 716 is threadily fastened into a threaded opening 718 near the top of the tank 702. An elastomeric seal 720 is fastened on the exterior surface of the tank 702 and seals any openings between the air injector assembly 712 and the tank 702. The body 714 is located outside of the tank 702 and is in fluid communication with the interior of the tank 702. The body 714 includes a nozzle port 722 for receiving a drive water line 724. The body 714 further includes an air port 726 through which air can enter into the body 714 and the tank 702. The body 714 includes an outlet port 728 that is fluidly connected to the fitting 716. A venturi nozzle 730 is provided in the nozzle port 722 and a throat portion 732 is provided in the outlet port 728. A check valve 733 is provided in the air port 726.

A liquid chlorine line 734 for supplying liquid chlorine from a source is fluidly connected to an injector 736. Alternatively, the line 734 may supply other types of suitable sterilizing liquids. The injector 736 is located at the external port 144 of a sterilizer valve 738. The sterilizer valve 738 is provided in a bore 142 (FIG. 6) of the valve body 56 that fluidly communicates with the external port 144 connected to the liquid chlorine line. The sterilizer valve 738 is of similar construction and design as the brine valve 140 of the previous embodiments except that in this exemplary embodiment it is being used to control the flow of liquid chlorine from the liquid chlorine line 734 into the tank 702. This liquid chlorine is used to sterilize the filtration media 706 and other substances in the interior of the tank 702.

The sterilizer valve 738 is operated to move between an open position to allow liquid chlorine from the line 734 to flow into the tank 702 and a close position to block liquid chlorine from the line 734 to flow into the tank 702. In particular, initially the sterilizer valve 738 is in the closed position as shown in FIG. 52. When a determination is made by the controller 126 to flow the liquid chlorine into the tank 702, the controller 126 is programmed to send a control signal to the motor 198 for the sterilizer valve 738 to cause the cam 172 to rotate clockwise until the cam projection 180 engages and moves the valve stem 148 (FIG. 4) down to open the sterilizer valve 738 for a programmed predetermined time. The controller 126 may include a timer to start timing when the control signal is sent. A venturi type injector 740 may be used to provide the motive force to draw the liquid chlorine into the tank 702. The venturi injector 740 is provided in the control valve 710 and is driven by the untreated water. One example, of such a venturi injector would that be shown FIGS. 20-24.

With the sterilizer valve 738 opened, the liquid chlorine can flow from the liquid chlorine line 734 through the port 144 through the venturi injector 740 and down into the tank 702 for the predetermined time. After the controller 126 determines that the liquid chlorine has flowed for the predetermined time, the controller 126 then sends a control signal to the motor 198 for the sterilizer valve 738 to cause the cam 172 to rotate clockwise until the cam projection 180 is disengaged from the valve stem 148 to place the sterilizer valve 738 in the closed position.

An outlet 742 in fluid communication with the inlet orifice 274 to the untreated water line 38 is also in fluid communication with the third threaded opening 658 of a body cover 744. As seen in FIG. 50, the body cover 744 is similar in function and construction to that of the body cover 632 of FIGS. 47-49 except that the first port 636 is removed. Thus, the same reference numbers will be used on FIGS. 50 and 52 that correspond with the similar elements on FIGS. 45-49. In this embodiment, plugs 660 are threadily inserted into the first and second threaded openings 654, 656 to plug them up. The drive water flows out of the outlet 742 and then out of the third threaded opening 658 and into the drive water line 724. The drive water then flows through nozzle 730 of the air injector assembly 712 and draws air through the air port 726 and throat 732 and they both flow into the tank 702.

In operation, a cycle begins with the control valve 710 in the service position in which the untreated water inlet orifice 274 is in fluid communication with the top opening 54 of the tank 702, and the distribution tube 55 of the tank 702 is in fluid communication with the treated water outlet orifice 276 (see FIG. 1). The sterilizer valve 738 is in the closed position blocking the liquid chlorine from entering the tank 702. In this closed position, the upper end of the valve stem 148 is located adjacent the trailing end 182 (in the counterclockwise direction) of the cam projection 180 and is therefore not engaged by the cam projection 180. In this position, the push button 266 is not in the recess 184 and depressed by the body 186 of the base 174 of the cam 172 so that the microswitch 210 causes a signal to be sent to the controller 126 indicating that the sterilizer valve 738 is in the closed position. In the service position, the piston 84 is in a position to allow treated water to exit the outlet orifice 276. Thus, untreated water flows from the untreated water inlet orifice 274 and into the tank 702. The untreated water passes through the head of air 709 and is oxidized as it travels through the head of air. The untreated water also travels through the aeration and sorbing balls 708, which enhance removal of the iron and other contaminants from the untreated water. The oxidized matter is subsequently filtered out of the filtration media 706. The water then passes through the filtration media 706 and flows up through the distribution tube 55 to the outlet orifice 276 of the valve body 56 and to the treated water line 40.

When a determination is made by the controller 126 to operate an air induction cycle due to, for example, most of the air being used, first the piston 84 is moved by the motor 102 to a position so that the top opening 54 of the tank 702 is in fluid communication with the drain port 60. In this position, any residual air is removed from tank 702. The motor operates in a creeper mode to cause the piston 84 to move very slowly to slowly open the drain port 60 so that the air is released very slowly. After the air is removed, the piston 84 is moved to decompress the tank 702 to draw air. The piston 84 is also moved so that untreated water can flow to the venturi injector 740. The sterilizer valve 738 is placed in the open position. The piston 84 is also moved to a position in which the untreated water can flow through nozzle 746 of the venturi injector 740 to draw the liquid chlorine from the line 734 and through the venturi injector 740 and into the tank 702 to sterilize the elements in the interior of the tank 702. The sterilizer valve 738 is then moved to a closed position after a predetermined time.

The piston 84 then moves into a downflow rinse time period and then to a position where there is no flow into the tank for a predetermined time. This allows more contact time with the liquid chlorine for enhanced oxidation. Then, a backwash cycle is performed, the motor 102 for the piston 84 causes the piston 84 to move to the backwash position shown in FIG. 3. Also, the motor 198 for the sterilizer valve 738 causes the cam 172 to rotate clockwise until the cam projection 180 is disengaged from the valve stem 148 to place the sterilizer valve in the closed position to prevent fluid from flowing into the tank 702. In this position, the top opening 54 of the tank 702 is in fluid communication with the drain port 60, and the untreated water inlet orifice 274 is in fluid communication with both the treated water outlet orifice 276 and the distribution tube 55. Thus, untreated water entering from the inlet orifice 274 flows both through the outlet orifice 276 to supply untreated water to the treated water line 40, and also through the distribution tube 55. The untreated water flows down through the distribution tube 55 and up through the filtration media 706 and out the drain port 60 to flush trapped particulate matter from the filtration media 706. It also flushes the air 709 out of the tank 702 through the drain port 60 and then drain line 46. In this position, the push button 214 (shown in FIG. 8) is not in the recess and is depressed by the cam so that the microswitch 210 causes a signal to be sent to the controller 126 indicating that the sterilizer valve 738 is in the closed position.

After the backwash phase of the cycle is complete, the motor 102 causes the piston 84 to move to the rapid rinse position (see FIG. 5). In this position, the untreated water inlet orifice 274 is connected to the treated water outlet orifice 276 and the top opening 54 of the tank 702. The distribution tube 55 is connected to the drain port 60, thereby rinsing the tank 702 with untreated water.

Then, an air induction cycle is performed. The motor 102 for the piston 84 then causes the piston 84 to move so that the tank 702 is decompressed and the drain port 60 and drain line 46 is opened. The piston 84 is moved such that untreated water from the inlet orifice 274 flows through the outlet 742 and opening 658 and into the drive water line 724. The check valve 733 is open to allow air to enter the air injector assembly 712. The drive water flows through the nozzle 730 to draw air through the air port 726 and the air and drive water combine to travel through the throat 732 and through the fitting 716 and opening 718 and into the tank 702. The untreated water also flows into the top opening of the tank 702 from the control valve 710. The water flows from the bottom of tank 702 up through the distributor tube 55 and out the drain port 60. As water flows out of the drain port 60, the tank 702 is being filled with air from the air injector assembly 712. This is continued until the water is substantially drained from the interior of the tank 702 and the volume of tank not occupied by the filtration media 706 is filled with air. After this occurs, the check valve 733 automatically closes to prevent air from escaping from the tank 702. Then, the control valve 710 moves to the service position for normal filtration operation. Since the air is injected directly into the tank 702 and bypasses the control valve 710, fouling is reduce in the control valve.

It should be noted that alternatively, a solenoid valve could be used instead of the brine valve, water valve, or sterilizer valve. The solenoid valve would be powered by the controller 126. The controller 126 determines the open and closed position of the solenoid valve. The cam and microswitch would not be needed in this arrangement.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method for regenerating the ion exchange resin bed of a resin tank for a water treatment system, wherein the water treatment system includes a control valve, wherein the control valve includes a plurality of orifices and a piston, wherein movement of the piston between a plurality of different positions is operative to change the flow of water through the orifices, wherein the orifices are in fluid communication with a source of untreated water, a treated water outlet, a brine tank, a drain, and the resin tank, wherein the method comprises:
   a) operating a first motor to move the piston to a first position;
   b) supplying a first pulse of regenerate solution into the resin tank to charge a first section of the ion exchange resin bed, wherein b) includes operating a second motor to place a regeneration valve in an open position to allow regenerate solution to flow into the resin tank and then operating the second motor to place the regeneration valve in the closed position to prevent regenerate solution to flow into the resin tank; and
   c) supplying a second pulse of regenerate solution to charge a second section of the ion exchange resin bed, wherein c) includes operating the second motor to place the regeneration valve in an open position to allow regenerate solution to flow into the resin tank and then operating the second motor to place the regeneration valve in the closed position to prevent regenerate solution to flow into the resin tank, wherein the second motor is operative to cause the regeneration valve to open and close independent of the position of the piston.

2. The method of claim 1 wherein b) includes supplying the first pulse at a value that fully charges the first section, and wherein c) includes supplying the second pulse at a value that fully charges the second section.

3. The method of claim 2 including d) supplying one or more additional pulses of regenerate solution into the resin tank with each pulse being at a value that fully charges a respective section of the ion exchange resin bed, wherein the one or more additional pulses of regenerate solution is sufficient to fully charge the entire ion exchange resin bed.

4. The method of claim 1 wherein the first and second pulses fully charge the ion exchange resin bed.

5. The method of claim 3 wherein each pulse raises the ion exchange resin bed from a first position with respect to the resin tank, wherein the method further includes pausing between pulses for a predetermined time to allow the ion exchange resin bed to settle back to the first position.

6. The method of claim 5 wherein the ion exchange resin bed is charged without performing a backwash cycle.

7. A water treatment system comprising:
- a brine tank and a resin tank, wherein the resin tank includes an ion exchange resin bed;
- a control valve in operative connection with the brine tank and resin tank, wherein the control valve includes:
  - a plurality of orifices;
  - a piston, wherein movement of the piston between a plurality of different positions is operative to change the flow of water through the orifices;
  - a fluid valve in fluid communication with at least one of the orifices,
    wherein the fluid valve is operative to open and close at least one passage in fluid communication between the control valve and the brine tank;
  - a valve cam, wherein the valve cam in a first position is operative to cause the fluid valve to open the at least one passage, wherein the valve cam in a second position is operative to close the at least one passage;
- a first motor that is operative to move the piston between the plurality of different positions;
- at least one controller, wherein the at least one controller is operatively connected to the fluid valve and operative to selectively cause the fluid valve to open and close the at least one passage such that regenerate solution from the brine tank flows into the resin tank in pulses, wherein each pulse of regenerate solution is at a value that fully charges a respective section of the ion exchange resin bed; and
- a second motor, wherein the second motor is operative to rotate the valve cam between the first and second positions and cause the fluid valve to open and close the at least one passage in response to the controller and independently of the operation of the first motor, wherein the fluid valve is operative to open and close the at least one passage independent of the position of the piston.

8. The system according to claim 7 wherein the pulses are of a predetermined number that is sufficient to fully charge the entire ion exchange resin bed.

9. The system according to claim 7 including a water line in fluid communication with the fluid valve, a venturi injector operatively associated with the brine tank, wherein the venturi injector includes an injector nozzle in fluid communication with the at least one passage, wherein the venturi injector includes a regenerate solution port in fluid communication with the regenerate solution in the brine tank, wherein the controller is operative to selectively cause the fluid valve to open and close the at least one passage such that water from the water line flows through the passage and into the injector nozzle in pulses to thereby draw the pulses of regenerate solution through the regenerate solution port and into the resin tank.

10. The system according to claim 9 wherein the pulses of water flowing through the injector nozzle mixes with the pulses of regenerate solution flowing through the regenerate solution port.

11. The system according to claim 7 including a pump in fluid communication with the regenerate solution in the brine tank and the fluid valve, wherein the pump is operative to draw regenerate solution through the at least one passage and into the resin tank, wherein the pump is positioned near the bottom of the brine tank.

12. The system according to claim 7 wherein the orifices are in fluid communication with a source of untreated water, a treated water outlet, the brine tank, a drain, and the resin tank, respectively.

13. The system according to claim 11 wherein the pump includes a centrifugal pump.

14. The system according to claim 11 including a riser tube, wherein the riser tube extends upwardly from the bottom of the brine tank, wherein the pump is positioned inside the riser tube.

15. The system according to claim 14 wherein the orifices are in fluid communication with a source of untreated water, a treated water outlet, the brine tank, a drain, and the resin tank.

16. The method of claim 1 wherein the first position of the piston is such that the source of untreated water is in fluid communication with the treated water outlet.

* * * * *